United States Patent [19]

Ueda

[11] Patent Number: 5,708,684

[45] Date of Patent: Jan. 13, 1998

[54] RADIO EQUIPMENT

[75] Inventor: Yoichi Ueda, Kawasaki, Japan

[73] Assignee: Fujitsu Limited, Kanagawa, Japan

[21] Appl. No.: 513,230

[22] Filed: Aug. 10, 1995

[30] Foreign Application Priority Data

| Nov. 7, 1994 | [JP] | Japan | 6-272089 |
| Feb. 15, 1995 | [JP] | Japan | 7-026633 |
| Mar. 20, 1995 | [JP] | Japan | 7-060728 |

[51] Int. Cl.[6] ............................. H04L 7/00
[52] U.S. Cl. ............. 375/358; 375/219; 455/69
[58] Field of Search .................... 375/355, 358, 375/219, 354, 371; 455/8, 9, 69, 103; 370/225–228, 221; 340/825.01

[56] References Cited

U.S. PATENT DOCUMENTS

| 4,683,566 | 7/1987 | Sasaki | 375/362 |
| 4,797,903 | 1/1989 | Itoh | 375/267 |
| 5,287,211 | 2/1994 | Grimes et al. | 359/161 |
| 5,406,548 | 4/1995 | Itoh et al. | 370/221 |
| 5,541,962 | 7/1996 | Yoshino | 375/357 |

Primary Examiner—Temesghen Ghebretinsae
Attorney, Agent, or Firm—Helfgott & Karas, P.C.

[57] ABSTRACT

A high-frequency signal output from an active radio transmitter is input to a phase comparator via a standby radio receiver. A transmitting data processing unit delays a frame data signal and a clock signal by a predetermined time and inputs them to the phase comparator. The phase comparator compares the phases of the two frame data signals and the two clock signals, and the delay time adjuster in the active radio transmitter adjusts the phases of the frame data signal and the clock signal input from the data processing unit so that the phases of both data signals and clock signals are coincident with each other. Similarly, the delay time adjuster in the standby radio transmitter adjusts the phases of the data signal and the clock signal input from the data processing unit. In this manner, the delay times (signal phases) of the active radio transmitter and the standby radio transmitter are automatically adjusted during the operation of a radio equipment.

6 Claims, 40 Drawing Sheets

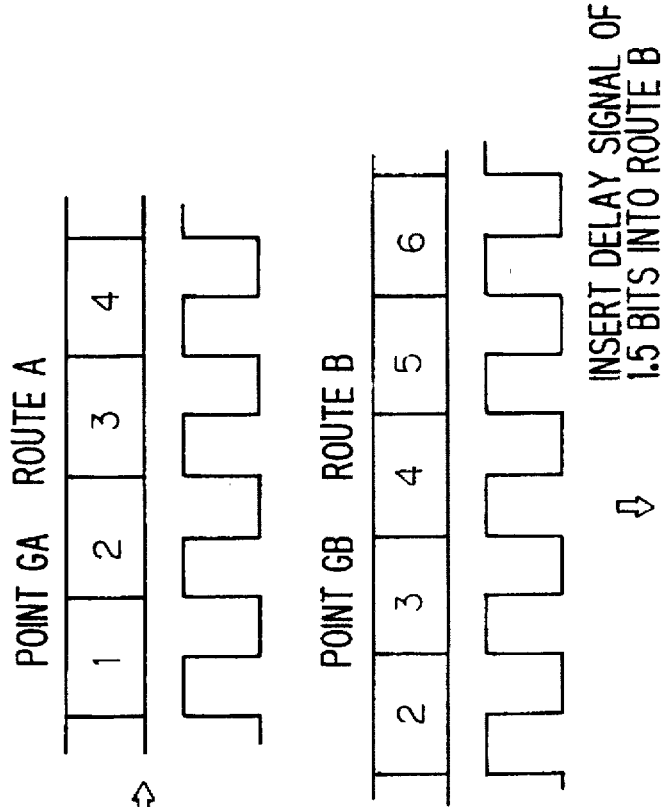
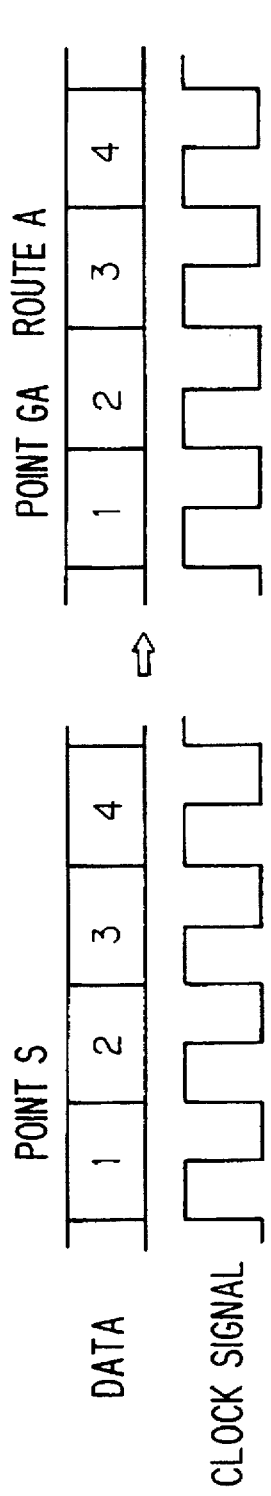
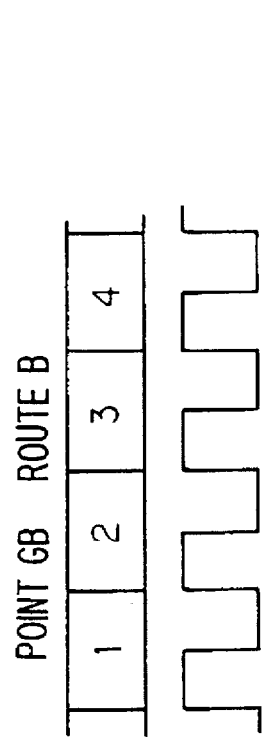

F : OVERHEAD BIT
D : DATA BIT

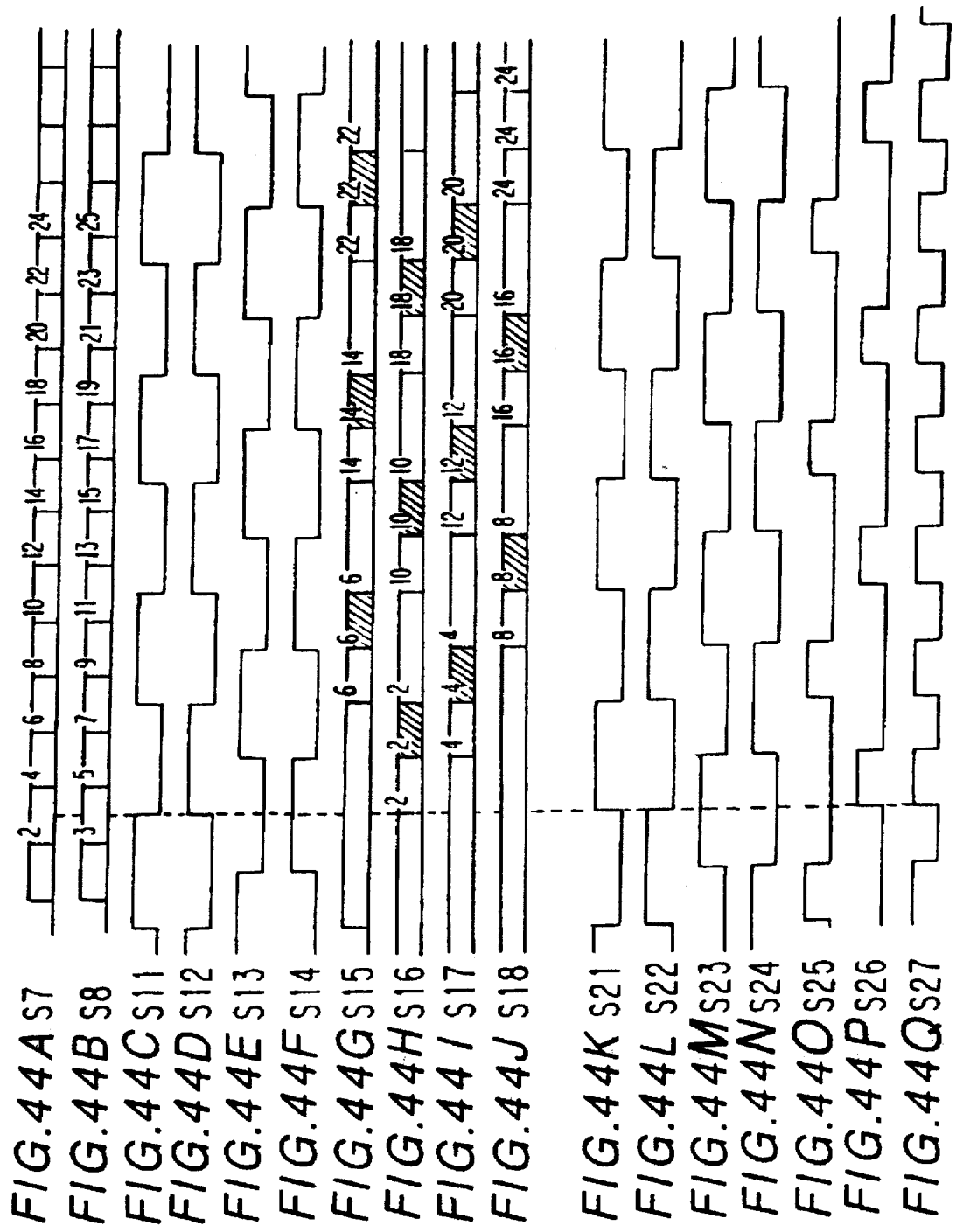

FIG.45

| | | | | | | | | |
|---|---|---|---|---|---|---|---|---|
| SYSTEM 1 { S7 | F | D2 | D4 | D6 | D8 | D10 | D12 | |
| SYSTEM 1 { S8 | F | D3 | D5 | D7 | D9 | D11 | D13 | |
| SYSTEM 2 { S7b | | F | D3 | D5 | D7 | D9 | D11 | D13 |
| SYSTEM 2 { S8b | | F | D4 | D6 | D8 | D10 | D12 | D14 |

F : FRAME BIT    D : DATA BIT

FIG.46

| | | | | | | | |
|---|---|---|---|---|---|---|---|
| SYSTEM 1 { S7 | F | D2 | D4 | D6 | D8 | D10 | D12 |
| SYSTEM 1 { S8 | F | D3 | D5 | D7 | D9 | D11 | D13 |
| SYSTEM 2 { S7b | D2 | D4 | F | D6 | D8 | D10 | D12 |
| SYSTEM 2 { S8b | D3 | D5 | F | D7 | D9 | D11 | D13 |

F : FRAME BIT    D : DATA BIT

FIG.47

| | | | | | | | |
|---|---|---|---|---|---|---|---|
| SYSTEM 1 { S7 | F | D2 | D4 | D6 | D8 | D10 | D12 |
| SYSTEM 1 { S8 | F | D3 | D5 | D7 | D9 | D11 | D13 |
| SYSTEM 2 { S7b | F | STUFF | D2 | D4 | D6 | D8 | D10 |
| SYSTEM 2 { S8b | F | STUFF | D3 | D5 | D7 | D9 | D11 |

F : FRAME BIT    D : DATA BIT

RADIO EQUIPMENT

BACKGROUND OF THE INVENTION

FIELD OF THE INVENTION

The present invention relates to a radio equipment and, more particularly, to a radio equipment which have active and standby radio transmitters and which can switch the active radio transmitter to the standby radio transmitter without any momentary disconnection.

A radio equipment modulates input digital data (e.g., 4-PSK modulation), transmits the modulated signal to other radio equipment in the form of a high-frequency signal in the order of GHz, similarly receives a high-frequency signal transmitted from the other radio equipment, and demodulates and outputs the signal. The other radio equipment is referred to as a called radio station hereinafter.

Such a radio equipment has a redundant radio transmitter structure and a redundant radio receiver structure. That is, a radio equipment is provided with active and standby radio transmitters and active and standby radio receivers.

FIG. 34 shows the structure of a conventional radio equipment, and FIG. 35 shows the structure of a supervisory controller of the radio equipment. In FIG. 34, the reference numeral 1 represents a multiplexer/demultiplexer (MUX) which multiplexes the data input from a plurality of circuits (not shown) and inputs the data to a radio transmitter group 4, separates the multiplex data input from a radio receiver group 15 and outputs the data to each circuit. The reference numeral 2 represents a B-U converter for converting a bipolar signal into a unipolar signal, 3 a transmitting data processing unit which inserts an overhead bit into multiplex data which are input from the multiplexer/demultiplexer in bit series and assembles and outputs them in the form of a frame. Actually, since a modulator of a radio transmitter which will be described later modulates the multiplex data by 4-PSK, the data processing unit 3 converts the bit serial data into serial/parallel data, in other words, into a string of binary digits in odd numbers and a string of binary digits in even numbers, and adds an overhead bit to each bit string so as to assemble and output them in the form of a frame.

One frame referred to as a multiframe is composed of 30 subframes (time slots), and each subframe is composed of 1 bit of control data (overhead bit) Si (i=1 to 30) and 7 bits of information data, as shown in FIG. 36A. A stuffing bit (dummy data) V or input data is inserted into the 30-th subframe.

The transmitting data processing unit 3 is provided with a speed converter for converting serial data input at a predetermined rate into parallel data, writing the parallel data in a memory, reading the data from the memory at a predetermined rate and outputting the read data. Consequently, a stuffing bit is appropriately inserted into the 30-th subframe in accordance with the difference in the data input rate and the data output rate, and when no stuffing bit is inserted, data is inserted. The larger the difference between the data input rate and the data output rate, the larger the number of stuffing bits inserted, while the smaller the difference, the smaller the number. As shown in FIG. 36B, among the 30 control bits $S_1$ to $S_{30}$, $S_1$, $S_7$, $S_{13}$, $S_{19}$ and $S_{25}$ are frame bits, $S_4$, $S_{10}$ and $S_{16}$ are stuffing control bits, $S_{22}$ is a called station supervisory control bit, $S_{28}$ is a parity bit, and the others are DSC bits. In the list shown in FIG. 36b, the upper row shows the control bits which are inserted in the string of binary digits in odd number and the lower row shows the control bits which are inserted in the string of binary digits in even number after serial/parallel conversion. Each of the stuffing control bits $C_i 1$ to $C_i 5$ specifies the content of a 30-th subframe, and when it is dummy data (when a stuffing bit is inserted), all the stuffing control bits are "0", and when it is data, they are all "1". The DSC bit is for user or transmits and receives a control signal to and from a supervisory controller at the called station.

Returning to FIG. 34, the reference numeral 4 represents a radio transmitter having a redundant structure, 4a an active radio transmitter (No. 1), and 4b a standby radio transmitter (No. 2). When there is a trouble in the active radio transmitter 4a, the standby transmitter 4b is used as an active transmitter, and the active transmitter having the trouble is repaired and used as a standby transmitter thereafter. The active and standby radio transmitters 4a, 4b have the same structure, and are provided with a modulator MOD for modulating input data (by, e.g., 4-PSK modulation), and a high-frequency transmitter TX for converting the modulated wave into a radio frequency, amplifying the power and outputting the high-frequency signal. The reference numeral 5 represents a high-frequency signal switch for selecting a high-frequency signal from the active radio transmitter 4a and outputting the signal to an antenna. The high-frequency signal switch 5 also inputs a high-frequency signal from the standby radio transmitter 4b to a terminating resistance 6 so as to terminate it. The reference numeral 7 represents an isolator, 8 a bandpass filter for passing a signal component of a radio frequency band therethrough, 9 a circulator, and 10 an antenna. These elements constitute a transmission system.

The reference numeral 11 represents a bandpass filter for passing therethrough only the radio frequency component contained in a reception signal which is input form the circulator 9, 12 an isolator, 13 a hybrid circuit for branching an input signal into two components, 15 a radio receiver having a redundant structure, 15a an active radio receiver (No. 1), and 15b a standby radio receiver (No. 2). When there is a trouble in the active radio receiver 15a, the standby receiver 15b is used as an active receiver, and the active receiver having the trouble is repaired and used as a standby receiver thereafter. The active and standby radio receivers 15a, 15b have the same structure, and are provided with a high-frequency receiver RX for amplifying the power of a reception signal, converting the frequency of the reception signal into an intermediate frequency and outputting it, and a demodulator DEM for demodulating the input data from an intermediate-frequency signal (by, e.g., 4-PSK demodulation).

The reference numeral 16 denotes a received data processing unit for extracting the control data $S_1$ to $S_{30}$ from the frame signal input from the active radio receiver 15a so as to execute predetermined processing and other processing such as deframing, and 17 a U-B converter for converting a unipolar signal into a bipolar signal and inputting it to the multiplexer/demultiplexer 1.

The reference numeral 18 represents a supervisory controller for (1) processing in accordance with a called station supervisory control signal contained in a reception signal, (2) transmitting a called station supervisory control signal which represents the state of the caller transmitter to a transmission signal, and (3) instructing the radio transmitters or the radio receivers to be switched. The reference numeral 19 denotes a control panel provided with a switch on/off switch 19a and a selection switch 19b for selecting between the radio transmitters No. 1 and No. 2. The reference numeral 20 denotes a switching controller for outputting a change-over command for instructing the high-frequency signal switch 5 to switch the active transmitter in accordance with a change-over command from the supervisory controller 18 or the control panel 19.

The supervisory controller 18 is provided with a receiver 18a for receiving a supervisory control signal which is transmitted from the called station via the received data processing unit 16, a transmitter 18b for transmitting a supervisory control signal to the called station via the transmitting data processing unit 3, an alarm processor 18c for inputting a supervisory control signal to the transmitter 18b, and issuing a switch control on the basis of an alarm input to the caller station or a supervisory control signal from the called station, an operating portion 18d and a switching controller 18e. The supervisory control signal informs the called station of a deterioration in the quality of the circuit and the state of the caller station.

The operating portion 18d has a select switch SRS for selecting between a transmitter and a receiver, a switch on/off switch SNF for issuing a change-over command, and a select switch SLT for selecting between No. 1 and No. 2 of the radio transmitter 4 or the radio receiver 15.

The switching controller 18e instructs the switching controller 20 to switch between the active radio transmitter 4a and the standby radio transmitter 4b (1) when a change-over command is issued from the alarm processor 18c on the basis of the information on a deterioration in the quality of a circuit or the alarm input from the caller station, or (2) when the operating portion 18d issues a change-over command. The switching controller 18e also instructs the received data processing unit 16 to switch between the active radio receiver 15a and the standby radio receiver 15b (1) when a change-over command is issued from the alarm processor 18c on the basis of the alarm input from the caller station, or (2) when the operating portion 18d issues a change-over command.

In this manner, the radio transmitter 4 and the radio receiver 15 of the radio equipment have a duplicate structure so that continuous communication is possible by switching an active transmitter (receiver) over to a standby transmitter (receiver) when the former has a trouble.

FIG. 37 shows the structure of another conventional radio equipment, wherein not only the radio transmitter and the radio receiver of the radio equipment but also the transmitting data processing unit and the received data processing unit have a duplicate structure. The structure shown in FIG. 37 is different from that shown in FIG. 36 in that (1) a branching portion 21 is provided, (2) the B-U converter (B-U) and the transmitting data processing unit (DPU) have a duplicate structure and the outputs of the data processing units are input to the active radio transmitter 4a and the standby radio transmitter 4b, respectively, of the radio transmitter 4, (3) the received data processing unit (DPU) and the U-B converter (U-B) have a duplicate structure and the output signals are input from the active radio receiver 15a and the standby radio receiver 15b of the radio receiver 15 having a duplicate structure to the respective data processing units, and (4) a change-over switch 22 is provided.

The branching portion 21 branches the multiple data output from the multiplexer/demultiplexer 1 into two items of data and inputs the data to the B-U converters 2a and 2b, respectively. The B-U converters 2a, 2b convert the bipolar signals into unipolar signals and inputs them to the data processing units 3a and 3b, respectively. The data processing units 3a and 3b insert overhead bits into the multiplex data which are input in bit series so as to assemble them in the form of frames, and input the frame data to the active and standby radio transmitters 4a and 4b, respectively. Each of the radio transmitters 4a and 4b modulates the input data by 4-PSK, converts the modulated wave into a radio frequency, amplifies the power and outputs the data.

The high-frequency signal switch 5 selects a high-frequency signal from the active radio transmitters 4a and outputs it to the antenna 10 via the isolator 7, the bandpass filter 8 and the circulator 9, and inputs a high-frequency signal from the standby radio transmitter 4b to the terminating resistance 6 so as to terminate it.

The signal received by the antenna 10 is input to the hybrid circuit 13 via the circulator 9, the bandpass filter 11 and the isolator 12, branched by the hybrid circuit 13 and supplied to the radio receivers 15a, 15b having a redundant structure. The active radio receiver 15a and the standby radio receiver 15b amplify the powers, convert the frequencies of the reception signals into intermediate frequencies, demodulate the intermediate-frequency signals into frame data signals by 4-PSK demodulation, and input the frame data signals to the data processing units 16a and 16b, respectively. The data processing units 16a and 16b extract the control data $S_1$ to $S_{30}$ from the input frame data signal, execute predetermined processing and other processing such as deframing on the extracted control data, and input the data to the U-B converters 17a and 17b, respectively. The change-over switch 22 is operated under the control of the supervisory controller 18 so as to input the signal from the active radio receiver 15a to the multiplexer/demultiplexer 1.

With the recent demand for an improvement of the quality of a communication circuit, it is demanded to conduct a maintenance operation of a radio equipment without any momentary disconnection of the circuit. The following conditions must be satisfied in order to switch the active radio transmitter 4a to the standby radio transmitter 4b of the radio transmitter 4 without any momentary disconnection. A first condition is that the local oscillators (local oscillators of the modulators MOD and the high-frequency transmitters TX) of the active radio transmitter 4a and the standby radio transmitter 4b should be synchronized with each other. A second condition is that the phases of the signals should be the same at the input points A and B of the high-frequency signal switch 5. Herein, it is necessary that the phases of both the data signal and the clock signal are the same. A third condition is that a bit error due to the time (switching time) required for switching the radio transmitter should be prevented. FIG. 38 explains the third condition. If it is assumed that one bit of transmission time is required for switching the radio transmitter and that switching is performed at a third data bit, the third data bit has an error. It is therefore necessary to prevent a bit error due to the switching time.

A fourth condition is that the data signal strings generated by the active and standby transmitting data processing units 3a and 3b are coincident. The fourth condition will be explained in detail in the following.

FIG. 39 is a block diagram of the internal structure of the transmitting data processing unit 3a (3b) which adopts a master-slave synchronization system. Since the transmitting data processing units 3a, 3b have the same structure, only one data processing portion is shown in FIG. 39.

In FIG. 39, a serial/parallel converter (S/P) 201 converts serial data S1 input in bit series into parallel data and outputs a string $S_7$ of data signals in odd numbers and a string S8 of data signals in even numbers to a speed converter 202. The serial/parallel converter (S/P) 201 also converts an input serial clock S2 into a parallel clock and outputs a clock signal S4 to the speed converter 202. The two data signal strings S7 and S8 are generated on the assumption that 4-PSK modulation is executed. The speed converter 202 converts the velocities of the data signal strings S7 and S8 in accordance with the clock signal S4 and the timing signal S30 from a timing generator 210, and outputs the results as data signal strings S32 and S33. The serial/parallel converter 201 and the speed converter 202 will be described later in detail with reference to FIG. 40. The timing generator 210 generates various timing signals by a PLL circuit 212 in accordance with a phase comparison signal S31 supplied from the speed converter 202, as will be described later, and supplies the timing signals to each block including the speed converter 202.

Overhead bit inserting portions 204, 205 insert the parity check bit and supervisory data which are supplied from a parity check bit generator 203 and a DSC interface (DSCINTF) 211, respectively, into the data signal strings S32, S33. Each of Exclusive-OR (EXOR) portions 206, 207 obtains the exclusive OR of the data signal string output from each of the overhead bit insertion portions 204, 205 and the scramble pattern supplied from a scramble pattern generator 213, and outputs the exclusive OR. Overhead bit inserting portions 208, 209 insert the frame bit which is supplied from a frame bit generator 214 into the scrambled data signal strings in accordance with the insertion timing output from the timing generator 210.

FIG. 40 shows the internal circuits of the serial/parallel converter 201, the speed converter 202, the timing generator 210, etc. shown in FIG. 39. In FIG. 40, D-flip-flops 221 to 224 and an inverter 225 constitute the serial/parallel converter 201, and an AND circuit 241, a 1/N counter 242 and a 1/M counter 243 constitute the timing generator 210. The elements other than the above-described elements 221 to 225, 241 to 243, the scramble pattern generator 213, the frame bit generator 214 and the PLL circuit 212 constitute the speed converter 202. Only the phase comparator of the PLL circuit 212 exists in the speed converter 202 for convenience' sake.

The operation of the circuits having these structures will be described later with reference to FIGS. 43 and 44.

FIG. 41 is a block diagram of the transmitting data processing unit 3a (3b) which adopts a pulse stuffing synchronization system. Since the data processing units 3a, 3b have the same structure, only one data processing unit is shown in FIG. 41. The same numerals are provided for the same elements and signals which have the same structure as those shown in FIG. 39, and explanation thereof will be omitted. In FIG. 41, a stuffing control bit generator 215 generates a stuffing control bit indicating the presence or absence of a stuffing pulse in accordance with the phase comparison signal S31 supplied from the speed converter 202, and outputs a stuffing control bit to overhead bit inserting portions 216, 217. A timing generator 218 generates various timing signals in accordance with a phase comparison signal S31 supplied from the speed converter 202 and the output of an oscillator 219 and supplies the timing signals to each block. Overhead bit inserting portions 216, 217 insert the parity check bit and supervisory data which are supplied from the parity check bit generator 203 and the DSC interface 211, respectively, and the stuffing control bit supplied from the stuffing control bit generator 215, into the data signal strings S32, S33 in accordance with the timing signal supplied from the timing generator 218.

FIG. 42 shows the internal circuits of the serial/parallel converter 201, the speed converter 202, the timing generator 218, etc. shown in FIG. 41. The same numerals are provided for the same elements and signals which have the same structure as those of the data processing unit of a master-slave synchronization system shown in FIG. 40, and explanation thereof will be omitted.

In FIG. 42, an AND circuit 247, the 1/N counter 242, the 1/M counter 243, a stuffing bit insertion timing generator 248 and an AND circuit 249 constitute the timing generator 218. Although a phase comparator 250 intrinsically constitutes the timing generator 218, it is included in the speed converter 202 for convenience' sake.

The operation of the circuits having these structures will be described later with reference to FIGS. 43 and 44.

FIGS. 43 and 44 are timing charts showing the operation of the common portion of each circuit in FIGS. 40 and 42. The input clock S2 is converted into the signals S4, S5 by the inverter 225 and the D-flip-flop 224, and the D-flip-flops 221, 222 and 223 convert the input data S1 into the data signal strings S7, S8 by using these clock signals S4, S5. The parallel data signal strings S7, S8, which are thus subjected to serial/parallel conversion, are supplied to the speed converter 202. The D-flip-flop 224 constitutes a ½ frequency divider.

Since the data processing units 3a, 3b have a redundant structure, as shown in FIG. 37, there is the other serial/parallel converter which generates data signal strings corresponding to the data signal strings S7, S8. However, the other ½ frequency divider which corresponds to the D-flip-flop 224 dose not necessarily generate clock signals having the same phase as those generated by the D-flip-flop 224. In other words, there is a possibility of the other ½ frequency divider generating signals S4b, S5b shown in FIG. 43. In this case, the other serial/parallel converter converts the input data signal string S1 into parallel data signal strings S7b, S8b. Consequently, with respect to the same and one input data S1, the serial/parallel converter of the active system outputs, for example, the data signal strings S7, S8 while the other serial/parallel converter of the standby system outputs data signal strings S7b, S8b, which are different from the data signal strings S7, S8. FIG. 45 shows such an inconvenience. In this case, it is impossible to switch the active system over to the standby system without any momentary disconnection. In FIG. 45, the symbol "F" represents a frame bit, and "D" a data bit.

In FIGS. 43 and 44, signals S11 to 14 represent examples of timing signals on the writing side of the speed converter 202, and the hatched portions of the signals S15 to S18 represent data S32 and S33 which are selected and read by the selectors 234 and 235. Signals S21 to S27 are selection signals for enabling such selection by the selectors 234 and 235. The signals S15 to S27 correspond to the clock operation on the reading side which causes no clock missing.

Even if the problem of the discordance of the data signal strings is solved, a problem may be caused that the frame phase is different between the data processing unit 3a and the data processing unit 3b, as shown in FIG. 46. To state this concretely, there is a case in which the frame bit insertion timings of the overhead bit inserting portions 208, 209 are different between the data processing unit 3a and the data processing unit 3b. In this case, the positions of the frame bits are different between the data processing unit 3a and the data processing unit 3b, so that it is impossible to switch the active system over to the standby system without any momentary disconnection.

Furthermore, even if the problems of discordance of the data signal strings shown in FIG. 45 and the discordance of the frame phases shown in FIG. 46 are solved, the stuffing phases are sometimes different between the data processing unit 3a and the data processing unit 3b in the pulse stuffing synchronization system, as shown in the FIG. 47. That is, the stuffing pulse insertion timing generated by the AND circuit 249 in FIG. 42 is different between the data processing unit 3a and the data processing unit 3b. In this case, the positions of the stuffing pulses (represented by "STUFF") are different, so that it is impossible to switch the active system over to the standby system without any momentary disconnection.

Although it is easy to satisfy the first condition, there is conventionally no effective method of fulfilling the second condition. In other words, since there is no effective method of making the phases of signals coincident in order to switch the radio transmitter without any momentary disconnection, the delay time is only adjusted by measuring the difference in the delay time between the active radio transmitter and the standby radio transmitter. For example, when there is a trouble in an active radio transmitter and the active radio transmitter is repaired, the active radio transmitter is switched over to a standby radio transmitter. After the active radio transmitter is repaired, there is a difference in the delay time between the active radio transmitter and the standby radio transmitter. This difference in the delay time in the radio transmitter is cancelled by using a measuring machine and a measuring system. According to this method, however, it is necessary to adjust the delay time by using a measuring machine and a measuring system at every switching operation of the radio transmitter, and the delay time adjusting operation is very complicated.

NO radio equipment which can satisfy the third condition has been proposed. That is, there is a bit error when a radio transmitter is switched. In addition, there is no method of fulfilling the fourth condition, so that it is impossible to switch the active system to the standby system in a radio equipment having a data processing unit of a redundant structure without any momentary disconnection.

SUMMARY OF THE INVENTION

Accordingly, it is a first object of the present invention to eliminate the above-described problems in the related art and to provide a radio equipment which can make the delay times of two radio transmitters coincident, in other words, to make the signal phases of the two radio transmitters coincident with each other by a simple structure without using a measuring machine or a measuring system.

It is a second object of the present invention to provide a radio equipment which can make the signal phase of an active radio transmitter coincident with that of a standby radio transmitter during the operation of the radio equipment.

It is a third object of the present invention to provide a radio equipment which can automatically make the signal phase of an active radio transmitter coincident with that of a standby radio transmitter.

It is a fourth object of the present invention to provide a radio equipment which does not cause a bit error due to the switching time of a transmitter group.

It is a fifth object of the present invention to provide a radio equipment which can switch an active system over to a standby system without any momentary disconnection by making the data string in an active data processing unit coincident with the data string in a standby data processing unit.

It is a sixth object of the present invention to provide a radio equipment which can switch an active system over to a standby system without any momentary disconnection by making the frame phase and stuffing bit phase in an active data processing unit coincident with those in a standby data processing unit.

To achieve the first to third ends, in one aspect of the present invention, there is provided a radio equipment having an active radio transmitter and a standby radio transmitter and an active radio receiver and a standby radio receiver, wherein the difference in the delay time between the two radio transmitters is zero, the equipment comprising: a transmitting data processing unit for assembling input data in the form of a frame and inputting a clock signal and a frame data signal to each of the radio transmitters; a high-frequency signal switch for selecting and outputting a high-frequency signal output from the active radio transmitter; a transmitting and receiving portion for transmitting the high-frequency signal output from the high-frequency signal switch to other radio equipment and receiving a high-frequency signal which is transmitted from the other radio equipment and inputting the high-frequency signal to the active radio receiver and the standby radio receiver; a received data processing unit for receiving a frame data signal and a clock signal demodulated by each of the two radio receivers and deframing and outputting a frame data signal supplied from the active radio receiver; a signal route generator for selecting a high-frequency signal output from each of the active radio transmitter and the standby radio transmitter and inputting the high-frequency signal to the standby radio receiver so as to generate a signal route for adjusting the delay time of the corresponding radio transmitter; a means provided in the transmitting data processing unit so as to supply a frame data signal and a clock signal to the received data processing unit after a predetermined delay; a phase comparator provided in the received data processing unit so as to compare the phases of a frame data signal and a clock signal which are received from the standby radio receiver with the phases of a frame data signal and a clock signal which are directly received from the transmitting data processing unit, and output signals indicating the coincidence/discordance of the data phase and the coincidence/discordance of the clock phase, respectively; and a delay time adjuster provided in the active radio transmitter and the standby radio transmitter so as to adjust the phases of the frame data signal and the clock signal input from the transmitting data processing unit so that both the phases of the two clock signals and the phases of the two frame data signals input to the phase comparator are coincident with each other.

To achieve the fourth end, in a second aspect of the present invention, there is provided a radio equipment having a data processing unit for inserting an overhead bit into input data and outputting the data, first and second radio transmitters for modulating the data input from the data processing unit, converting the modulated wave into a high-frequency signal and outputting the high-frequency signal, and a high-frequency signal switch for selecting the high-frequency signal output from one of the radio transmitters and outputting the selected signal, the equipment comprising: a switching signal generator for generating a switching signal for instructing the radio transmitters to be switched; a means for outputting a switching signal in synchronism with an overhead bit insertion timing; and a delay circuit for delaying the switching signal output from the means for outputting a switching signal by the time which it takes the overhead bit inserted into the data to reach the high-frequency signal switch; wherein the high-frequency signal switch switches the radio transmitters in accordance with the output of the delay circuit and outputs the high-frequency signal.

To achieve the fifth and sixth ends, in a third aspect of the present invention, there is provided a radio equipment having an active data processing unit and a standby data processing unit for inserting an overhead bit into input data and outputting the data, and a radio transmitter for modulating the data input from the active data processing unit, converting the modulated wave into a radio signal and outputting the radio signal, the equipment comprising: a serial/parallel converter provided in each of the data processing units so as to convert a string of data signals which are input in bit series into a parallel data signal string; a clock frequency divider provided in each of the data processing units so as to divide the frequency of an input clock and supply the clock signal to the serial/parallel converter; a resetting means for resetting the clock frequency divider of one data processing unit in accordance with the clock signal output from the clock frequency divider of the other data processing unit so as to make the parallel data signal string output from the serial/parallel converter of the one data processing unit coincident with the parallel data signal string output from the serial/parallel converter of the other data processing unit.

Other features and advantages of the present invention will be apparent from the following description taken in conjunction with the accompanying drawings.

BRIEF DESCRIPTION OF THE DRAWINGS

FIGS. 2A to 2D explain phase adjustment;

FIG. 43 is a time chart of the data processing unit;

FIG. 44 is another time chart of the data processing unit;

FIG. 45 is an explanatory view in which the data strings are different between an active system and a standby system;

FIG. 46 is an explanatory view in which the frame phases are different between an active system and a standby system; and FIG. 47 explains a conventional radio equipment in which the stuffing bit phases are different between an active system and a standby system.

DESCRIPTION OF THE PREFERRED EMBODIMENTS (A) Radio equipment which makes the signal phases of an active radio transmitter and a standby radio transmitter coincident with each other (a) Schematic explanation of the radio equipment In FIG. 1, the reference numeral 32 represents a transmitting data processing unit for assembling input data in the form of a frame and inputting a clock signal and a frame data signal to each of the radio transmitters, 33 a radio transmitter of redundant structure which is composed of an active radio transmitter 33a and a standby radio transmitter 33b, 34 a high-frequency signal switch for selecting and outputting a high-frequency signal output from the active radio transmitter 33a, 36 a transmitting and receiving portion for transmitting the high-frequency signal output from the high-frequency signal switch 34 to other radio equipment which is referred to as a called station equipment hereinafter and receiving a high-frequency signal which is transmitted from the called station, 44 a radio receiver of redundant structure which is composed of an active radio receiver 44a and a standby radio receiver 44b, 45 a received data processing unit for receiving a frame data signal and a clock signal demodulated by the two radio receivers and deframing and outputting a frame data signal supplied from the active radio receiver 44a, and 51 a signal route generator for selecting a high-frequency frequency signal output from each of the active radio transmitter 33a and the standby radio transmitter 33b and inputting the high-frequency signal to the standby radio receiver 44b so as to generate a signal route for adjusting the delay time of the corresponding radio transmitter 33a (33b). The signal route generator 51 includes a selecting portion 51a for selecting a high-frequency signal output from the active radio transmitter 33a or a high-frequency signal output from the standby radio transmitter 33b, and switches 51b, 51c for inputting the selected high-frequency signal to the standby radio receiver.

Figure 1:
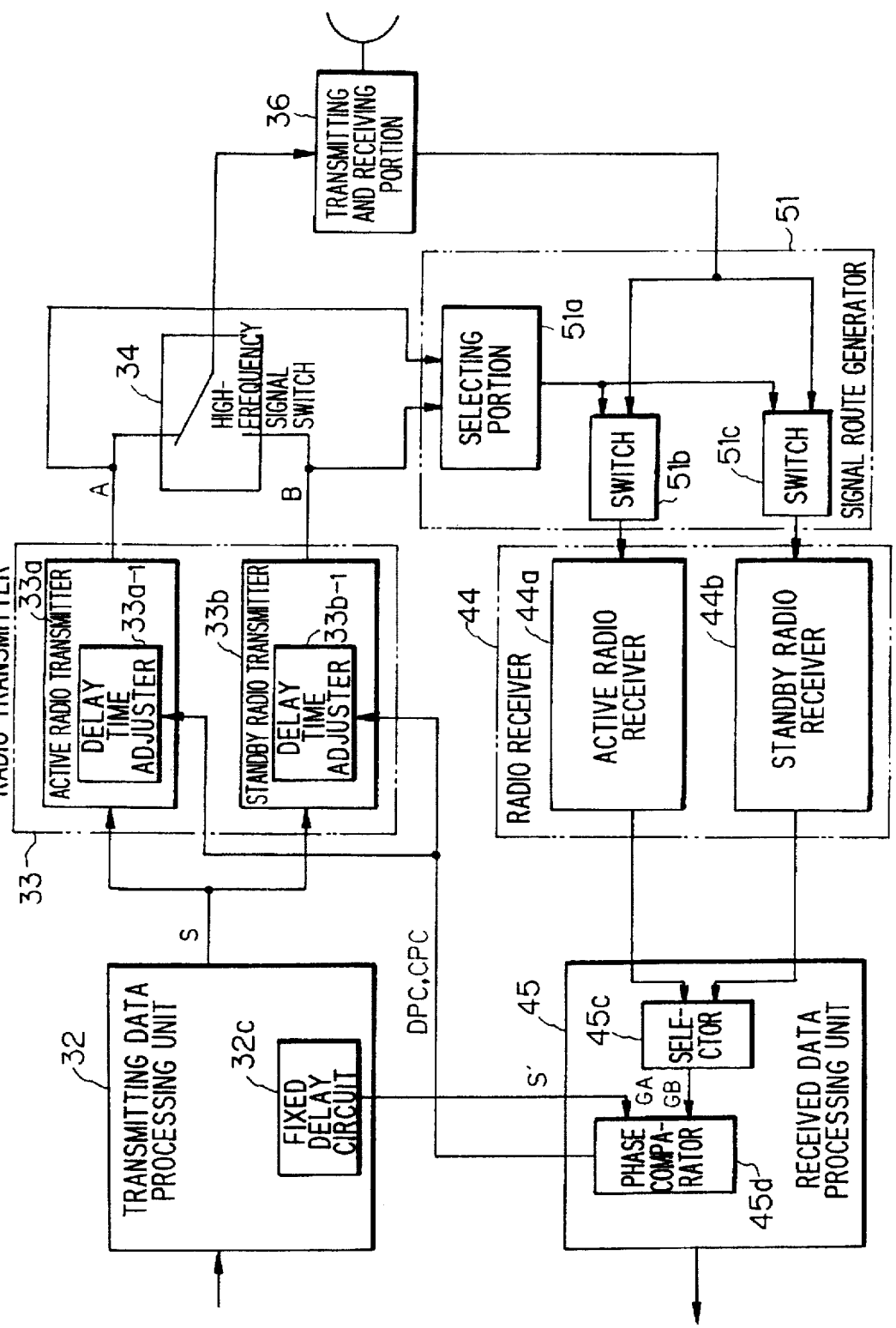
FIG. 1 is a schematic explanatory view of a radio equipment which makes the signal phases of an active radio transmitter and a standby radio transmitter coincident with each other according to the present invention.

The reference numeral 32c represents a fixed delay circuit which is provided in the data processing unit 32 so as to delay a frame data signal and a clock signal which are to be supplied to the radio transmitter 33 by a predetermined time and send these delayed signals to the received data processing unit 45. The reference numeral 45c represents a selector provided in the received data processing unit 45 so as to select a signal output from the standby radio receiver 44b, 45d a phase comparator for comparing the phases of the frame data signal and the clock signal which are received from the standby radio receiver 44b and the phases of the frame data signal and the clock signal which are directly received from the fixed delay circuit 32c in the transmitting data processing unit 32, and outputting a signal DPC indicating the coincidence/discordance of the data phase and a signal CPC indicating the coincidence/discordance of the clock phase. The reference numerals 33a-1, 33b-1 represent delay time adjusters provided in the active radio transmitter 33a and the standby radio transmitter 33b, respectively, so as to adjust the phases of the clock signal and the frame data signal so that both the phases of the two clock signals and the phases of the two frame data signals are coincident with each other.

The signal route generator 51 generates a signal route for adjusting a delay time by which a high-frequency signal output from the active radio transmitter 33a is selected and input to the standby radio receiver 44b. In this state, the fixed delay circuit 32c provided in the transmitting data processing unit 32 delays a frame data signal and a clock signal which are to be supplied to the radio transmitter group 33 by a predetermined time Td and inputs these signals to the phase comparator 45d of the received data processing unit 45. The selector 45c inputs the data signal and the clock signal which are input from the active radio transmitter 33a via the signal route generator 51 and the standby radio receiver 44b (this route will be referred to as "route A" hereinafter) to the phase comparator 45d. The phase comparator 45d compares the phases of the frame data signal and the clock signal which are received from the standby radio receiver 44b with the phases of the frame data signal and the clock signal which are directly received from the transmitting data processing unit 32, and inputs the signal DPC indicating the coincidence/discordance of the data phase and the signal CPC indicating the coincidence/discordance of the clock phase to the delay time adjuster 33a-1 of the active radio transmitter 33a. The delay time adjuster 33a-1 adjusts the phases of the clock signal and the data input from the data processing unit 32 so that both the phases of the two clock signals and the phases of the two items of data are coincident with each other in the phase comparator 45d.

FIG. 2A shows the phases of the data and the clock signal at the output point S of the transmitting data processing unit 32, and FIG. 2B shows the phases of the data and the clock signal at the point GA (the output point of the selector 45c) on the route A after adjusting the delay time. The phases of the data and the clock signal in FIG. 2B are coincident with the phases of the data and the clock signal at the output point S' of the fixed delay circuit 32c, respectively.

The signal route generator 51 then generates a signal route for adjusting a delay time by which a high-frequency signal is output from the standby radio transmitter 33b and input to the standby radio receiver 44b. In this state, the fixed delay circuit 32c provided in the transmitting data processing unit 32 delays a frame data signal and a clock signal which are to be supplied to the radio transmitter 33 by a predetermined time Td and inputs these signals to the phase comparator 45d of the received data processing unit 45 in the same way as described above. The selector 45c inputs the data signal and the clock signal which are input from the standby radio transmitter 33b via the signal route generator 51 and the standby radio receiver 44b (this route will be referred to as "route B" hereinafter) to the phase comparator 45d. The phase comparator 45d compares the phases of the frame data signal and the clock signal which are received from the standby radio receiver 44b and the phases of the frame data signal and the clock signal which are directly received from the transmitting data processing unit 32, and inputs the signal DPC indicating the coincidence/discordance of the data phase and the signal CPC indicating the coincidence/ discordance of the clock phase to the delay time adjuster 33b-1 of the standby radio transmitter 33b. The delay time adjuster 33b-1 adjusts the phases of the clock signal and the data input from the data processing unit 32 so that both the phases of the two clock signals and the phases of the two items of data are coincident with each other in the phase comparator 45d.

FIG. 2C shows the phases of the data and the clock signal at the point GB (the output point of the selector 45c) on the route B before adjusting a delay time, and FIG. 2D shows the phases of the data and the clock signal at the point GB on the route B after adjusting the delay time, wherein the phases of the data and the clock signal are coincident with the phases of the data and the clock signal, respectively, at the output point S' of the fixed delay circuit 32c. That is, the above-described adjustment enables the phases of the data and the clock signal at the points A and B coincident with each other.

In this manner, it is possible to make the delay times, namely, the signal phase of an active radio transmitter coincident with that of a standby radio transmitter by a simple structure without using a measuring machine or a measuring system. In addition, it is possible to automatically make the signal phase of an active radio transmitter coincident with that of a standby radio transmitter during the operation of a radio equipment.

The following modification is possible. When the phases of the frame data signal and the clock signal received from the active radio transmitter 33a via the signal route A are different from those of the frame data signal and the clock signal directly received from the transmitting data processing unit 32, the fixed delay circuit 32c provided in the transmitting data processing unit 32 adjusts the delay time Td so that both the phases of the two frame data signals and the two clock signals are coincident with each other without using the delay time adjuster 33a-1. Thereafter, when the phases of the frame data signal and the clock signal received from the standby radio transmitter 33b via the signal route B are different from those of the frame data signal and the clock signal received from the transmitting data processing unit 32 via the fixed delay circuit 32c, the delay time adjuster 33b-1 provided in the standby radio transmitter 33b adjusts the delay time so that both the phases of the two frame data signals and the two clock signals are coincident with each other. In this manner, it is also possible to make the delay time, namely, the signal phase of an active radio transmitter coincident with that of a standby radio transmitter by a simple structure without using a measuring machine or a measuring system. In addition, it is possible to automatically make the signal phase of an active radio transmitter coincident with that of a standby radio transmitter during the operation of a radio equipment.

Furthermore, when the difference in the delay time between high-frequency transmitters in the active and standby radio transmitters 33a, 33b is small, the signals output from modulators of the active and standby radio transmitter 33a, 33b are input to a demodulator of the standby radio receiver 44b, thereby generating a signal route for adjusting a delay time. When the difference in the delay time between the active and standby radio transmitters is mainly generated in the modulators MOD and the difference in the delay time between the active and standby high-frequency transmitter TX is small, the signal route of this structure produces a similar effect.

(b) First embodiment
(b-1) Entire structure

Figure 3:
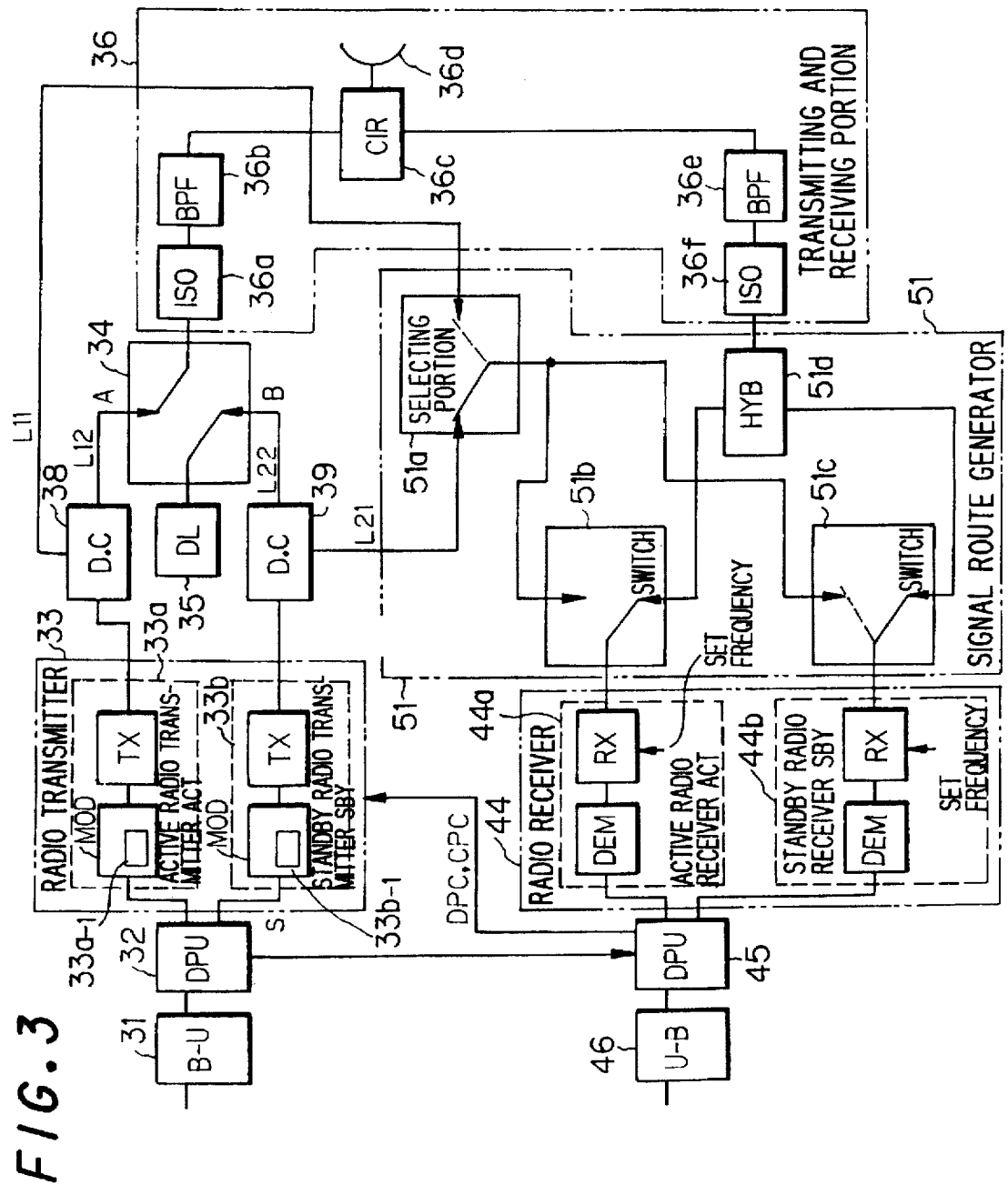
FIG. 3 show the structure of a first embodiment of the radio equipment according to the present invention shown in FIG. 1.

FIG. 3 shows the entire structure of a first embodiment of a radio equipment which makes the signal phases of an active radio transmitter and a standby radio transmitter coincident with each other according to the present invention.

The reference numeral 31 represents a B-U converter for converting a bipolar signal input from a multiplexer MPX into a unipolar signal, 32 a transmitting data processing unit which assembles and outputs the input data in the form of a frame, 33 a radio transmitter having a duplicate structure, and 33a an active radio transmitter ACT, 33b a standby radio transmitter SBY. When there is a trouble in the active radio transmitter 33a, the standby radio transmitter 33b is used as an active transmitter, and the active transmitter having the trouble is repaired and used as a standby transmitter thereafter. The active and standby radio transmitters 33a, 33b have the same structure, and are provided with a modulator MOD for modulating input data (e.g., 4-PSK modulation), and a high-frequency transmitter TX for converting the modulated wave into a radio frequency, amplifying the power and outputting the high-frequency signal (radio signal). Each modulator MOD is provided with a delay time adjuster 33a-1 (33b-1) for adjusting a delay time.

The reference numeral 34 represents a high-frequency signal switch for selecting a high-frequency signal from the active radio transmitter 33a (the radio transmitter 33b sometimes serves as the active radio transmitter), and outputting the signal to an antenna. The high-frequency signal switch 34 also inputs a high-frequency signal from the standby radio transmitter 33b to a terminating resistance 35 so as to terminate it. The reference numeral 36 denotes a transmitting and receiving portion for transmitting a high-frequency signal output from the high-frequency signal switch 34 to a called station and receiving a high-frequency signal which is transmitted from the called station and inputting it to the active radio receiver 44a and the standby radio receiver 44b. The reference numeral 36a, 36f represent isolators, 36b, 36e bandpass filters, 36c a circulator, and 36d an antenna. The reference numerals 38, 39 denote directional couplers. The directional coupler 38 monitors a high-frequency signal output from the active radio transmitter 33a, outputs a part (signal with an attenuation of about 20 dB) thereof to a line L11, and a signal with an attenuation of about 1 dB to a line L12. The directional coupler 39 monitors a high-frequency signal output from the standby radio transmitter 33b, outputs a part (signal with an attenuation of about 20 dB) thereof to a line L21, and a signal with an attenuation of about 1 dB to a line L22.

The reference numeral 44 represents a redundant radio receiver, 44a an active radio receiver ACT, and 44b a standby radio receiver SBY. When there is a trouble in the active radio receiver 44a, the standby receiver 44b is used as an active receiver, and the active receiver having the trouble is repaired and used as a standby receiver thereafter. The active and standby radio receivers 44a, 44b have the same structure, and are provided with a high-frequency receiver RX for amplifying the power of a reception signal, converting the frequency of the reception signal into an intermediate frequency and outputting it, and a demodulator DEM for demodulating an intermediate-frequency signal into the input data (e.g., 4-PSK demodulation). The transmission frequency fs and the reception frequency fr are different, and the high-frequency receiver RX of each of the radio receivers 44a, 44b ordinarily receives a signal having the transmission frequency fr from the called station and converts it into an intermediate-frequency signal. A received data processing unit 45 executes phase difference comparison, deframing and other processing, and a U-B converter 46 converts a unipolar signal into a bipolar signal and inputs it to a demultiplexer DMPX (not shown).

The reference numeral 51 represents a signal route generator for generating a signal route for adjusting a delay time of the radio transmitter 33 by which high-frequency signals output from the active radio transmitter 33a and the standby radio transmitter 33b are selected via the lines L11, L21 and input to the standby radio receiver 44b (the radio receiver 44a sometimes serves as the standby radio receiver). In the signal route generator 51, the reference numeral 51a denotes a selecting portion for selecting a high-frequency signal output from the active radio transmitter 33a or a high-frequency signal output from the standby radio transmitter 33b, 51b and 51c switches for inputting the selected high-frequency signal to the standby radio receiver (the radio receiver 44a sometimes serves as the standby radio receiver), and 51d a hybrid circuit for branching the signal transmitted from the called station into two signal components. The switch 51b inputs the reception signal output from the hybrid circuit 51d to the active radio receiver 44a and the switch 51c inputs the reception signal output from the selecting portion 51a to the standby radio receiver 44b.

(b-2) Data processing unit

Figure 4:
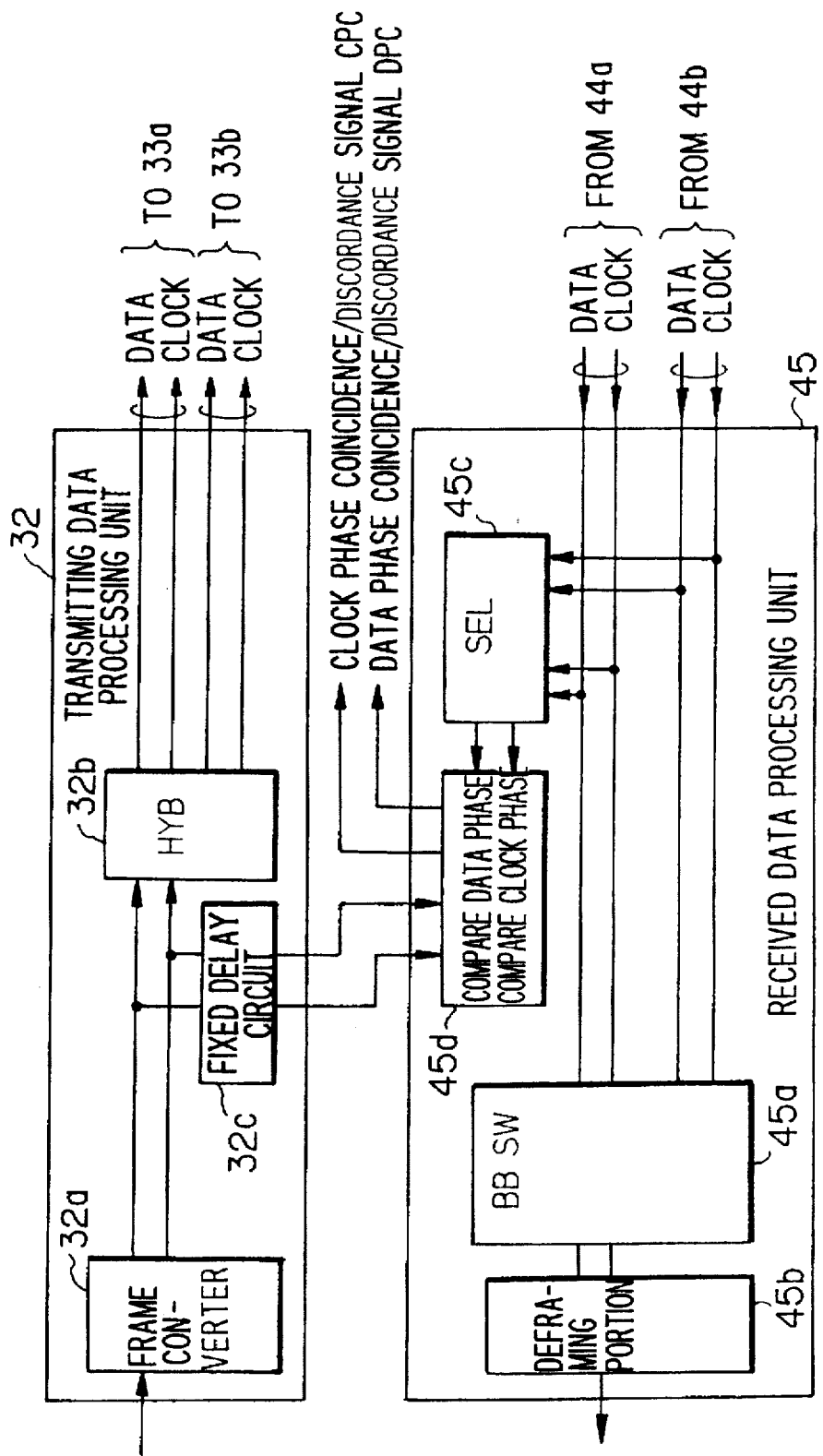
FIG. 4 shows the structure of the transmitting data processing unit and the received data processing unit in the embodiment shown in FIG. 3

FIG. 4 shows the structure of the transmitting data processing unit 32 and the received data processing unit 45, wherein only the portions related to the present invention are shown. In the transmitting data processing unit 32, the reference numeral 32a represents a frame converter for converting input data into a frame, 32b a hybrid circuit for branching a frame data signal and a clock signal into two signal components and outputting them to the active radio transmitter ACT 33a and the standby radio transmitter SBY 33b, and 32c a fixed delay circuit for delaying a frame data signal and a clock signal by a predetermined time Td and inputting these signals to the received data processing unit 45. In the received data processing unit 45, the reference numeral 45a represents a switching portion for receiving a frame data signal and a clock signal from each of the active radio receiver ACT 44a and the standby radio receiver SBY 44b and selecting and outputting the frame data signal and the clock signal from the active radio receiver 44a, 45b a deframing portion for analyzing a frame data signal and converting it into ordinary multiplex data, and extracting control information and inputting it to a supervisory controller (not shown), 45c a selector for selecting and outputting the frame data signal and the clock signal from the standby radio receiver 44b at the time of adjusting a delay time difference, and 45d a phase comparator. The phase comparator 45d (1) compares the phase of the frame data signal input from the standby radio receiver 44b with the phase of the frame data signal input from the fixed delay circuit 32c in the transmitting data processing unit 32, and (2) compares the phase of the clock signal input from the standby radio receiver 44b with the phase of the clock signal input from the fixed delay circuit 32c in the transmitting data processing unit 32.

(b-3) Structure of phase comparator

Figure 5:
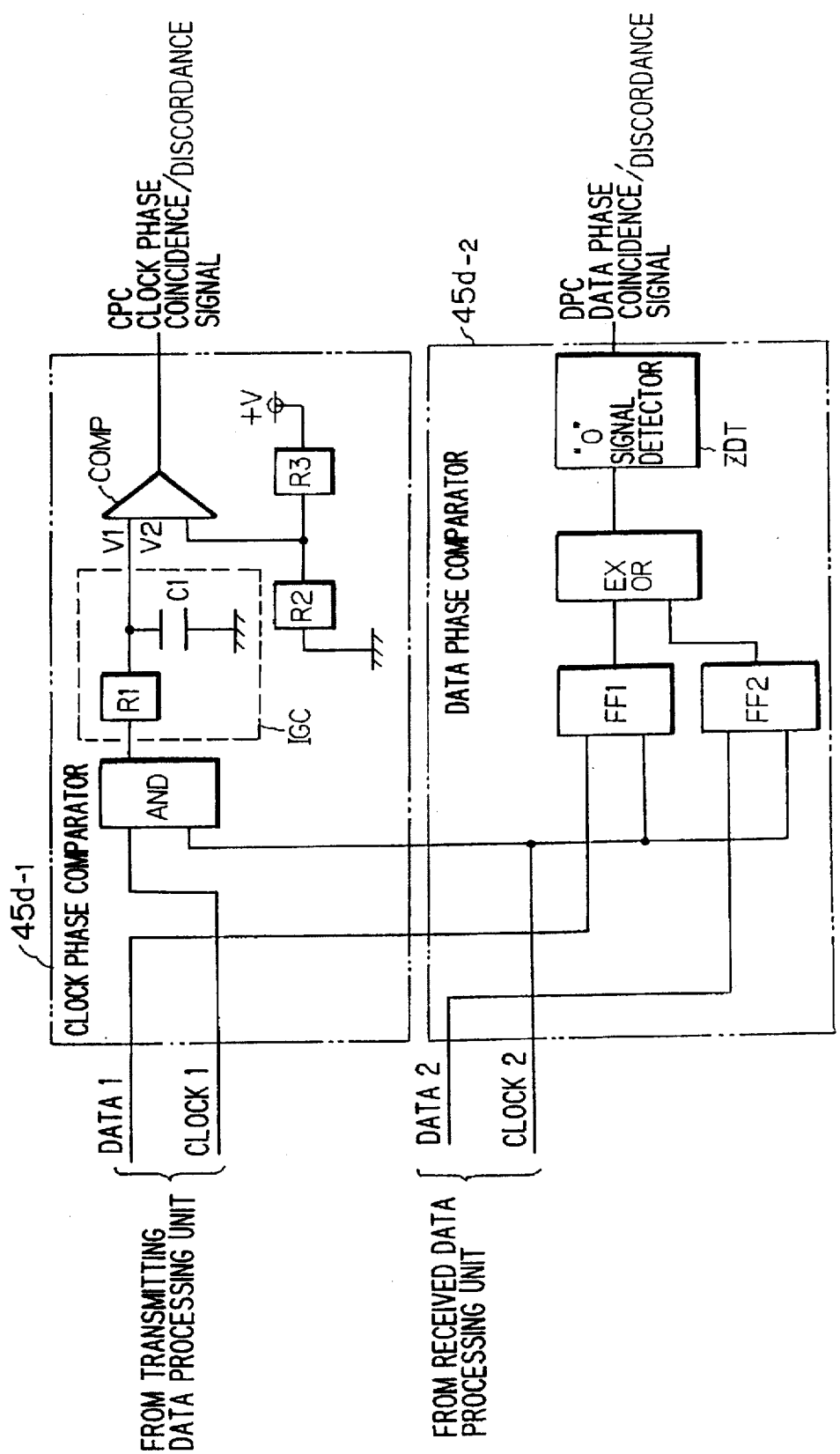
FIG. 5 shows the structure of the phase comparator in the embodiment.

FIG. 5 shows the structure of the phase comparator 45d, wherein the reference numeral 45d-1 denotes a clock phase comparator and 45d-2 a data phase comparator for a frame data signal. In the clock phase comparator 45d-1, the symbol AND denotes an AND gate, R1 to R3 resistors, C1 a capacitor, and COMP a voltage comparator. The resistor R1 and the capacitor C1 constitute an integrator IGC, and the resistors R2 and R3 constitute a reference voltage generator.

Figure 6:
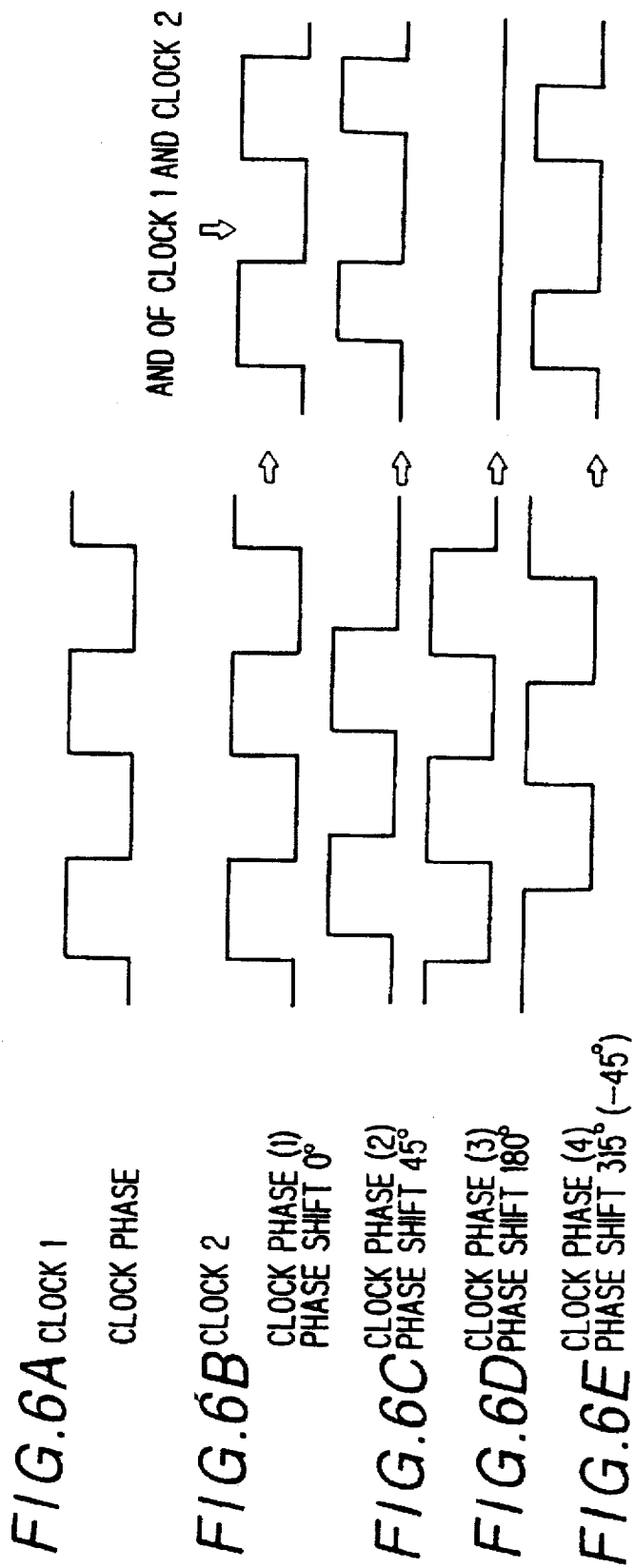
FIG. 6 shows a wave form for explaining the operation of the clock phase comparator in the embodiment.

The AND gate calculates the AND of a clock 1 and a clock 2, and the integrator IGC integrates the output of the AND gate. As shown in FIG. 6, the smaller the phase difference of the clock 1 and the clock 2, the larger the overlapping portion of the clocks 1, 2, so that the larger the output voltage V1 of the integrator IGC becomes. In order to limit the clock phase difference to not more than ±45°, the reference voltage V2 output from the reference voltage generator is set to be equal to the output voltage V1 of the integrator IGC when the clock phase is ±45°. The voltage comparator COMP outputs a low-level signal (phase discordance signal) when V1<V2, while outputting a high-level signal (phase coincidence signal) when V1>V2. In this manner, it is possible to judge whether or not the phase shift between the clocks 1 and 2 is not more than 45°.

In the data phase comparator 45d-2, the symbols FF1, FF2 denote flip-flops for setting/resetting the data 1 and 2, respectively, by a common clock 2, EXOR an exclusive OR gate for calculating the exclusive OR of the set output signals of the flip-flops FF1 and FF2, and ZDT a "0" signal detector. If the phase shift is suppressed to not more than ±90° by comparison and adjustment of the clock phases, it is possible to read data 1, 2 at the clock 1 or 2. Therefore, the data 1, 2 are set/reset in the flip-flops FF1, FF2 at the clock 2, and calculates the exclusive OR of the set signals of the flip-flops FF1, FF2. If the data 1 and 2 are coincident, "0" is output, and if they are discordant, "1" is output.

The "0" signal detector ZDT counts the number of continuous "0" signals, and if the number is smaller than a bit number which is preset as the data phase coincidence, the "0" signal detector ZDT outputs a low-level signal (phase discordance signal), while outputting a high-level signal (phase coincidence signal) when the number is larger than the preset bit number. In this manner, it is possible to judge the coincidence or discordance of the phases of the data 1 and 2.

(b-4) Structure of delay time adjuster

Figure 7:
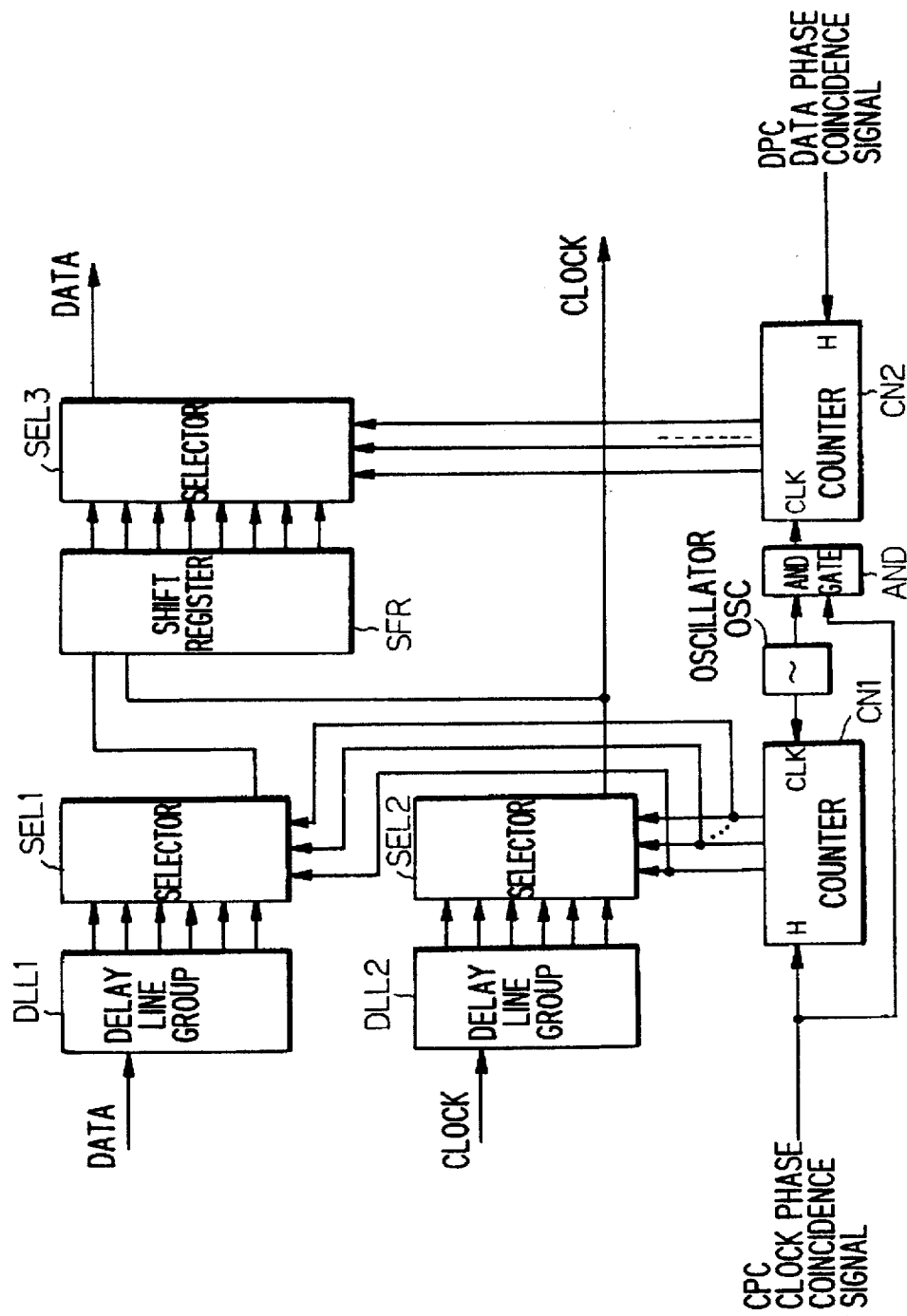
FIG. 7 shows the structure of the delay time adjusting circuit in the embodiment.

FIG. 7 shows the structure of the delay time adjuster 33a-1 (33b-1) provided in the modulator MOD on the radio transmitter 33a (33b).

The symbol DLL1 represents a first delay line group provided with a plurality of delay lines which have different delay times and to which data are input, DLL2 a second delay line group provided with a plurality of delay lines which have different delay times and to which clock signals are input, and OSC an oscillator which oscillates at a predetermined frequency. The symbol CN1 denotes a first counter which counts the number of pulses output from the oscillator OSC when the clock phases are discordant (when the signal CPC is a low-level signal), while stopping the pulse counting operation and holding the count when the clock phases are coincident (when the signal CPC is a high-level signal). The symbol AND denotes an AND gate for outputting a pulse from the oscillator OSC when the clock phases are coincident, and CN2 a second counter which counts the number of pulses output from the oscillator OSC when the data phase are discordant (when the signal DPC is a low-level signal), while stopping the pulse counting operation and holding the count when the clock phases are coincident (when the signal DPC is a high-level signal). The symbols SEL1, SEL2 represent first and second selectors each for selecting the delay line output corresponding to the count of the first counter CN1, SER a shift resistor of n bits for delaying the data input from the first selector SEL1 by 1 bit in accordance with the clock signal input from the second selector SEL2, and SEL3 a third selector for selecting and outputting the data from the bits of the shift register which corresponds to the count of the second counter CN2.

When the clock phase discordance signal (CPC=low-level signal) is output from the clock phase comparator 45d-1, the low-level signal CPC is input to the hold terminal H of the first counter CN1, and the first counter CN1 counts the pulses from the oscillator OSC, so that the count of the counter CN1 changes. The first and second selectors SEL1, SEL2 select a delay signal from the delay line groups DLL1 and DLL2 and, as a result, the delay time changes. The clock phase is compared again with the signal having this delay time and the same operation is repeated until the clock phases become coincident. When the clock phases are coincident, a high-level signal CPC is input to the hold terminal H, and the first counter CN1 stops the operation of counting the pulses from the oscillator OSC and holds the current count.

When the clock phases are coincident, the high-level signal CPC is input to the AND gate, and a pulse output from the oscillator OSC is input to the second counter CN2. When the data phase discordance signal (DPC=low-level signal) is output from the data phase comparator 45d-2, the low-level signal DPC is input to the hold terminal H of the second counter CN2, and the second counter CN2 counts the pulses from the oscillator OSC, so that the count of the counter CN2 changes. The third selector SEL3 selects a signal from the predetermined bit of the shift resister SFR and, as a result, the delay time changes in the order of 1 bit. The data phase is compared again with the signal having this delay time and the same operation is repeated until the data phases become coincident. When the data phases are coincident, a high-level signal DPC is input to the hold terminal H, and the second counter CN2 stops the operation of counting the pulses from the oscillator OSC and holds the current count.

(b-5) Delay time adjusting operation

At the time of adjusting a delay time, the signal route generator 51 (FIG. 3) switches the selecting portion 51a and the switch 51c as indicated by the broken lines. The reception frequency fr of the high-frequency receiver RX in the standby radio receiver 44b is made coincident with the transmission frequency fs.

In this manner, a part of the high-frequency signal output from the active radio transmitter 33a is input from the directional coupler 38 to the standby radio receiver 44b via the line L11, the selecting portion 51a and the switch 51c, and the standby radio receiver 44b receives the high-frequency signal and outputs it to the received data processing unit 45. The selector 45c (see FIG. 4) of the received data processing unit 45 selects the frame data signal and the clock signal input from the standby radio receiver 44b and inputs them to the phase comparator 45d.

The fixed delay circuit 32c provided in the transmitting data processing unit 32 delays the frame data signal and the clock signal which are to be supplied to the radio transmitter group 33 by a predetermined time Td and inputs them to the phase comparator 45d of the received data processing unit 45.

The phase comparator 45d compares the phases of the frame data signal and the clock signal which are input from the active radio transmitter 33a via the signal route generator 51 and the standby radio receiver 44b (route A) with the phases of the frame data signal and the clock signal which are directly received from the transmitting data processing unit 32, and inputs the signal DPC indicating the coincidence/discordance of the data phase and the signal CPC indicating the coincidence/discordance of the clock phase to the delay time adjuster 33a-1 of the active radio transmitter 33 a.

The delay time adjuster 33a-1 delays the frame data signal and the clock signal input from the transmitting data processing unit 32 so that both the phases of the two clock signals and the phases of the two frame data signals are coincident with each other in the phase comparator 45d. This operation is repeated until the clock phases and the data phases become coincident with each other.

The signal route generator 51 then switches the selecting portion as indicated by the solid line, and the switch 51c as indicated by the broken line. As a result, a part of the high-frequency signal output from the standby radio transmitter 33b is input from the directional coupler 39 to the standby radio receiver 44b via the line L21, the selecting portion 51a and the switch 51c, and the standby radio receiver 44b receives the high-frequency signal and outputs it to the received data processing unit 45. The selector 45c (see FIG. 4) selects the frame data signal and the clock signal input from the standby radio receiver 44b and inputs them to the phase comparator 45d.

The fixed delay circuit 32c provided in the transmitting data processing unit 32 delays the frame data signal and the clock signal which are transmitted to the radio transmitter 33 by a predetermined time Td and inputs them to the phase comparator 45d of the received data processing unit 45.

The phase comparator 45d compares the phases of the frame data signal and the clock signal which are input from the standby radio transmitter 3b via the signal route generator 51 and the standby radio receiver 44b (route B) with the phases of the frame data signal and the clock signal which are directly received from the transmitting data processing unit 32, and inputs the signal DPC indicating the coincidence/discordance of the data phase and the signal CPC indicating the coincidence/discordance of the clock phase to the delay time adjuster 33b-1 of the standby radio transmitter 33b.

The delay time adjuster 33b-1 delays the frame data signal and the clock signal input from the transmitting data processing unit 32 so that both the phases of the two clock signals and the phases of the two frame data signals are coincident with each other in the phase comparator 45d. This operation is repeated until the clock phases and the data phases become coincident with each other. In this manner the delay time difference between the radio transmitters 33a and 33b is cancelled.

(b-6) Modification of delay time adjusting operation

In the above example, the fixed delay circuit 32c in the transmitting data processing unit 32 delays the frame data signal and the clock signal by a predetermined time Td and the delay time adjusters 33a-1, 33b-1 in the active radio transmitter 33a and the standby radio transmitter 33b adjust the delay time. Alternatively, the delay time may be adjusted by the transmitting data processing unit 32.

Figure 8:
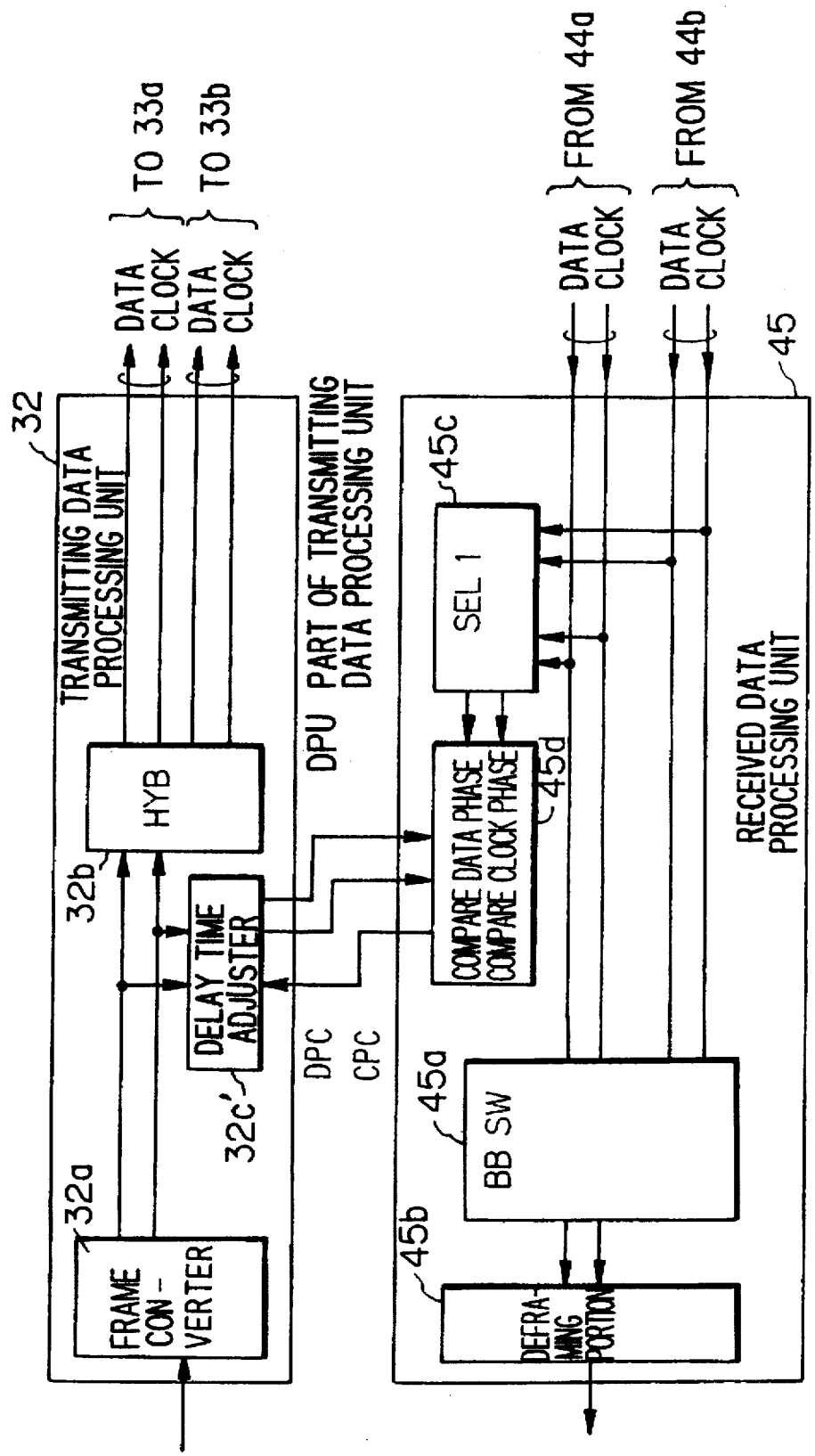
FIG. 8 shows the structures of a modification of the transmitting data processing unit and the received data processing unit shown in FIG. 4.

FIG. 8 shows the another structure of the transmitting data processing unit and the received data processing unit. The same numerals are provided for the elements which are the same as those in the first embodiment shown in FIG. 4. This modification is different from the embodiment shown in FIG. 4 in that a delay time adjuster 32c ' which can freely adjust the delay time is provided in place of the fixed delay circuit 32c. The delay time adjuster 32c ' has the structure shown in FIG. 7.

The delay time is adjusted as follows. The phase comparator 45d compares the phases of the frame data signal and the clock signal which are received from the active radio transmitter 33a via the route A with the phases of the frame data signal and the clock signal which are received from the transmitting data processing unit 32 via the delay time adjuster 32c '. When the data phases and the clock phases are different, the phase comparator 45d inputs the low-level signals DPC, CPC to the delay time adjuster 32c'. The delay time adjuster 32c ' adjusts the delay time so that the phases of the frame data signals and the clock signals are coincident with each other. By repeating this operation, the data phases and the clock phases become finally coincident.

The phase comparator 45d then compares the phases of the frame data signal and the clock signal which are received from the standby radio transmitter 33b via the route B with the phases of the frame data signal and the clock signal which are received from the transmitting data processing unit 32 via the delay time adjuster 32c'. When the data phases and the clock phases are different, the phase comparator 45d inputs the low-level signals DPC, CPC to the delay time adjuster 33b-1 provided in the standby radio transmitter 33b. The delay time adjuster 33b-1 adjusts the delay time so that the phases of the frame data signals and the clock signals are coincident with each other. By repeating this operation, the data phases and the clock phases become finally coincident, and the delay time difference between the radio transmitters 33a and 33b becomes zero.

(c) Second embodiment

Figure 9:
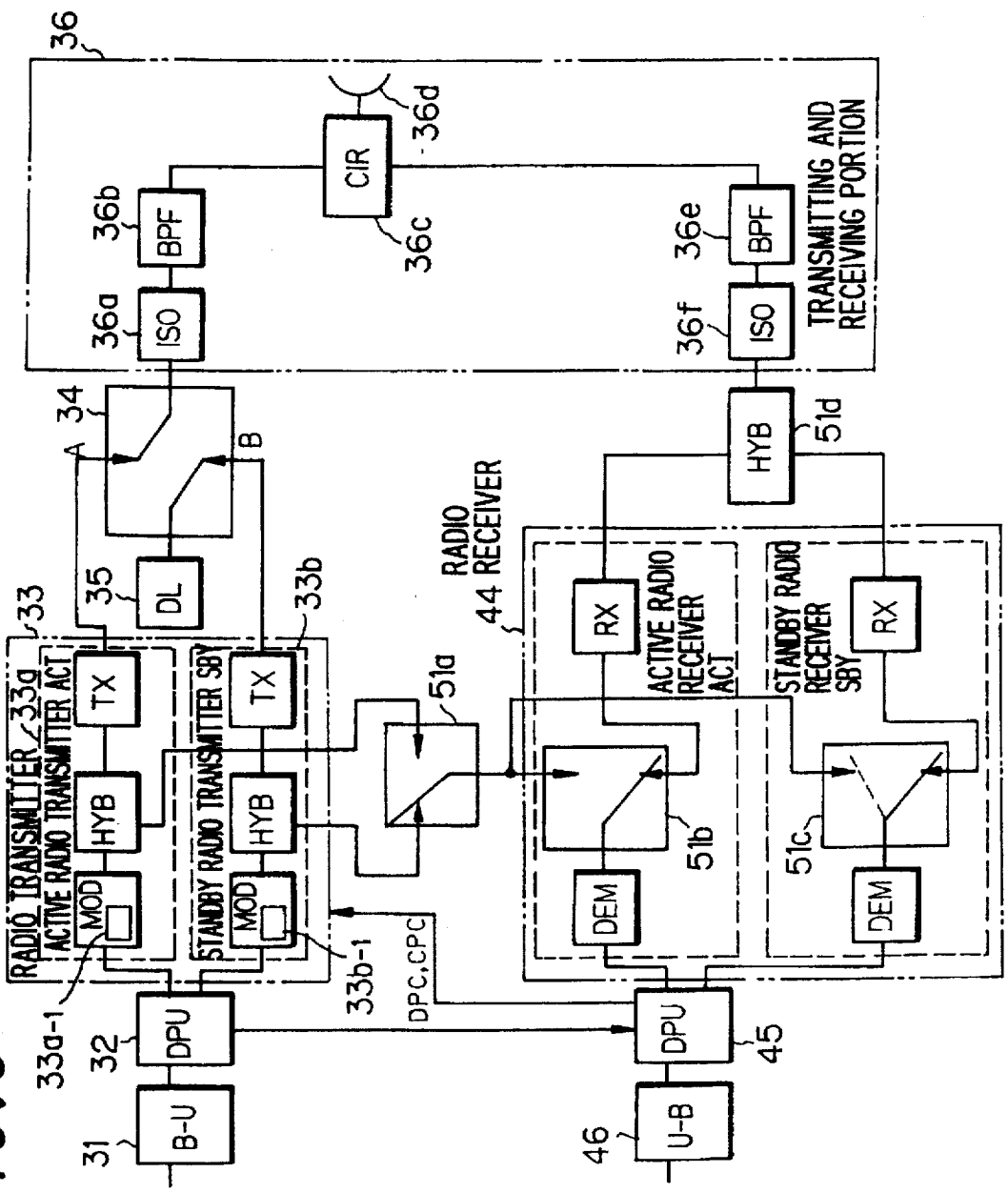
FIG. 9 show the structure of a second embodiment of the radio equipment according to the present invention shown in FIG. 1.

FIG. 9 shows the entire structure of a second embodiment of the radio equipment according to the present invention shown in FIG. 1. The same numerals are provided for the elements which are the same as those in the first embodiment shown in FIG. 3. This embodiment is different from the first embodiment in the following points.

(1) The directional couplers 38, 39 in the first embodiments are removed and a hybrid circuit HYB for branching a modulation signal (intermediate-frequency signal) is provided between the modulator MOD and the high-frequency transmitter TX in the active radio transmitter 33a and the standby radio transmitter 33b.

(2) A first output of the hybrid circuit HYB is input to the high-frequency transmitter TX and a second output is input to the selecting portion 51a.

(3) The switches 51b, 51c of the signal route generator 51 for generating a signal route for adjusting a delay time are disposed between the high-frequency receiver RX and the demodulator DEM in the active radio receiver 44a and the standby radio receiver 44b, respectively.

When the delay time difference in the radio transmitter 33 is mainly generated in the modulator MOD and the delay time difference in the high-frequency transmitter TX is small, it is not necessary to transmit the output of the radio transmitter 33, and it is sufficient to transmit an intermediate-frequency signal, which is the output of the modulator MOD.

Consequently, in the second embodiment, the signal route generator consisting of the selecting portion 51a and the switches 51b and 51c appropriately selects the output signal from the modulators MOD in the active radio transmitter 33a and the standby radio transmitter 33b, and transmits it to the demodulator DEM of the standby radio receiver 44b. Thereafter, the delay time is adjusted by the method explained in the first embodiment or the modification of the first embodiment.

When the delay time difference in the transmitter is small, even if the signal route is generated in the above-described manner, the same effect as in the first embodiment is obtained.

(d) Third embodiment

Figure 10:
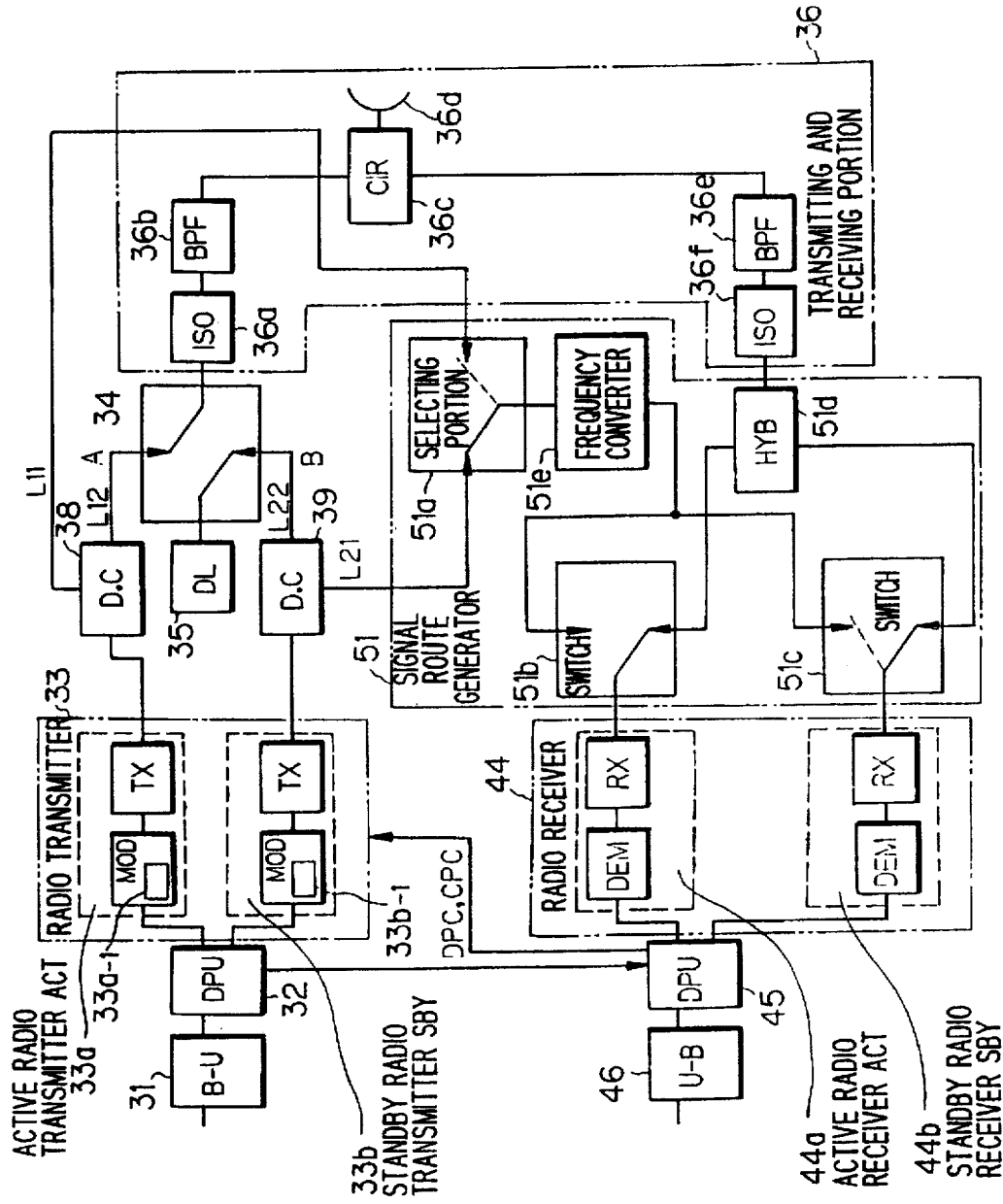
FIG. 10 show the structure of a third embodiment of the radio equipment according to the present invention shown in FIG. 1.

FIG. 10 shows the structure of a third embodiment of a radio equipment according to the present invention shown in FIG. 1. The same numerals are provided for the elements which are the same as those in the first embodiment shown in FIG. 3. This embodiment is the same as the first embodiment except that (1) a frequency converter 51e for converting the transmission frequency fs into the reception frequency fr is provided in the signal route generator 51, and that (2) the signal of the I-channel and the signal of the Q-channel are replaced by each other in the demodulator DEM.

In the first embodiment, the high-frequency receiver RX receives the signal of the transmission frequency fs and converts the signal into an intermediate-frequency signal by a synthesizer. In the third embodiment, however, since the frequency converter 51e is provided, the standby radio receiver 44b constantly receives the reception frequency fr.

Figure 11:
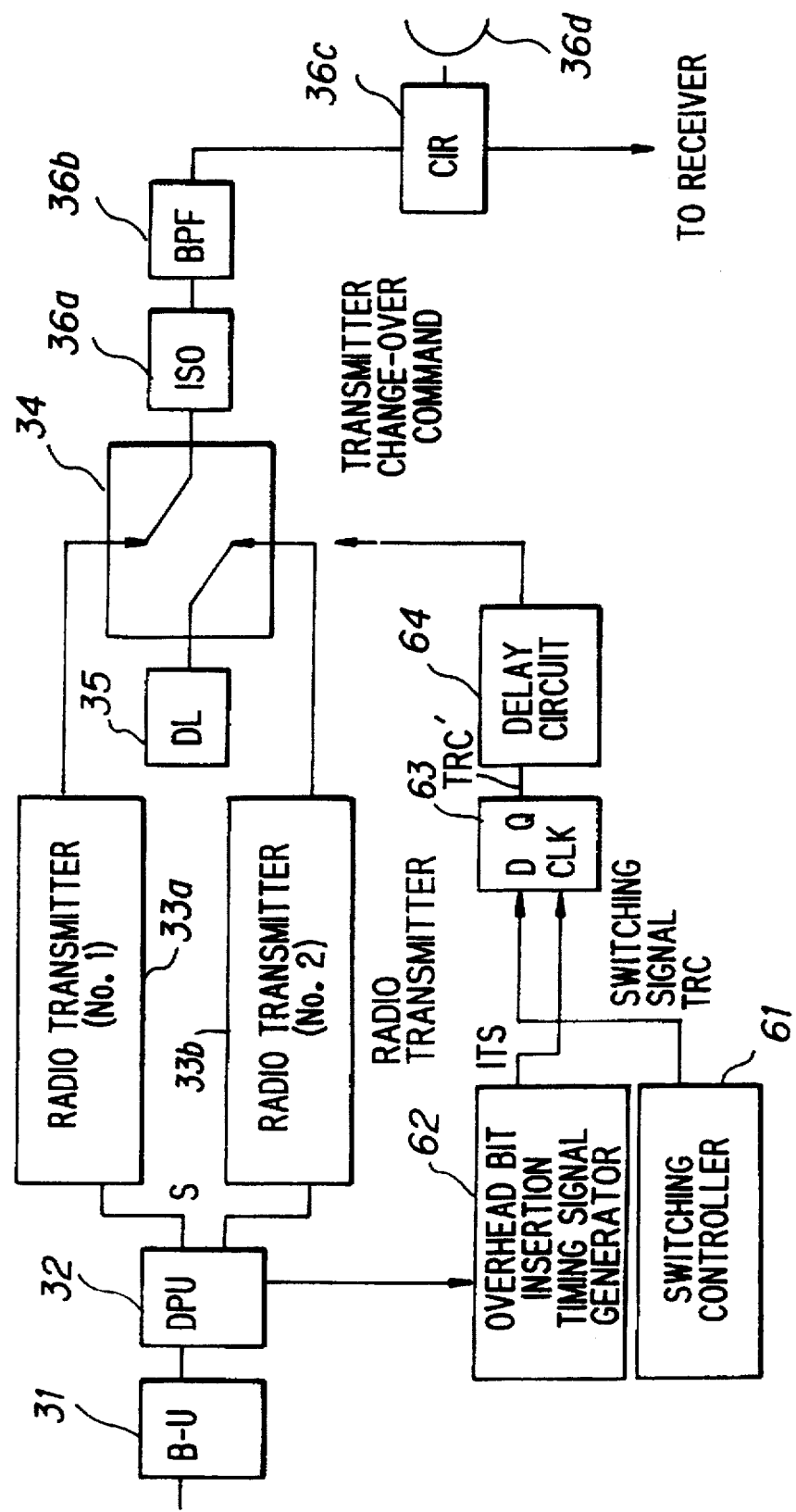
FIG. 11 is a schematic explanatory view of a radio equipment which prevents a bit error due to a switching time according to the present invention.

(B) Radio equipment which prevents a bit error due to a switching time (a) Schematic explanation of the radio equipment FIG. 11 is a schematic explanatory view of a radio equipment which prevents a bit error due to a switching time according to the present invention. The reference numeral 31 represents a B-U converter for converting a bipolar signal into a unipolar signal, 32 a data processing unit which inserts an overhead bit into input data and outputs the data, 33a and 33b first and second radio transmitters for modulating the data input from the data processing unit 32, converting the modulated wave into a radio frequency and outputting the data, and 34 a high-frequency signal switch for selecting and outputting a high-frequency signal from one (active) radio transmitter 33a. The high-frequency signal switch 34 also inputs a high-frequency signal from the other (standby) radio transmitter 33b to a terminating resistance 35 so as to terminate it. The reference numeral 36a represents an isolator, 36b a bandpass filter for passing a signal component in a radio frequency band therethrough, 36c a circulator, and 36d an antenna.

The reference numeral 61 denotes a switching controller for outputting a signal TRC for instructing the radio transmitters 33a and 33b to be switched, 62 an overhead bit insertion timing generator for outputting an insertion timing signal ITS for a control bit (overhead bit), 63 a flip-flop for outputting a switching signal TRC' in synchronism with the overhead bit insertion timing, and 64 a delay circuit for delaying the switching signal TRC' which is output from the flip-flop 63 by the time which it takes the overhead bit inserted into the data by the data processing unit 32 to reach the high-frequency signal switch 34.

The switching controller 61 outputs the signal TRC (switching signal) for instructing the radio transmitters 33a, 33b to be switched, and the overhead bit insertion timing generator 62 outputs the insertion timing signal ITS for a control bit (overhead bit). The flip-flop 63 outputs the switching signal TRC' in synchronism with the overhead bit insertion timing, and the delay circuit 64 delays the switching signal TRC'' which is output from the flip-flop 63 by the time which it takes the overhead bit inserted into the data to reach the high-frequency signal switch 34. The high-frequency signal switch 34 switches the radio transmitters 33a, 33b in accordance with the output of the delay circuit 64 and outputs a high-frequency signal input from new active radio transmitter. According to this structure, since the radio transmitters are switched at the overhead bit portion, there may be an error in the overhead bit but not error is caused in the data.

In this case, the data processing unit 32 generates a subframe by inserting a frame bit, a parity bit, a stuffing control bit and a DSC bit into input data at intervals of a predetermined number of bits as an overhead bit, and generates one multiframe from a plurality of subframes and outputs it. The overhead bit insertion timing generator 62 generates an overhead bit insertion timing signal at a timing of inserting one overhead bit selected from the group consisting of frame bit, parity bit, stuffing control bit and DSC bit. In this manner, the high-frequency signal switch 34 can switch the radio transmitters 33a, 33b at any given overhead bit timing.

The data processing unit 32 newly inserts an overhead bit for switching the radio transmitters 33a, 33b, and the overhead bit insertion timing generator 62 outputs the timing signal for inserting the overhead bit for switching. In this manner, the high-frequency signal switch 34 can switch the radio transmitters 33a, 33b at the timing of inserting the overhead bit for switching, so that no error is caused in the data, frame bit, parity bit, stuffing control bit or DSC bit due to switching.

The data processing unit 32 is provided with a speed converter for writing input data at a predetermined rate in a memory, reading the data from the memory at a predetermined rate and outputting the read data, and a stuffing bit inserting portion for inserting a stuffing bit into a predetermined multiframe in accordance with the difference in the data input rate and the data output rate. When a stuffing bit is inserted, the overhead bit insertion timing generator 62 generates a stuffing bit insertion timing signal. In this manner, the high-frequency signal switch 34 can switch the radio transmitters 33a, 33b at the timing of inserting the stuffing bit, so that no error is caused in the data, frame bit, parity bit, stuffing control bit or DSC bit due to switching.

In the case of adding error detection and correction codes (check bits) to input data, a switching signal for the radio transmitters 33a, 33b is output in synchronism with the timing of inserting the error detection and correction codes. The switching signal is delayed by the time which it takes the error detection and correction codes inserted into the data to reach the high-frequency signal switch 34, and the radio transmitters 33a, 33b are switched in accordance with the delayed output, and a high-frequency signal input from the new active radio transmitter is output. In this manner, the high-frequency signal switch 34 can switch the radio transmitters 33a, 33b at the timing of inserting the error detection and correction codes, so that no error is caused in the data, frame bit, parity bit, stuffing control bit or DSC bit due to switching. In this case, it is necessary to instruct the called station to stop error detection and correction process in advance.

(b) First embodiment
(b-1) Entire structure

Figure 12:
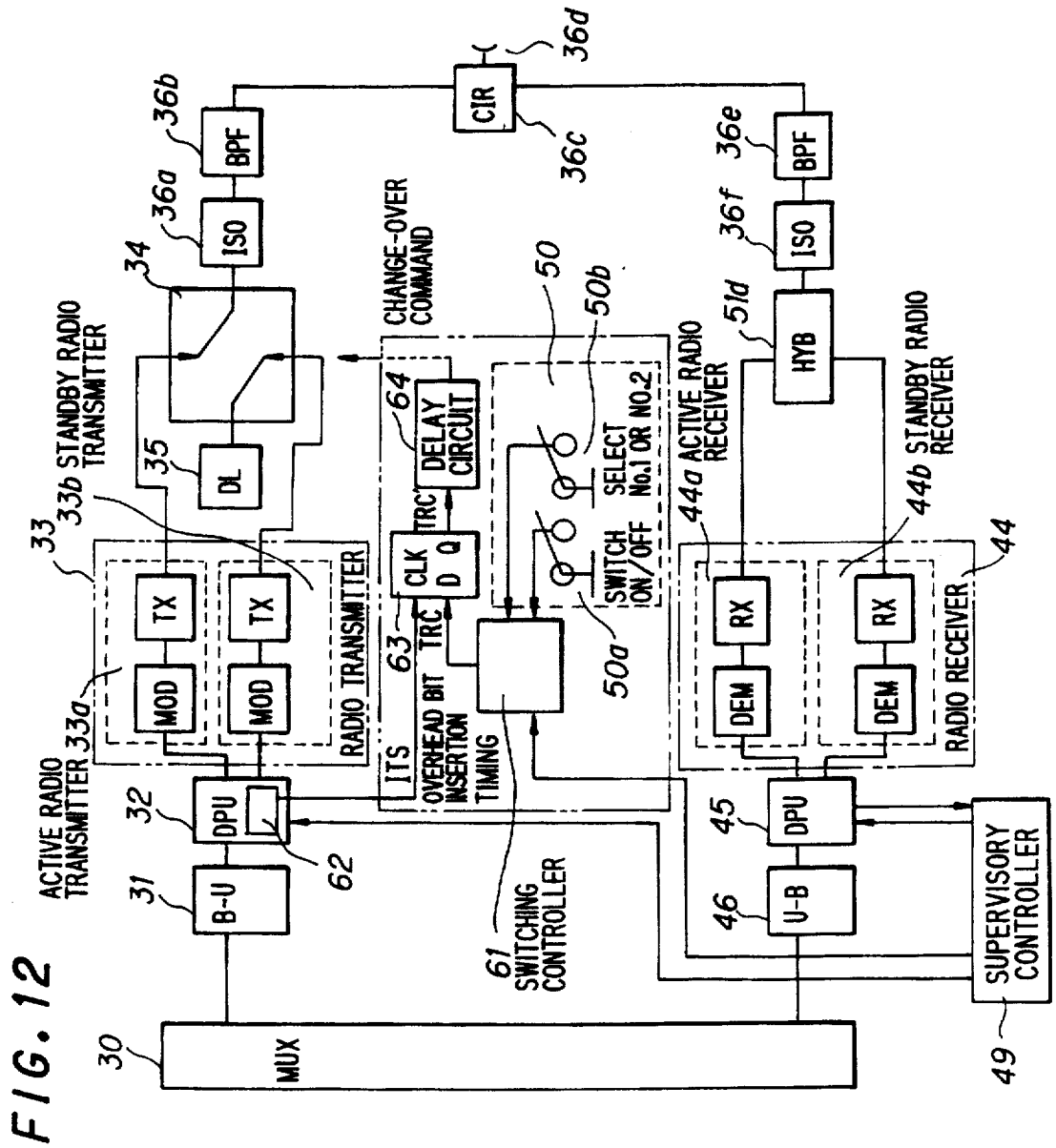
FIG. 12 show the structure of a first embodiment of the radio equipment according to the present invention shown in FIG. 11.
Figures 36A, 36B:
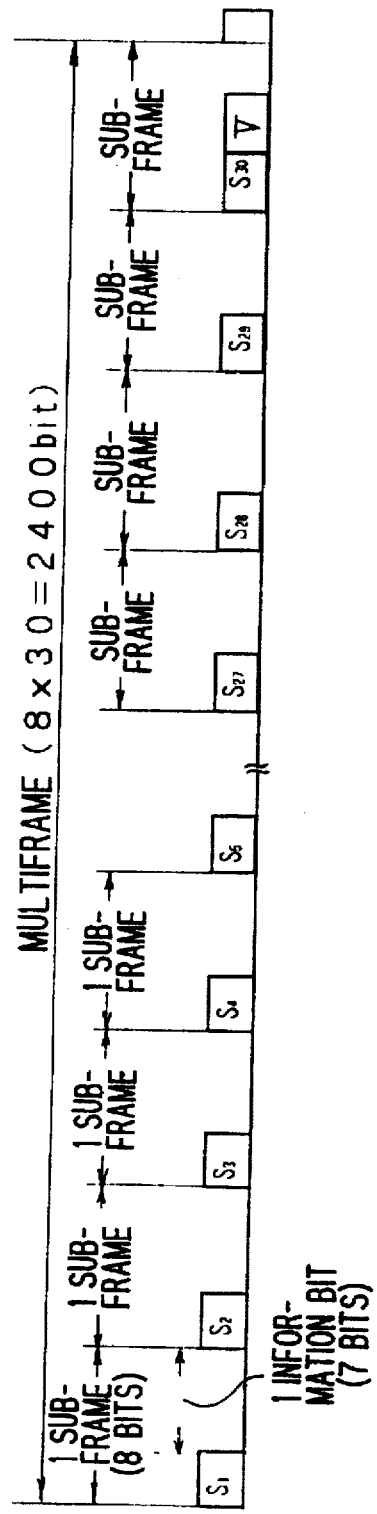
FIGS. 36A and 36B respectively explain the frame structure and an overhead bit.
Figure 37:
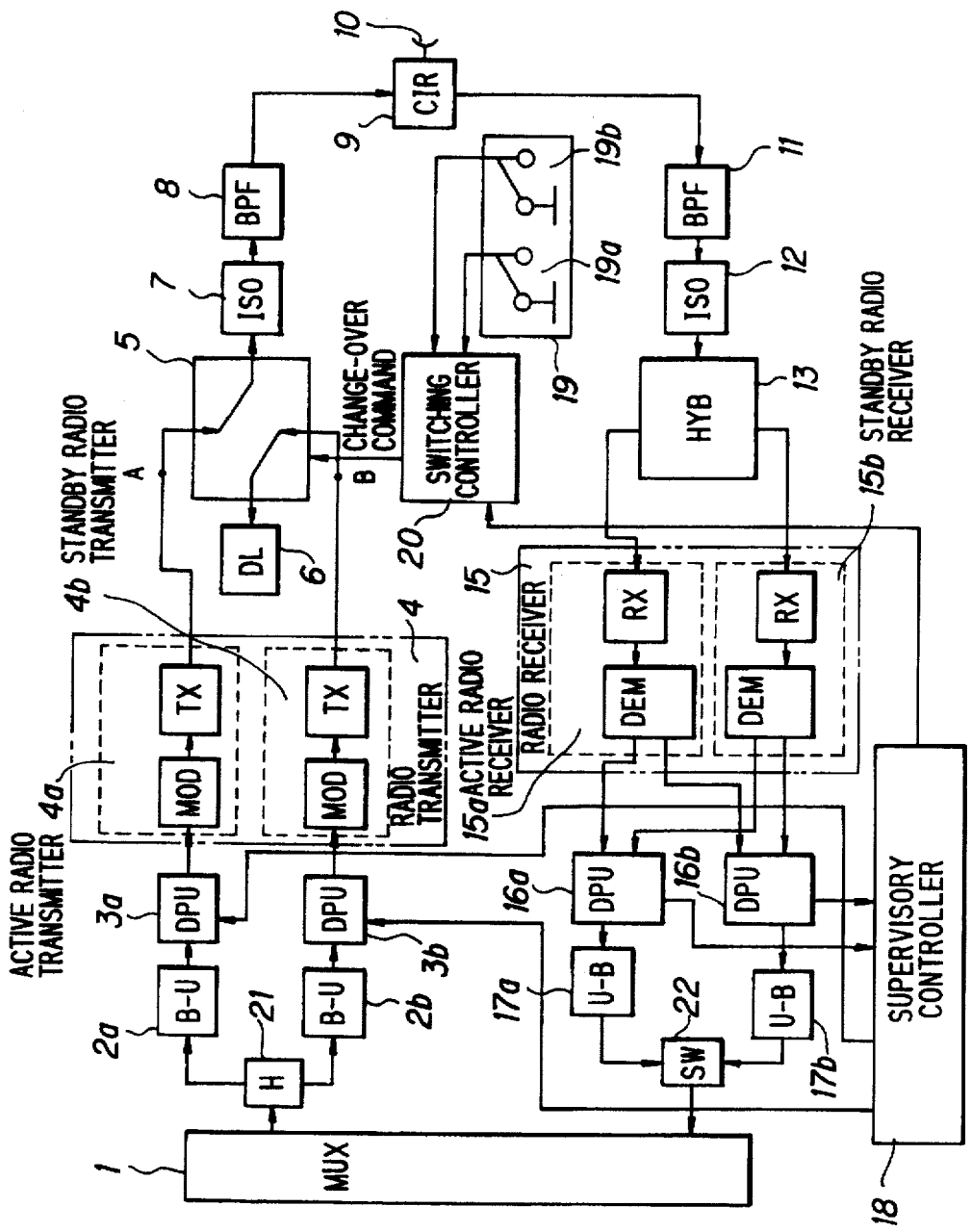
FIG. 37 shows the structure of another conventional radio equipment.
Figure 39:
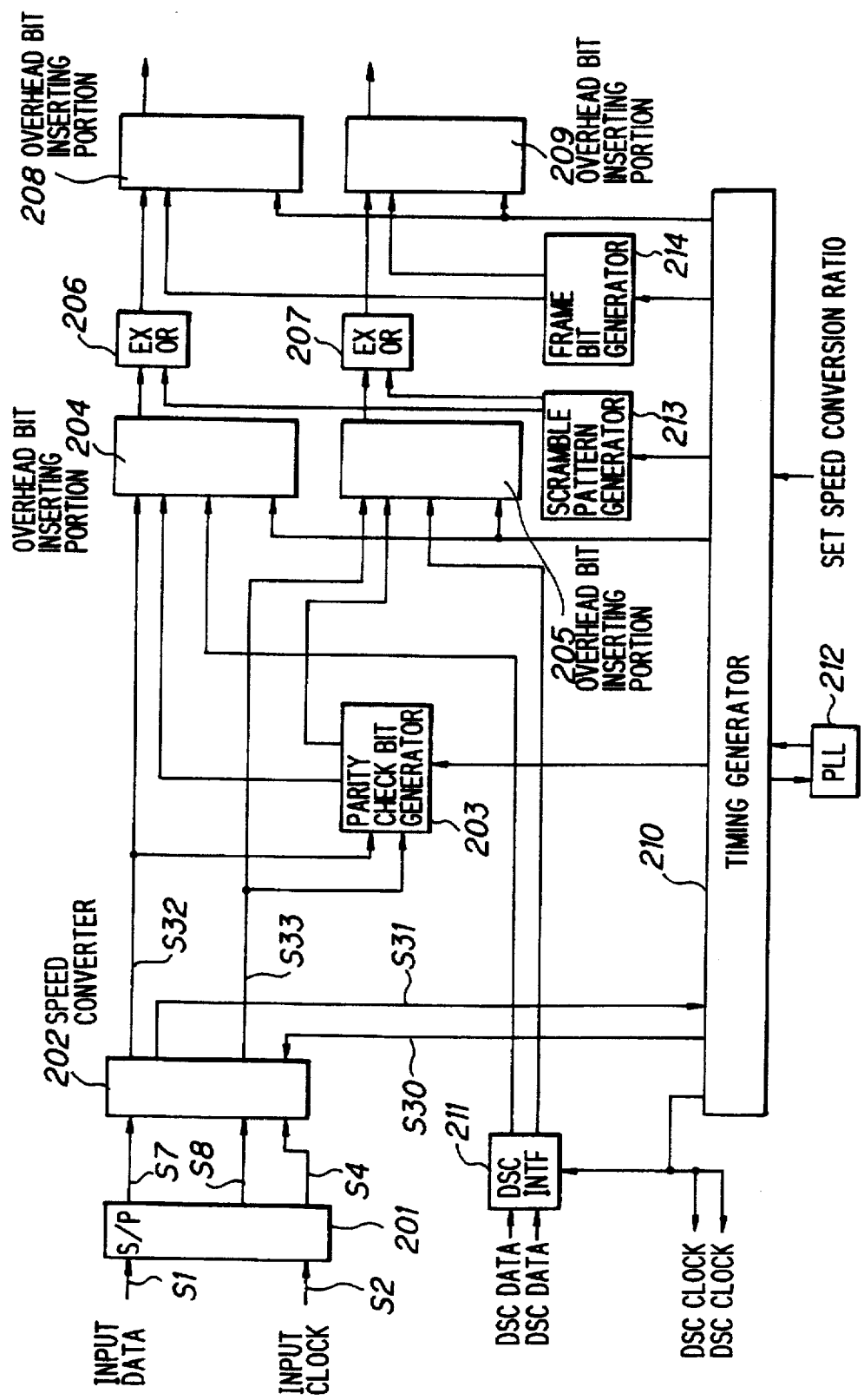
FIG. 39 shows the internal structure of a data processing unit of a master-slave synchronization system.

FIG. 12 show the structure of a first embodiment of the radio equipment according to the present invention shown in FIG. 11. The reference numeral 30 represents a multiplexer/demultiplexer (MUX) which multiplexes the data input from a plurality of circuits (not shown) and inputs the data to a radio transmitter 33, and separates the multiplex data input from a radio receiver 44 and outputs the data to each circuit. The reference numeral 31 denotes a B-U converter for converting a bipolar signal into a unipolar signal, 32 a transmitting data processing unit which inputs an overhead bit into the multiplex data input from the multiplexer/demultiplexer 30 in bit series, assembles and outputs the input data in the form of a frame (see FIGS. 36A, 36B), 33 a radio transmitter having a duplicate structure, and 33a an active radio transmitter (No. 1), 33b a standby radio transmitter (No. 2). When there is a trouble in the active radio transmitter 33a, the standby transmitter 33b is used as an active transmitter, and the active transmitter having the trouble is repaired and used as a standby transmitter thereafter. The active and standby radio transmitters 33a, 33b have the same structure, and are provided with a modulator MOD for modulating input data (e.g., 4-PSK modulation), and a high-frequency transmitter TX for converting the modulated wave into a radio frequency, amplifying the power and outputting the data. The reference numeral 34 represents a high-frequency signal switch for selecting a high-frequency signal from the active radio transmitter 33a, and outputting the signal to an antenna. The high-frequency signal switch 34 also inputs a high-frequency signal from the standby radio transmitter 33b to a terminating resistance 35 so as to terminate it. The reference numeral 36a represents an isolator, 36b a bandpass filter for passing a signal component in a radio frequency band therethrough, 36c a circulator, and 36d an antenna. These elements constitute a transmission system.

The reference numeral 36e represents a bandpass filter for passing only a signal component in a radio frequency band included in the reception signal input from the circulator 36c therethrough, 36f an isolator, 51d a hybrid circuit for branching an input signal into two signal components, 44 a duplicate radio receiver, 44a an active radio receiver (No. 1), and 44b a standby radio receiver (No. 2). When there is a trouble in the active radio receiver 44a, the standby receiver 44b is used as an active receiver, and the active receiver having the trouble is repaired and used as a standby receiver thereafter. The active and standby radio receivers 44a, 44b have the same structure, and are provided with a high-frequency receiver RX for amplifying the power of a reception signal, converting the frequency of the reception signal into an intermediate frequency and outputting it, and a demodulator DEM for demodulating an intermediate-frequency signal into the input data (e.g., 4-PSK demodulation).

Figure 35:
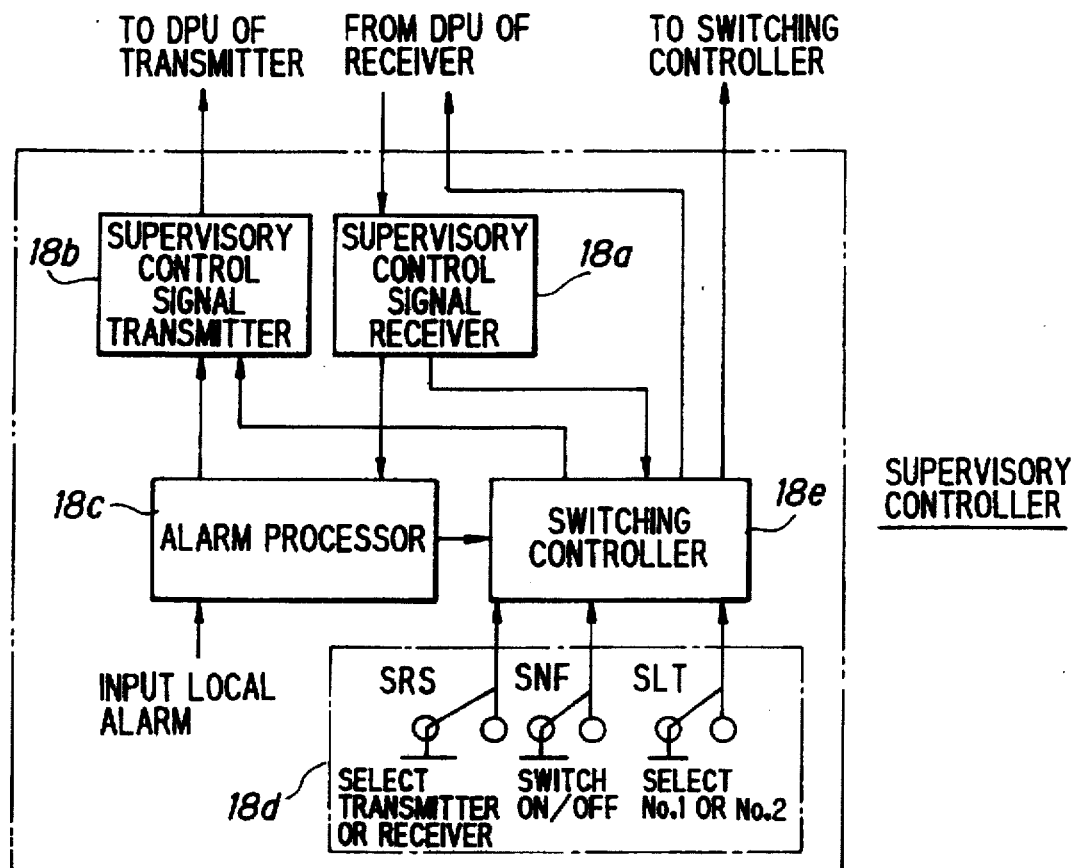
FIG. 35 shows the structure of the supervisory controller in the radio equipment shown in FIG. 34.
Figure 38:
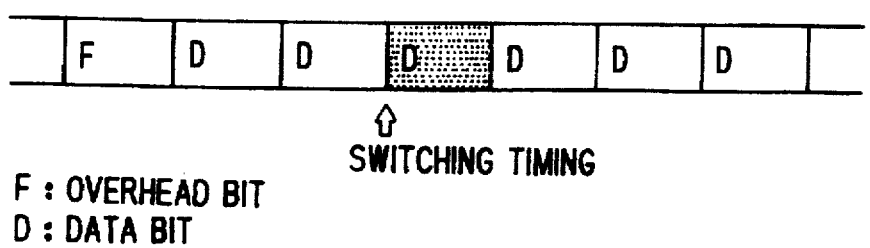
FIG. 38 is an explanatory view of a bit error caused during a switching time.

The reference numeral 45 represents a received data processing unit for extracting control data $S_1$ to $S_{30}$ from the frame signal input from the radio receiver 44 and executes deframing and other processing, and 46 a U-B converter for converting a unipolar signal into a bipolar signal and inputting it to the multiplexer/demultiplexer 30. The reference numeral 49 denotes a supervisory controller having the structure shown in FIG. 35 for (1) processing in accordance with a called station supervisory control signal contained in a reception signal, (2) transmitting a called station supervisory control signal which represents the state of the caller transmitter to a transmission signal, and (3) instructing switching between the radio transmitter and the radio receiver.

The reference numeral 50 denotes a control panel provided with an on/off switch 50a and a selection switch 50b for selecting between the radio transmitters No. 1 and No. 2. The reference numeral 61 denotes a switching controller for outputting a switching signal TRC for instructing the high-frequency signal switch 34 to switch the active transmitter in accordance with a change-over command from the supervisory controller 49 or the control panel 50.

The reference numeral 62 represents an overhead bit insertion timing generator provided in the data processing unit 32 so as to output an insertion timing signal ITS for a control bit (overhead bit), 63 a flip-flop for outputting a switching signal TRC' in synchronism with the overhead bit insertion timing, and 64 a delay circuit for delaying the switching signal TRC' which is output from the flip-flop 63 by the time which it takes the overhead bit inserted into the data to reach the high-frequency signal switch 34.

(b-2) Structure of data processing unit

Figure 13:
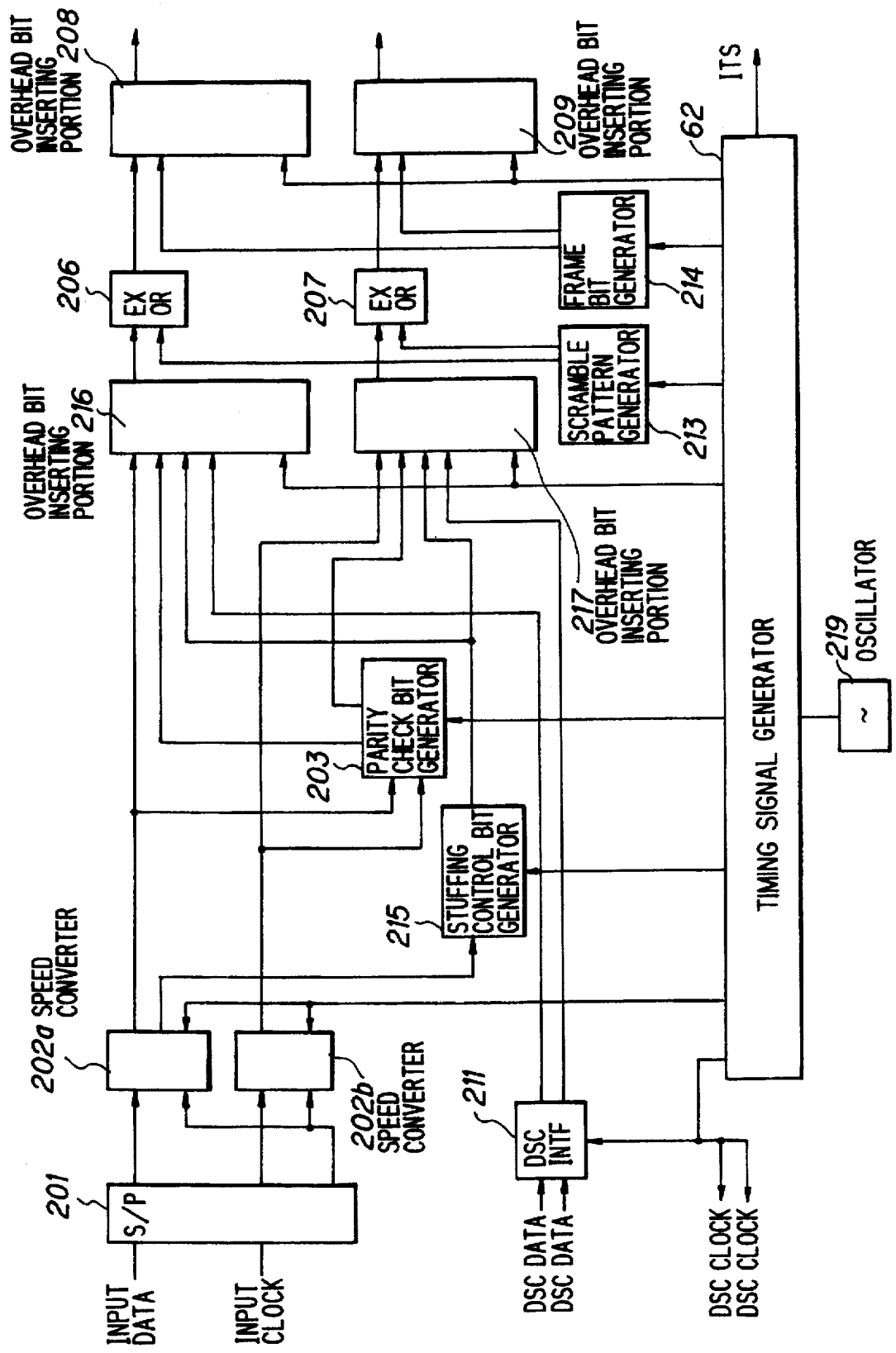
FIG. 13 shows the structure of a data processing unit in the embodiment shown in FIG. 12.

FIG. 13 shows the structure of the data processing unit. The reference numeral 201 denotes a serial/parallel converter for converting the serial data input from the multiplexer/demultiplexer 30 in bit series into parallel data, in other words, for converting the input data string into a string of bits in odd numbers and a string of bits in even numbers, and 202a, 202b speed converters for writing the parallel data input at a predetermined rate into a memory and outputting the data from a memory at a constant rate. Each of the speed converters 202a, 202b appropriately determines whether or not a stuffing bit is inserted into a 30-th subframe in accordance with the difference in the data input rate and the data output rate. When no stuffing bit is inserted into the 30-th subframe, data is input thereinto. The larger the difference in the data input rate and the data output rate, the larger the number of stuffing bits inserted, while the smaller the difference, the smaller the number.

Figure 41:
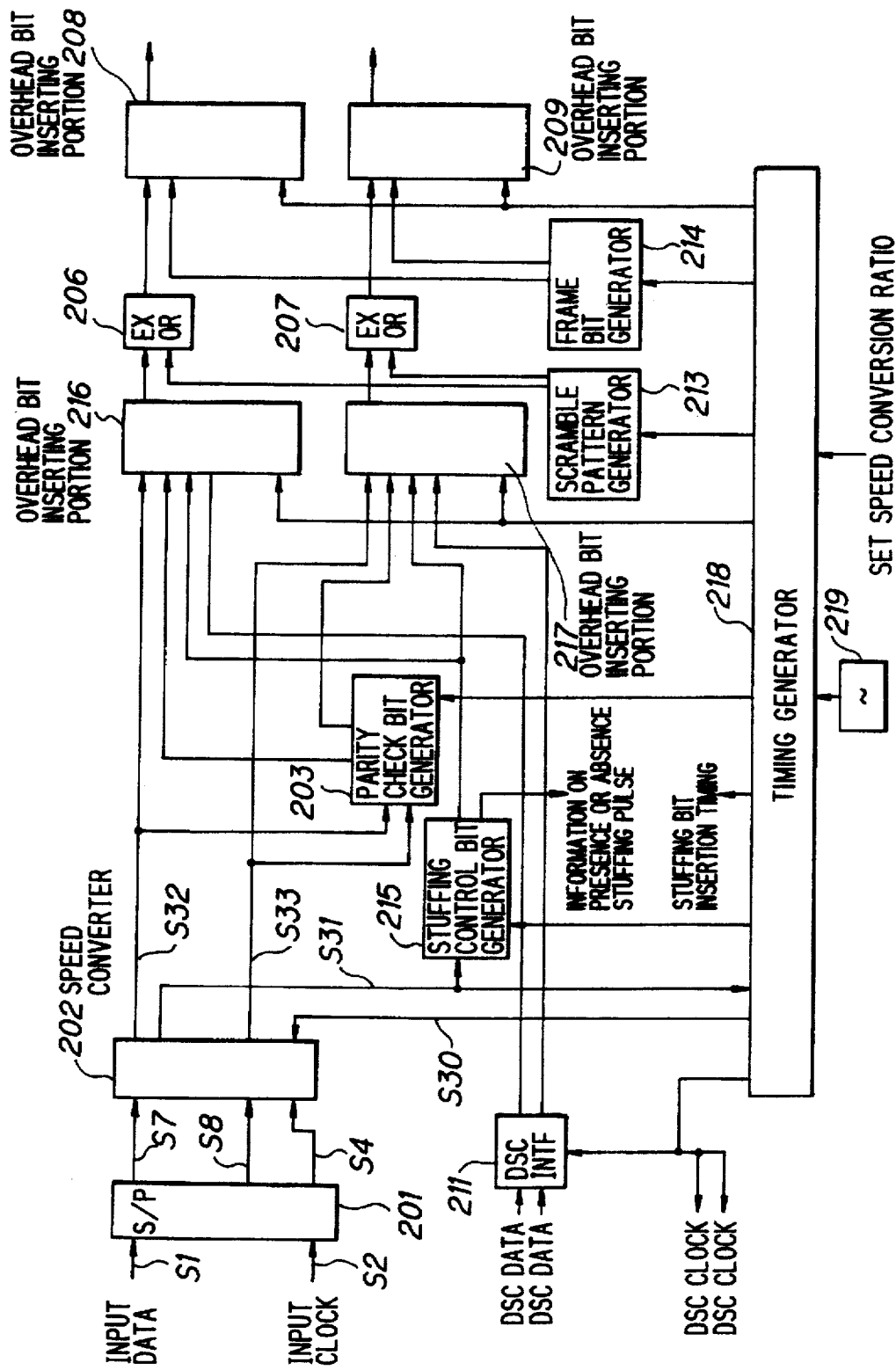
FIG. 41 shows the internal structure of a data processing unit of a pulse stuffing synchronization system.

The reference numeral 215 represents a stuffing control bit generator for generating a stuffing control bit which specifies the contents of the 30-th subframe and stuffing bit. When the first bit in the 30-th subframe data is dummy data (when a stuffing bit is inserted), all the stuffing control bits $C_11$ to $C_15$ are set to "0". On the other hand, when the first bit is input data, all the stuffing bits are set to "1". The reference numeral 211 represents a DSC interface portion, 203 a parity check bit generator, 216, 217 overhead bit inserting portions for inserting a parity check bit ($S_{28}$), a stuffing control bit ($S_4$, $S_{10}$, $S_{16}$), a stuffing bit (30-th subframe), a DCS bit ($S_2$, $S_3$, ...) to input data at intervals of 7 bits, 213 a scramble pattern generator for generating a predetermined scramble pattern so that "1" and "0" are generated in the same ratio, 206, 207 exclusive ORs (EXOR) for calculating and outputting the exclusive OR of input data and a scramble pattern, 214 a frame bit generator for inserting a frame bit into a predetermined portion ($S_1$, $S_7$, $S_{13}$, $S_{19}$, $S_{25}$) of input data, 208, 209 overhead bit inserting portions for inserting a frame bit, 219 an oscillator for generating a basic clock signal, and 62 a timing signal generator (which corresponds to the timing signal generator shown in FIG. 41) for generating various timing signals, overhead bit insertion timing signal ITS, etc. in accordance with the basic clock signal.

(b-3) Structure of delay circuit

Figure 14:
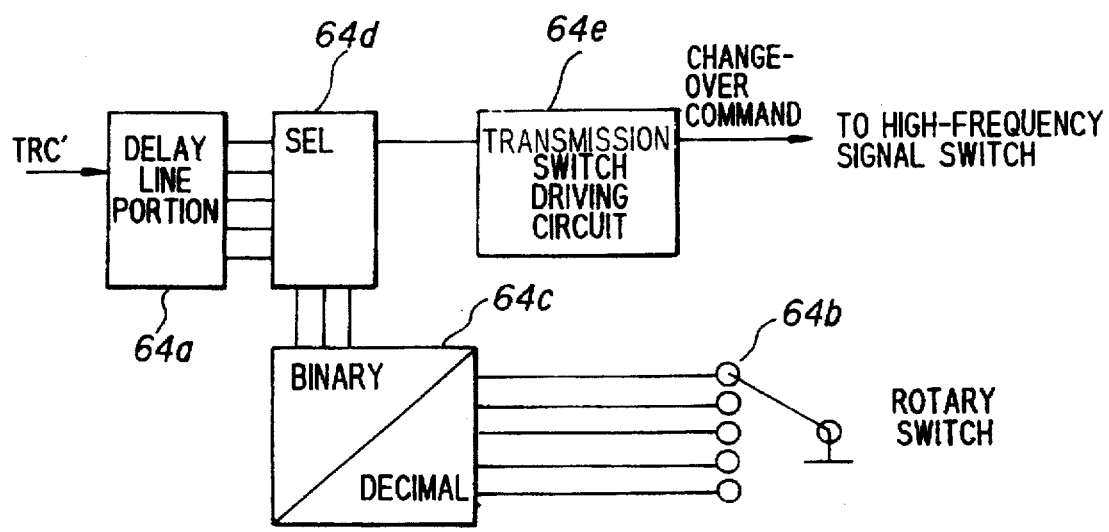
FIG. 14 shows the structure of a delay circuit in the embodiment shown in FIG. 12.

FIG. 14 shows the structure of the delay circuit 64. The reference numeral 64a denotes a delay line portion which is provided with a plurality of delay lines having different delay times and to which the switching signal TRC' is input, 64b a rotary switch for selecting a predetermined delay time, 64c a converter for converting a decimal bit into a binary bit, 64d a selector for selecting the delay line in accordance with the designated delay time, and 64e a transmission switch driving circuit for driving the high-frequency signal switch 34 for the radio transmitter in accordance with the delayed switching signal TRC' output from the selector 64d.

The delay time is set by the rotary switch 64b so that the switching signal TRC' is delayed by the time which it takes the overhead bit inserted into the data by the data processing unit 32 to reach the high-frequency signal switch 34. The switching signal TRC' is delayed by the delay line which corresponds to the set delay time, and the delayed switching signal is input to the high-frequency signal switch 34 as a change-over command.

(b-4) Switching operation

The delay time which corresponds to the time taken from the insertion of a predetermined overhead bit to the arrival of the overhead bit at the high-frequency signal switch 34 is set in the delay circuit 64. The switching time is set so as not to exceed a data transmitting time of 1 bit.

The timing signal generator 62 constantly outputs an insertion timing signal ITS at the timing of inserting, for example, a frame bit. In this state, when it is necessary to switch the radio transmitters 33a and 33b, the switching controller 61 outputs a switching signal TRC in accordance with the instruction from the supervisory controller 49 or the operating portion 50.

The flip-flop 63 is then set at the timing of inserting a frame bit. In other words, the flip-flop 63 outputs a switching signal TRC' in synchronism with the frame bit insertion timing.

The delay circuit 64 delays the switching signal TRC' by the set delay time and then outputs it to the high-frequency signal switch 34. Therefore, at the point of time when the switching signal TRC' is input to the high-frequency signal switch 34, the frame bit reaches the high-frequency signal switch 34 via the active radio transmitter 33a. As a result, the high-frequency signal switch 34 switches the radio transmitters 33a, 33b when the frame bit is input. Thereafter, the high-frequency signal switch 34 receives data via the new radio transmitter 33b (now active) and outputs it to the antenna.

Figure 15:
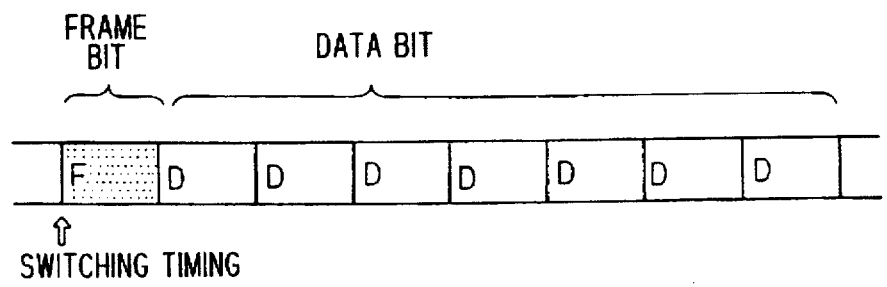
FIG. 15 explains the switching timing in the embodiment shown in FIG. 12.

In this manner, since a switching operation is executed at the frame bit portion, as shown in FIG. 15, an error may be caused in the frame bit, but no error is caused in the data. Since the frame bit is supplied many times, there is no problem even if an error is caused in one frame bit.

(b-5) Modification
(1) First modification

In the first embodiment, the radio transmitters 33a, 33b are switched at the frame bit portion, but the overhead bit portion at which the radio transmitters 33a, 33b are switched is not restricted to the frame bit portion and they may be switched at other overhead bit portions.

The data processing unit 32 generates a subframe by inserting a frame bit, parity bit, stuffing control bit, or DSC bit into input data at intervals of 7 bits, and generates and outputs one multiframe from 30 subframes. Therefore, if the timing signal ITS is generated at a timing of inserting another overhead bit such as parity bit, stuffing control bit and DSC bit, the high-frequency signal switch 34 can switch the radio transmitters 33a, 33b at a predetermined overhead bit portion.

(2) Second modification

In the first embodiment and the first modification, the radio transmitters 33a, 33b are switched at an existing overhead bit portion, and an error may be caused in the overhead bit portion inserted. If an overhead bit especially for switching is prepared and the radio transmitters 33a, 33b are switched at this overhead bit portion for switching (hereinafter referred to as "switching bit"), no error is caused in frame bit, parity bit, stuffing control bit or DSC bit.

Figure 16:
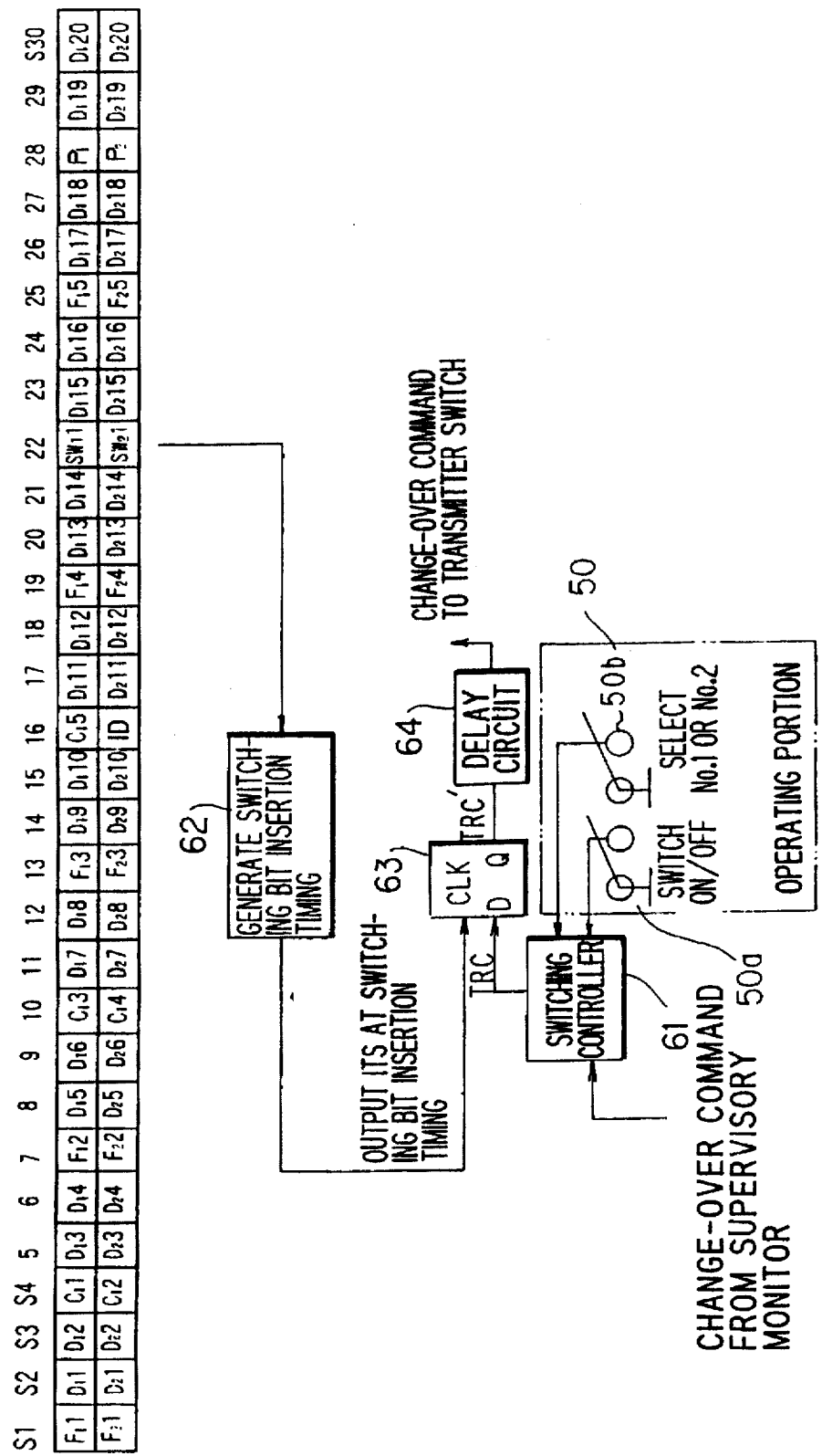
FIG. 16 shows the structure of a first modification of the embodiment shown in FIG. 12.

FIG. 16 shows the structure of the main part of such a modification. The same reference numerals are provided for the elements which are the same as those in the first embodiment shown in FIG. 12. In FIG. 16, an overhead bit $S_{22}$ in the 22-th subframe is used as a switching bit.

The timing signal generator 62 constantly outputs a timing signal ITS at a timing of inserting the switching bit $S_{22}$. In this state, when it is necessary to switch the radio transmitters 33a, 33b, the switching controller 61 outputs a switching signal TRC in accordance with the instruction from the supervisory controller 49 or the operating portion 50. The flip-flop 63 is then set at the timing of inserting the switching bit, and a switching signal TRC' is output from the set terminal in synchronism with the insertion timing.

The delay circuit 64 delays the switching signal TRC' before inputting it to the high-frequency signal switch 34. Therefore, at the point of time when the switching signal TRC' is input to the high-frequency signal switch 34, the switching bit reaches the high-frequency signal switch 34 via the active radio transmitter 33a. As a result, the high-frequency signal switch 34 switches the radio transmitters 33a, 33b when the switching bit is input. Thereafter, the high-frequency signal switch 34 receives data via the new radio transmitter 33b (now active) and outputs it to the antenna.

In this manner, since a switching operation is executed at the switching bit portion, no error is caused in the data or the necessary overhead bits (frame bit, parity bit, stuffing control bit, DSC) due to the switching operation.

(3) Third modification

Although the radio transmitters 33a, 33b are switched at an overhead bit portion in the first embodiment and the first and second modification, they may be switched at a stuffing bit insertion timing. A stuffing bit is inserted in order to adjust a speed, so that there is no problem if there is a bit error in the stuffing bit at the time of switching the radio transmitters 33a, 33.

Figure 17:
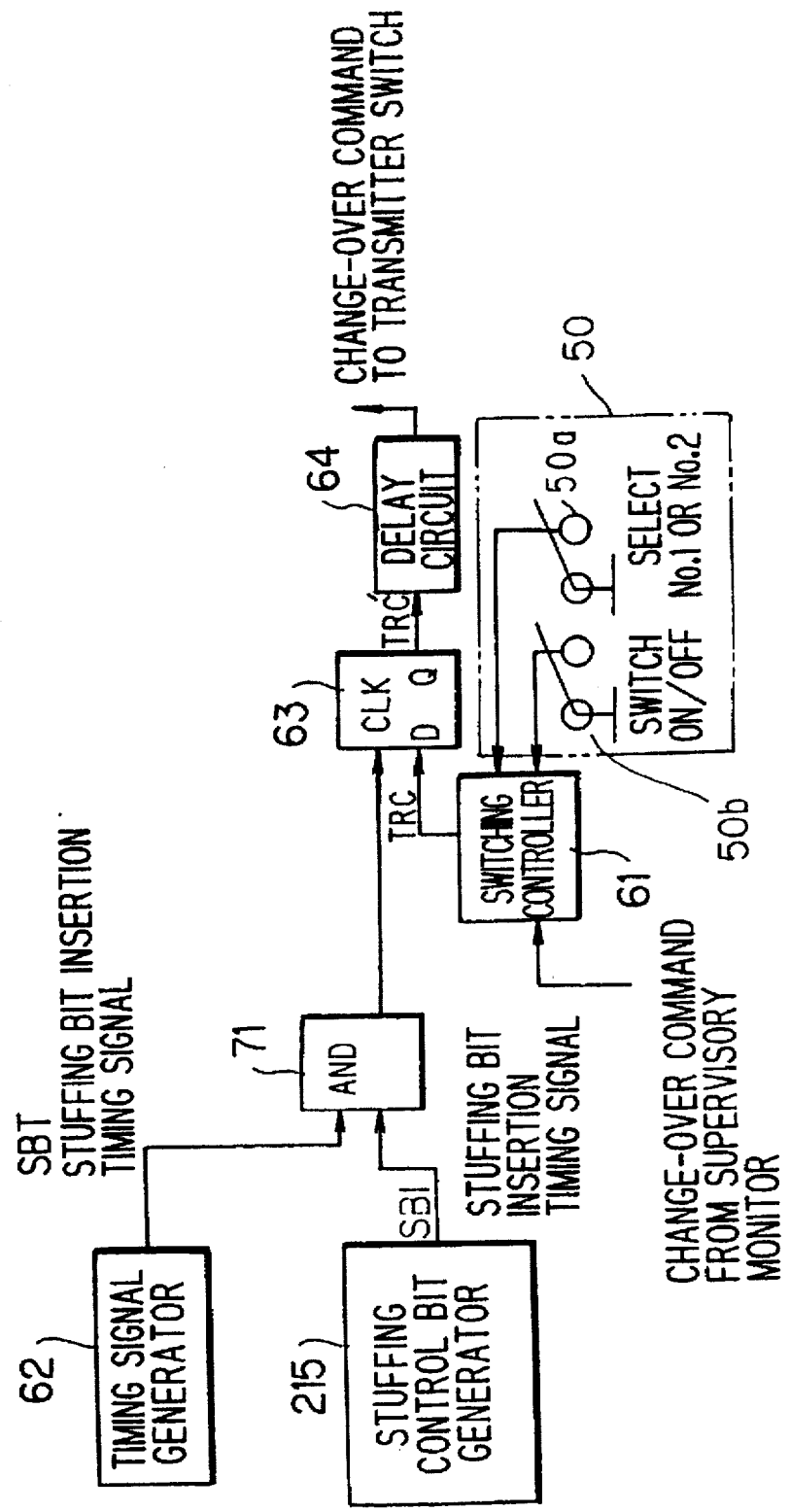
FIG. 17 shows the structure of a second modification of the embodiment shown in FIG. 12.

FIG. 17 shows the structure of a third modification in which the radio transmitters 33a, 33 are switched at a stuffing bit insertion timing. The same reference numerals are provided for the elements which are the same as those in the first embodiment shown in FIG. 12. The reference numeral 215 represents a stuffing control bit generator which is provided in the data processing unit 32 (see FIG. 13) so as to generate a stuffing control bit in accordance with the instruction from the speed converters 202a, 202b, and output a high-level stuffing bit insertion signal SBI when a stuffing bit is inserted. The reference numeral 71 denotes an AND gate which outputs a stuffing bit insertion timing signal when a stuffing bit is inserted. The AND gate 71 is provided in order not to switch when there is data, because when no stuffing bit is inserted, input data is inserted into the stuffing bit inserting position (30-th subframe).

The timing signal generator 62 constantly outputs a stuffing bit insertion timing signal SBT at a timing of inserting a stuffing bit. When a stuffing bit is inserted, the level of the stuffing bit insertion timing signal SBT is high, and the AND gate 71 outputs a high-level signal at every stuffing bit insertion timing.

In this state, when it is necessary to switch the radio transmitters 33a, 33b, the switching controller 61 outputs a switching signal TRC in accordance with the instruction from the supervisory controller 49 or the operating portion 50. The flip-flop 63 is then set at the timing of inserting the stuffing bit, and a switching signal TRC' is output from the set terminal in synchronism with the insertion timing.

The delay circuit 64 delays the switching signal TRC' before inputting it to high-frequency signal switch 34. Therefore, at the point of time when the switching signal TRC' is input to the high-frequency signal switch 34, the stuffing bit reaches the high-frequency signal switch 34 via the active radio transmitter 33a. As a result, the high-frequency signal switch 34 switches the radio transmitters 33a, 33b when the stuffing bit is input. Thereafter, the high-frequency signal switch 34 receives data via the new radio transmitter 33b (now active) and outputs it to the antenna.

In this manner, since a switching operation is executed at the stuffing bit portion, no error is caused in the data or the necessary overhead bits (frame bit, parity bit, stuffing control bit, DSC) due to switching operation.

(c) Second embodiment (c-1) Schematic explanation of second embodiment

There is a case in which the radio transmitter 33 adds an error detection and correction bit to input data before transmission, and the radio receiver 44 detects and corrects the error by using the error detection and correction bit. In this case, since the transmitted data includes a plurality of error detection and correction bits (check bits), if the radio transmitters 33a, 33b are switched at the check bit inserting portion, it is possible to switch the radio transmitters 33a, 33 without causing an error in the data or the overhead bit portions even if the switching operation takes the time corresponding to not less than 2 bits. However, when the radio transmitters 33a, 33b are switched at the check bit inserting portion, it is necessary to instruct the called station in advance not to execute error detection and correction processing by using a check bit in the next frame.

Figure 18:
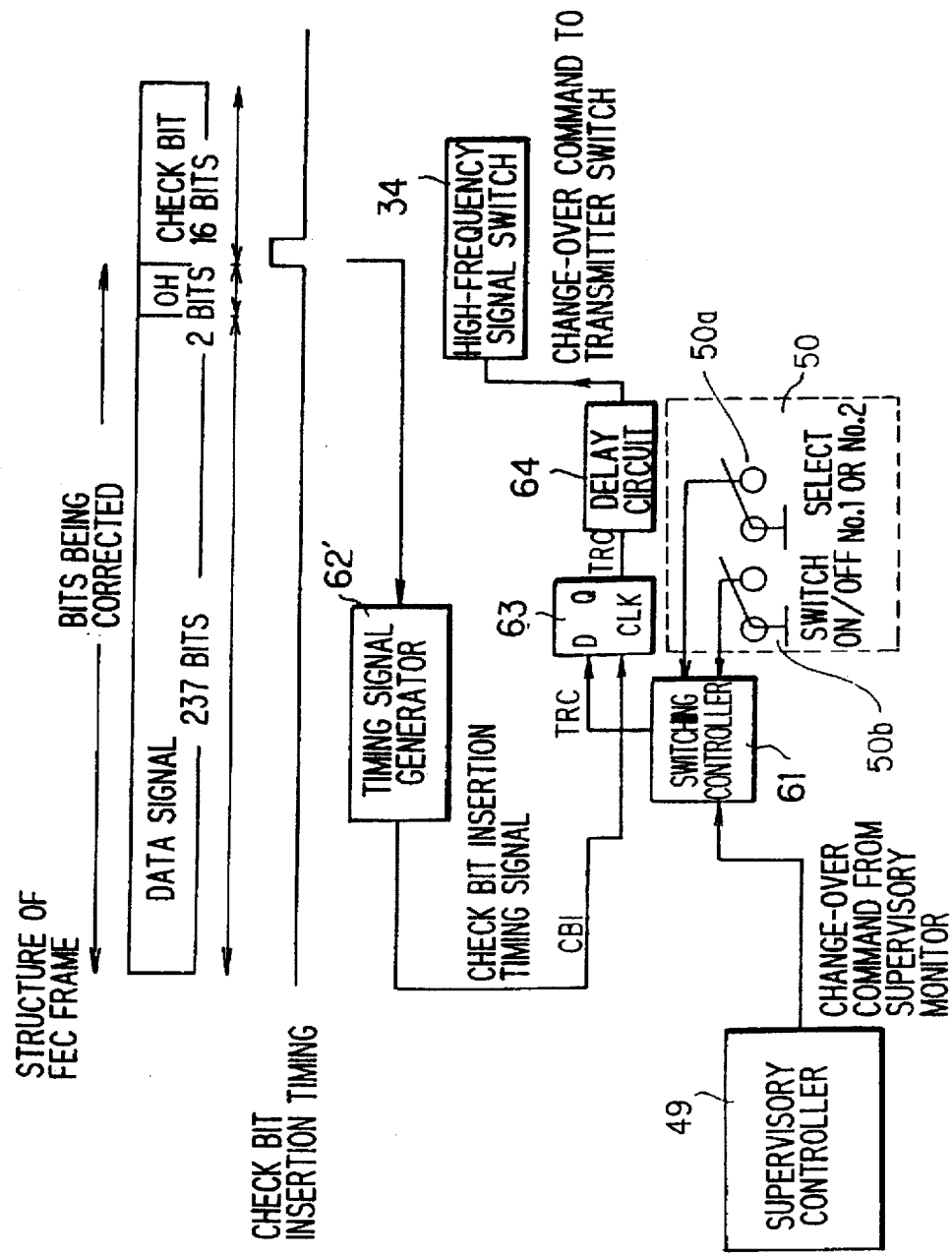
FIG. 18 schematically explains a second embodiment of the radio equipment according to the present invention shown in FIG. 11.

FIG. 18 schematically shows the structure of a second embodiment of the radio equipment according to the present invention shown in FIG. 11. This embodiment adopts FEC (Forward Error Correction) which uses BCH (Bose-Cahudhuri-Hocquenghem) codes as error correction codes. The FEC is a method of detecting and correcting an error by generating a plurality of check bits (16 bits) as BCH codes by using a block (239 bits in FIG. 18) of data on the transmission side, transmitting the check bits together with data to the reception side, and detecting and correcting an error on the reception side by using the received check bits and check bits generated from the received data.

A timing signal generator 62' outputs a check bit insertion timing signal CBI at a timing of inserting check bits. In this state, when it is necessary to switch the radio transmitters 33a, 33b, the switching controller 61 outputs a switching signal TRC in accordance with the instruction from the supervisory controller 49 or the operating portion 50. The flip-flop 63 is then set at the timing of inserting the check bits, and a switching signal TRC' is output from the set terminal in synchronism with the insertion timing.

The delay circuit 64 delays the switching signal TRC' before inputting it to high-frequency signal switch 34. Therefore, at the point of time when the switching signal TRC' is input to the high-frequency signal switch 34, the check bits reach the high-frequency signal switch 34 via the active radio transmitter 33a. As a result, the high-frequency signal switch 34 switches the radio transmitters 33a, 33b when the check bits are input. Thereafter, the high-frequency signal switch, 34 receives data via the new radio transmitter 33b (now active) and outputs it to the antenna. In this manner, since a plurality of error detection and correction codes (check bits) are added, even if the switching operation takes more than the time corresponding to 2 bits, no error is caused in the data or the overhead bits due to the switching operation.

(c-2) Structure of second embodiment

Figure 19:
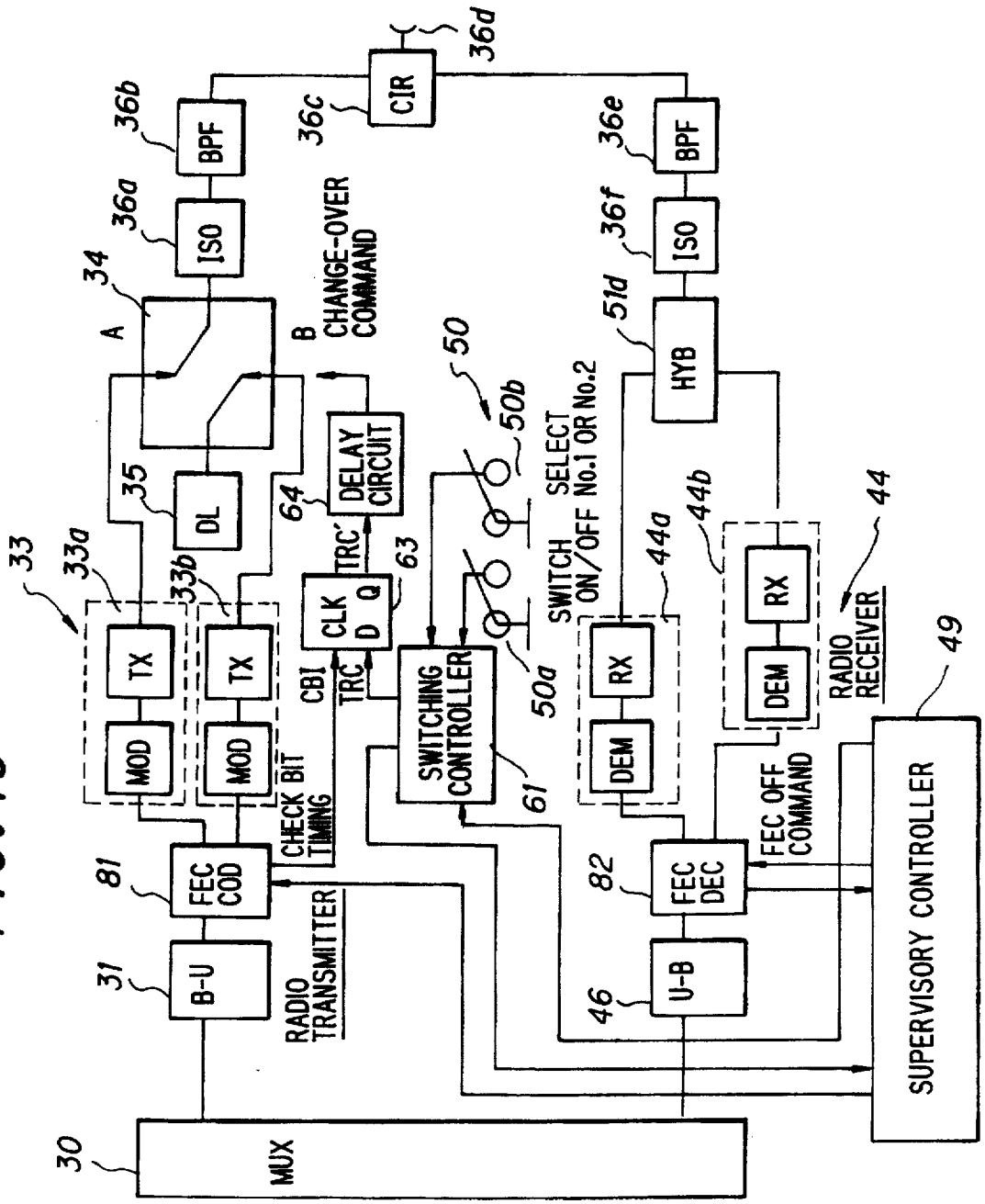
FIG. 19 show the structure of the radio equipment according to the present invention shown in FIG. 18.

FIG. 19 shows the structure of the second embodiment shown in FIG. 18. The same reference numerals are provided for the elements which are the same as those in the first embodiment shown in FIG. 12.

The second embodiment is different from the first embodiment in that an error detection and correction code adding circuit (FED COD) 81 for adding error detection and correction codes is provided in place of the transmitting data processing unit 32, and that an error detection and correction circuit (FEC DEC) 82 is provided in place of the received data processing unit 45.

Figure 20:
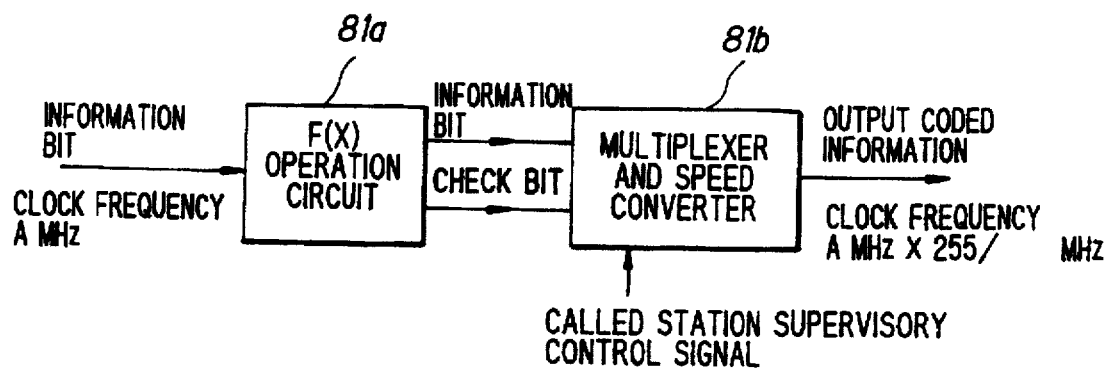
FIG. 20 shows the structure of the FEC COD in the embodiment shown in FIG. 19.
Figure 21:
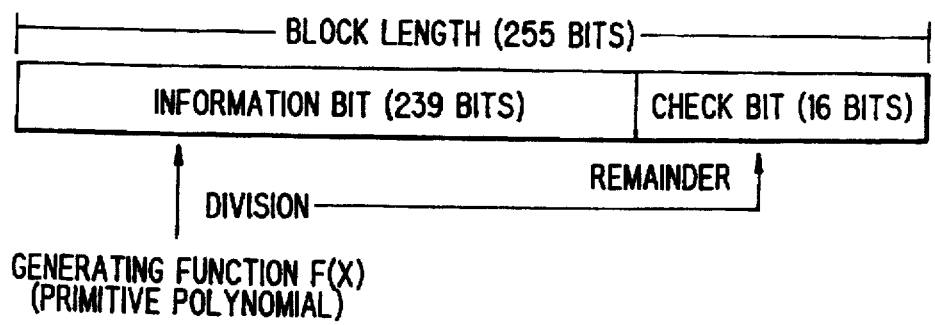
FIG. 21 is an explanatory view of the operation of adding an error detection and correction code.

The error detection and correction code adding circuit (FED COD) 81 adds 16 check bits to data of 239 bits and supplies a block of data of 255 bits. FIG. 20 shows the structure of the error detection and correction code adding circuit 81, and FIG. 21 is an explanatory view of the operation thereof. In FIG. 20, the reference numeral 81a represents an F(X) operation circuit for partitioning data input at A MHz into blocks of data each having 237 bits, dividing data of 239 bits, which is obtained by adding 2 overhead bits to each block of data, by a predetermined function (primitive polynomial) F(X) and outputting the remainder of 16 bits, 81b a multiplexer and speed converter for multiplexing the remainder of 16 bits by the division and the data of 239 bits and outputting the data at a converted rate of A.255/239 MHz.

Figure 22:
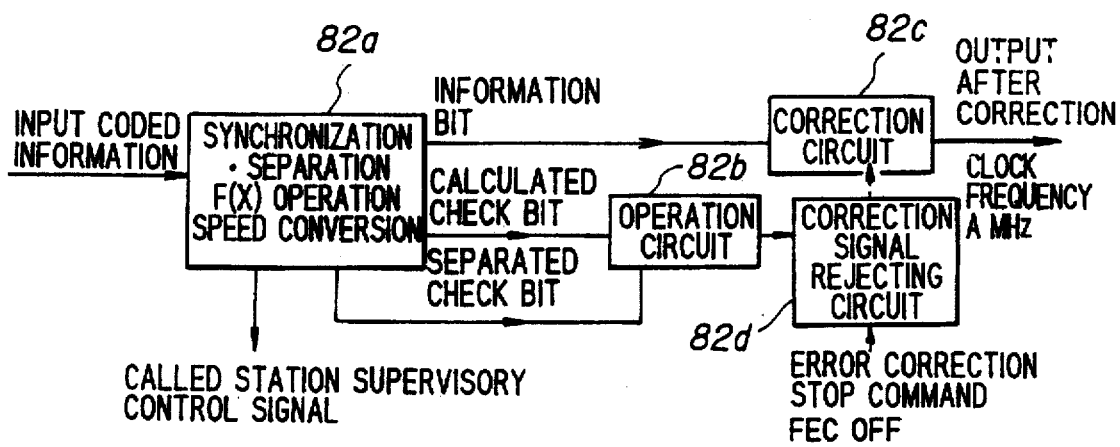
FIG. 22 shows the structure of the FEC DEC in the embodiment shown in FIG. 19.
Figure 23:
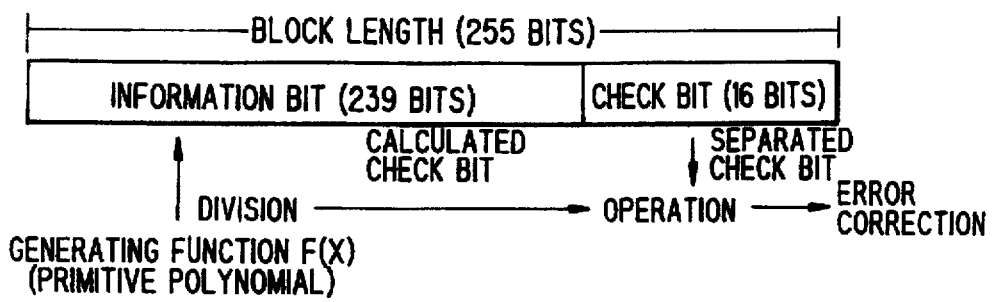
FIG. 23 explains the principle of error detection and correction.

The error detection and correction circuit (FEC DEC) 82 detects and corrects an error by using the received check bits and check bits which are newly generated from the received data. FIG. 22 shows the structure of the error detection and correction circuit 82 and FIG. 23 is an explanatory view thereof. In FIG. 22, the reference numeral 82a represents an input data processing unit for separating one block of input data (255 bits) into the 239 information bits (data bits) and the 16 check bits, and outputting the remainder of 16 bits (calculated check bits) obtained by dividing the 239 received information bits by the function (primitive polynomial) F(X), 82b an operation circuit for outputting a correction signal for correcting an error included in the 239 information bits by using the separated check bits and the calculated check bits, 82c a correction circuit for correcting the error included in the information bits in accordance with the correction signal, and 82d a correction signal rejecting circuit for inhibiting the admission of a correction signal in accordance with an error correction stop command FEC OFF which is supplied from the called station, thereby inhibiting the execution of error detection and correction processing. When the radio transmitters 33a, 33b are switched at the timing of inserting error detection and correction codes (check bits), an error is caused in the check bits. At this time, if error detection and correction processing is executed on the reception side, it is meaningless and may rather lead to a correction error in which right data is changed to wrong data. In order to prevent this, the station at which the radio transmitters are switched issues an error correction stop command FEC OFF to the called station in advance in order to prevent error detection and correction processing by using a check bit in the next frame. The correction signal rejecting circuit 82d is provided in order to prevent detection and correction processing when this command is received.

(c-3) Operation

The delay time which corresponds to the time taken from the insertion of the check bits to the arrival of the check bits at the high-frequency signal switch 34 is set in the delay circuit 64.

The error detection and correction code adding circuit (FED COD) 81 outputs a check bit insertion timing signal CBI at the timing of inserting check bits. In this state, when it is necessary to switch the radio transmitters 33a and 33b, the supervisory controller 49 or the operating portion 50 issues a change-over command. The switching controller 61 then instructs the supervisory controller 49 to supply an error correction stop command FEC OFF to the called station.

The supervisory controller 49 writes the error correction stop command FEC OFF into the frame immediately before the execution of switching of the transmitters 33a and 33b, and transmits the frame to the called station. If the called station receives the error correction stop command FEC OFF, the called station does not execute error detection and correction processing when the next frame is received.

The switching controller 61 then issues a switching signal TRC. As a result, the flip-flop 63 is set at the timing of inserting check bits into the next frame. In other words, the flip-flop 63 outputs a switching signal TRC' in synchronism with the check bit insertion timing.

The delay circuit 64 delays the switching signal TRC' by the set delay time and then outputs it to the high-frequency signal switch 34. Therefore, at the point of time when the switching signal TRC' is input to the high-frequency signal switch 34, the check bits reach the high-frequency signal switch 34 via the active radio transmitter 33a. As a result, the high-frequency signal switch 34 switches the radio transmitters 33a, 33b when the check bits are input. Thereafter, the high-frequency signal switch 34 receives data via the new radio transmitter 33b (now active) and outputs it to the antenna.

It is also possible to insert the data processing unit 32 of the first embodiment at the stage before the error detection and correction code adding circuit 81, and the data processing unit 45 at the stage subsequent to the error detection and correction circuit 82. According to this structure, it is possible to transmit the error correction command stop FEC OFF to the called station by using a DSC bit.

(C) Radio equipment which makes the data string in an active data processing unit coincident with the data string in a standby data processing unit:

(a) First embodiment (a-1) Schematic Structure

Figure 24:
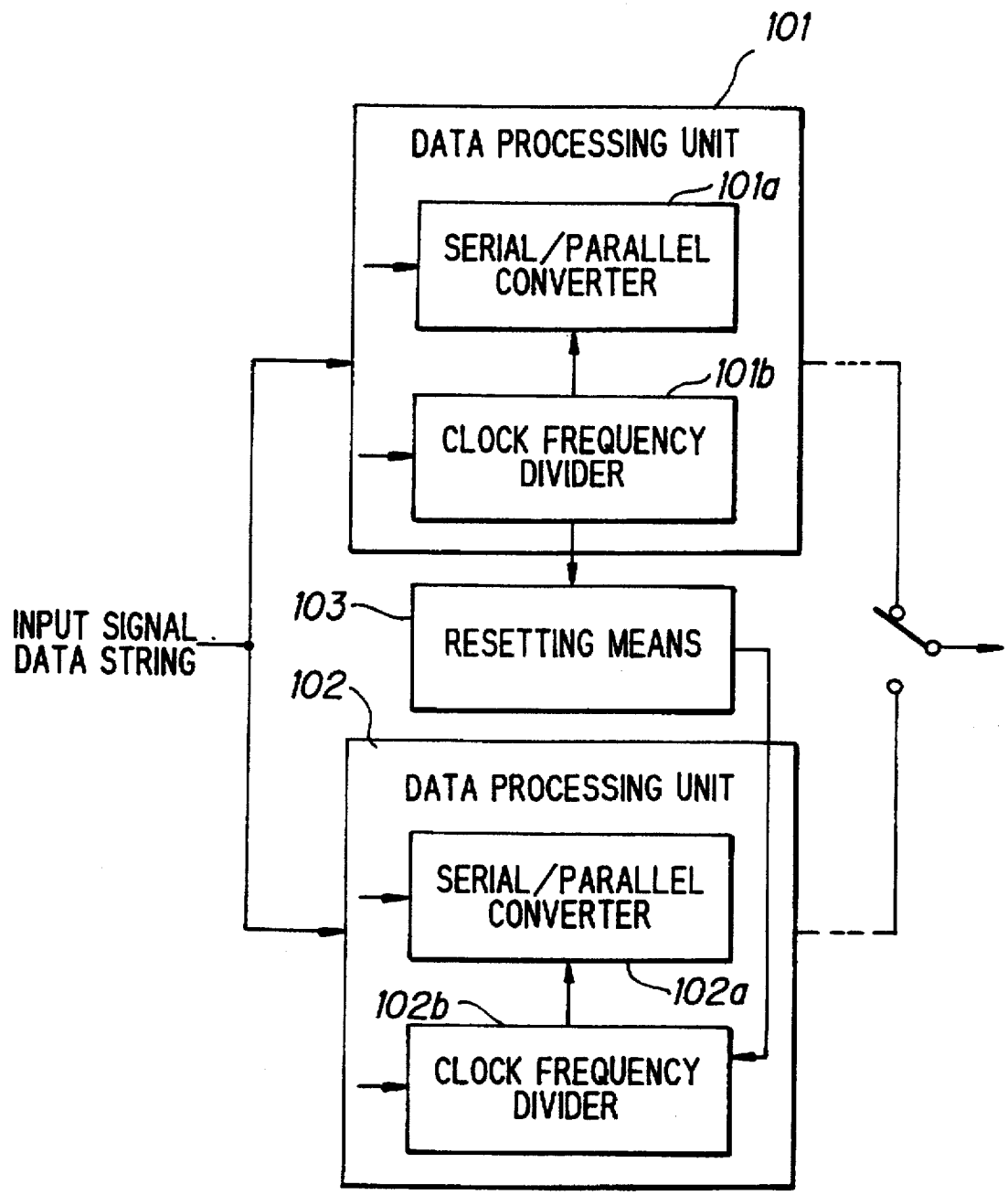
FIG. 24 is a schematic explanatory view of a radio equipment which makes the data string in an active data processing unit coincident with the data string in a standby data processing unit.

FIG. 24 is a schematic explanatory view of a radio equipment which makes the data string in an active data processing unit coincident with the data string in a standby data processing unit according to the present invention.

The radio equipment is composed of (1) serial/parallel converters 101a, 102a provided in the active and standby data processing units 101, 102 having a redundant structure so as to convert a string of data signals which are input in bit series into a parallel data signal string, (2) clock frequency dividers 101b, 102b provided in the active and standby data processing units 101, 102 so as to divide the frequency of an input clock and supply the clock signals to the respective serial/parallel converters 101a, 102a, (3) a resetting means 103 for resetting the clock frequency divider 102b of one data processing unit 102 in accordance with the clock signal output from the clock frequency divider 101b of the other data processing unit 101 so as to make the parallel data signal string output from the serial/parallel converter 102a of the one data processing unit 102 coincident with the parallel data signal string output from the serial/parallel converter 101a of the other data processing unit 101.

Figure 25:
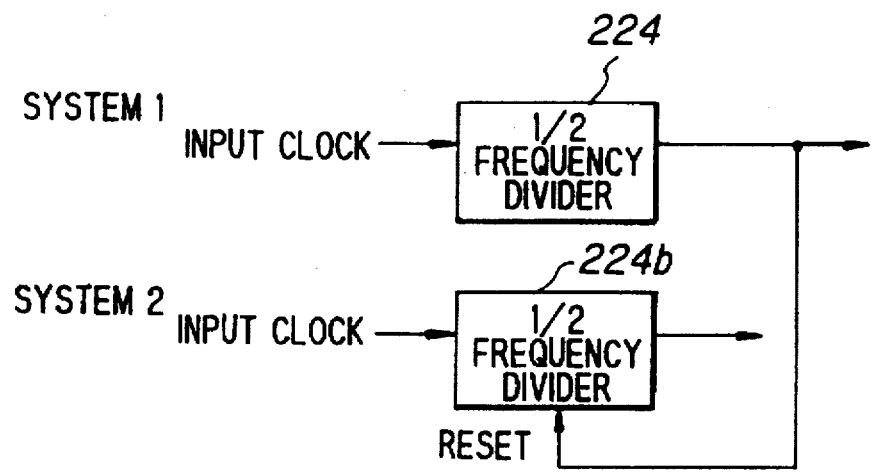
FIG. 25 is an explanatory view of the main part of a the embodiment of the radio equipment according to the present invention shown in FIG. 24.

FIG. 25 shows the main part of a first embodiment of the radio equipment according to the present invention shown in FIG. 24. The first embodiment is adaptable to a radio equipment of a master-slave synchronization system or a radio equipment of a pulse stuffing synchronization system.

According to this structure, since the resetting means 103 makes the phase of a clock signal output from the clock frequency divider 101b of one data processing unit 101 coincident with the phase of a clock signal output from the clock frequency divider 102b of the other data processing unit 102, a data signal string output from the serial/parallel converter 101a of the one data processing unit 101 is coincident with the data signal string output from the serial/parallel converter 102a of the other data processing unit 102. It is therefore possible to switch the one processing unit 101 to the other processing unit 102 without any momentary disconnection.

Referring to FIG. 25, in the first embodiment, one ½ frequency divider 224b for dividing the frequency of an input clock into a ½ frequency is reset by the output of the other ½ frequency divider 224 in the systems 1 and 2, which serve as the active data processing unit and the standby data processing unit, respectively, so that the phases of the output clocks become coincident with each other. Consequently, the data strings output from the serial/parallel converters 101a, 102a in the systems 1 and 2 become coincident with each other.

(a-2) Detailed structure of first embodiment

Figure 26:
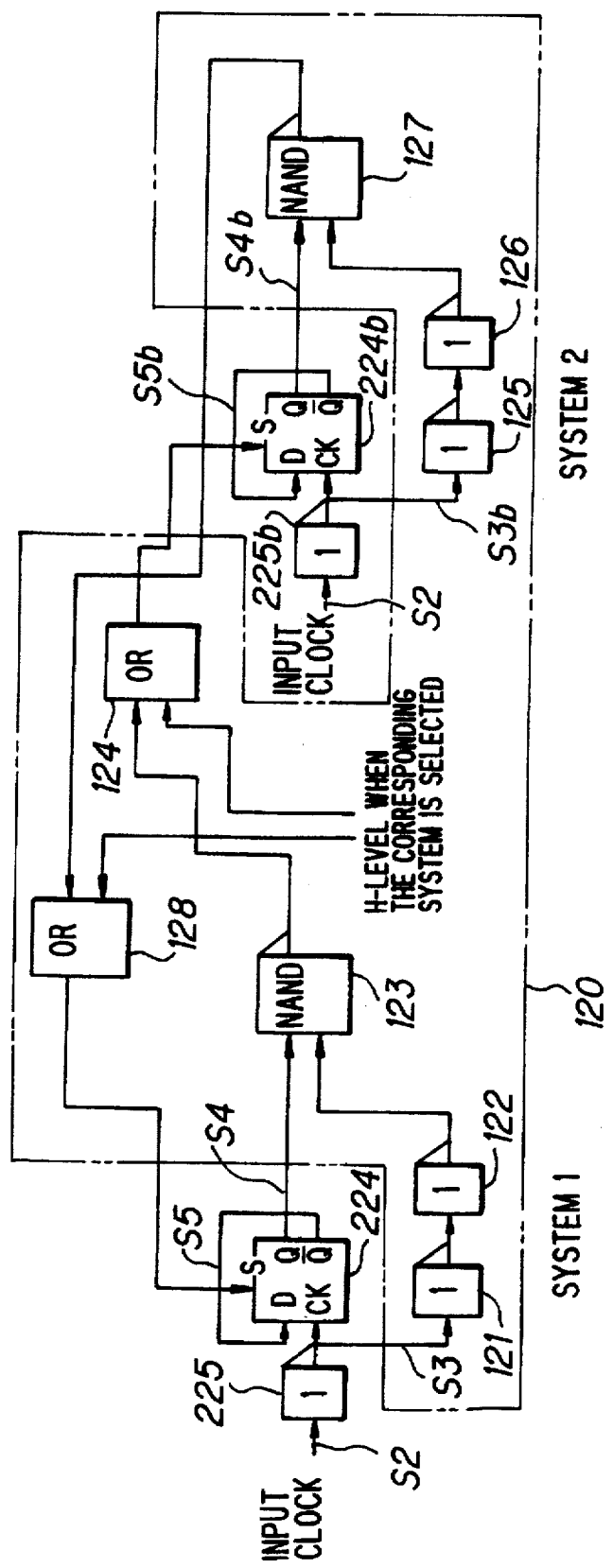
FIG. 26 shows the circuit diagram of the embodiment shown in FIG. 24.
Figure 40:
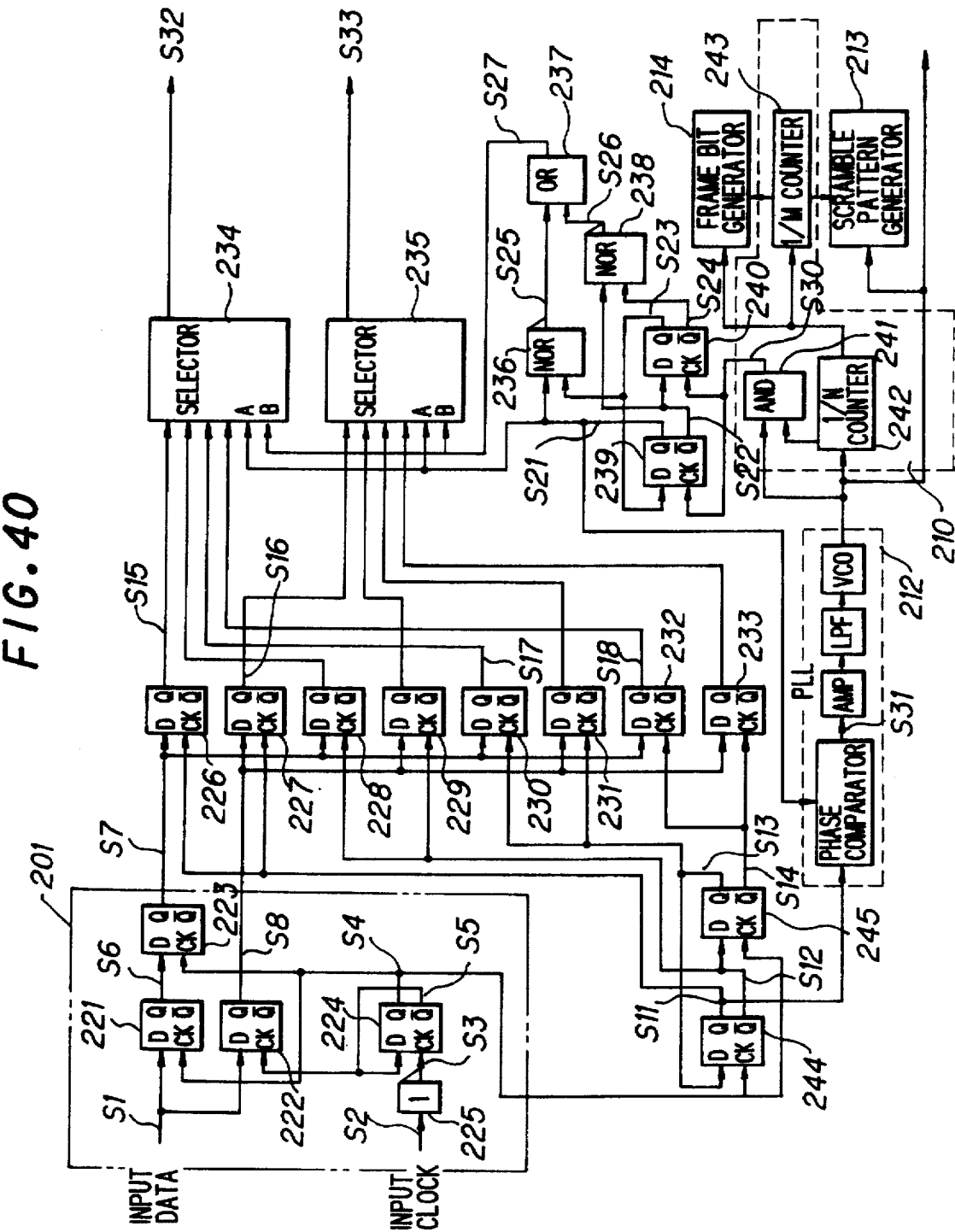
FIG. 40 shows the structure of the speed converter, etc. in the data processing unit shown in FIG. 39.
Figure 42:
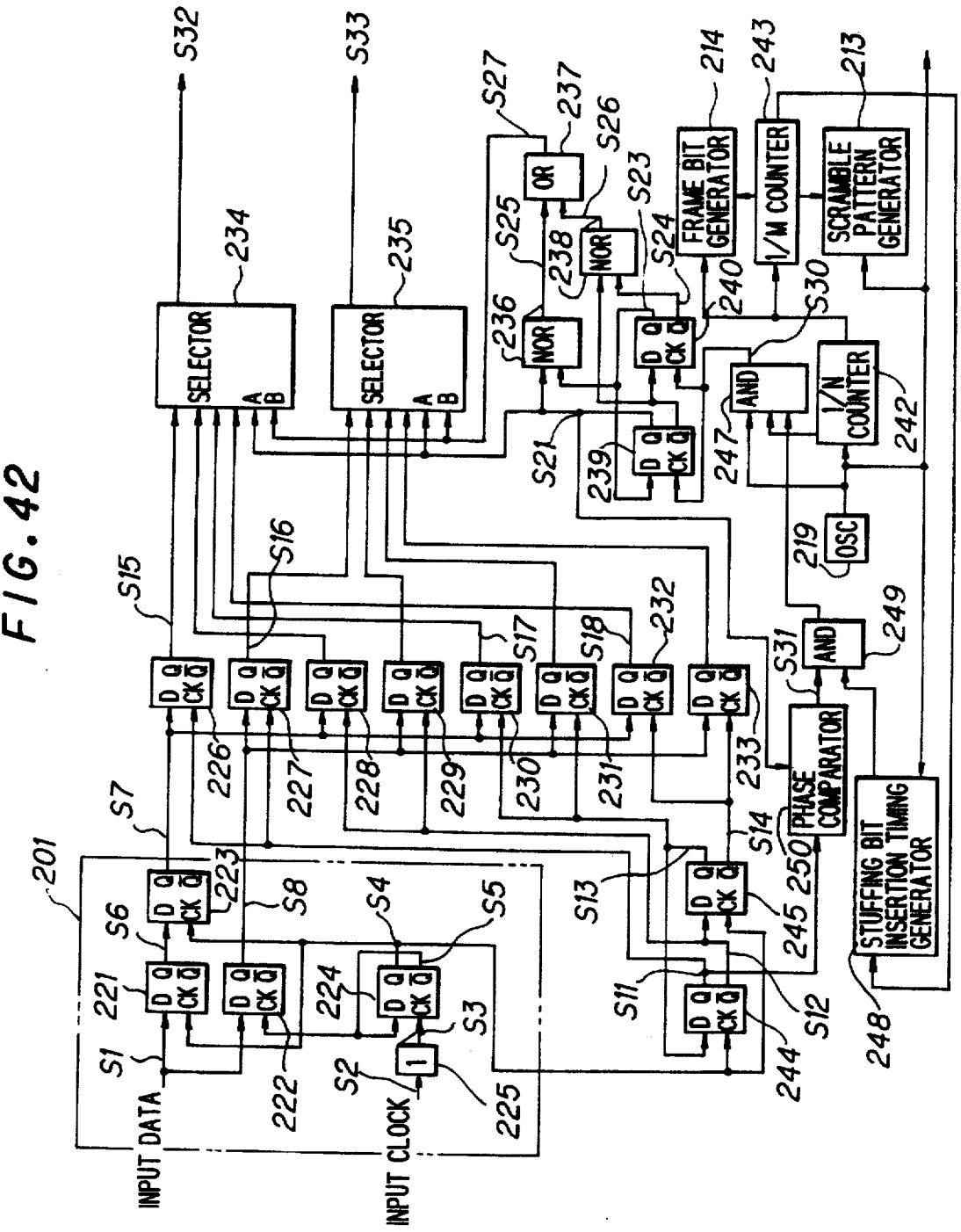
FIG. 42 shows the structure of the speed converter, etc. in the data processing unit shown in FIG. 41.

FIG. 26 is a detailed circuit diagram of the first embodiment. Since the circuit of the first embodiment is fundamentally the same as the circuits shown in FIGS. 40 and 42, different elements are mainly shown in FIG. 26, and the same numerals are provided for the same elements as those shown in FIGS. 40 and 42, explanation thereof being omitted.

In FIG. 26, in correspondence with the inverter 225, and the D-flip-flop 224 in one data processing unit (system 1) 101 are shown an inverter 225b and a D-flip-flop 224b in the other data processing unit (system 2) 102.

In the first embodiment, a reset circuit 120 is newly provided. In the system 1, the reset circuit 120 takes out an output signal S3 of the inverter 225 and inputs it to one input terminal of a NAND circuit 123 via two inverters 121, 122. The reset circuit 120 also inputs the Q-output S4 of the D-flip-flop 224 to the other input terminal of the NAND circuit 123. The output of the NAND circuit 123 is supplied to an OR circuit 124. Similarly, in the system 2, the reset circuit 120 takes out an output signal S3b of the inverter 225b and inputs it to one input terminal of a NAND circuit 127 via two inverters 125, 126. The reset circuit 120 also inputs the Q-output S4b of the D-flip-flop 224b to the other input terminal of the NAND circuit 127. The output of the NAND circuit 127 is supplied to an OR circuit 128.

A selection control signal is supplied to each of the OR circuits 124, 128 from a supervisory controller (not shown) or the like. That is, when the system 1 is selected as the active system, a high-level selection control signal is supplied to the OR circuit 128, while a low-level selection control signal is supplied to the OR circuit 124. On the other hand, when the system 2 is selected as the active system, a high-level selection control signal is supplied to the OR circuit 124, while a low-level selection control signal is supplied to the OR circuit 128. The output of the OR circuit 124 is supplied to the S-input terminal of the D-flip-flop 224b, and the output of the OR circuit 128 is supplied to the S-input terminal of the D-flip-flop 224.

In this structure, if it is assumed that the system 1 is used as the active system, so that a high-level selection control signal is supplied to the OR circuit 128 and a low-level selection control signal is supplied to the OR circuit 124, and it is also assumed in both D-flip-flops 224, 224b that when a high-level signal is input to the S-input terminal, the signal exerts no influence but when a low-level signal is input, a high-level signal is output from the Q-output terminal and a low-level signal is output from the inverted Q-output terminal, then the D-flip-flops 224 in the system 1 is not influenced by the output of the NAND circuit 127 in the system 2, because the OR circuit 128 outputs a high-level signal to the S-input terminal of the D-flip-flop 224. On the other hand, the OR circuit 124 outputs the output of the NAND circuit 123 as it is to the S-input terminal of the D-flip-flop 224b. The NAND circuit 123 outputs a low-level signal when both signals S4 and S3 are at a high level, and the low-level signal is output to the S-input terminal of the D-flip-flop 224b in the system 2. Therefore, when both signals S4, S3 in the system 1 are at a high level, the signal S4b in the system 2 is a high-level signal. In other words, the phase of the output clock of the D-flip-flop 224, which is one ½ frequency divider for dividing the frequency of an input clock into a ½ frequency, is coincident with the phase of the output clock of the D-flip-flop 224b, which is the other ½ frequency divider, so that the data string which is output from each serial/parallel converter is coincident. When the system 2 is used as the active radio transmitter, if a high-level signal is supplied to the OR circuit 124 and a low-level signal is supplied to the OR circuit 128, the operation is the same except for inverting the systems 1 and 2.

In this manner, if the radio equipment of this embodiment adopts a master-slave synchronization system, it is possible to switch the active system over to the standby system without any momentary disconnection, so long as the frame phases are coincident. If the radio equipment of this embodiment adopts a pulse stuffing synchronization system, it is possible to switch the active system to the standby system without any momentary disconnection so long as the frame phases and the stuffing phases are coincident.

(b) Second embodiment (b-1) Schematic structure

Figure 27:
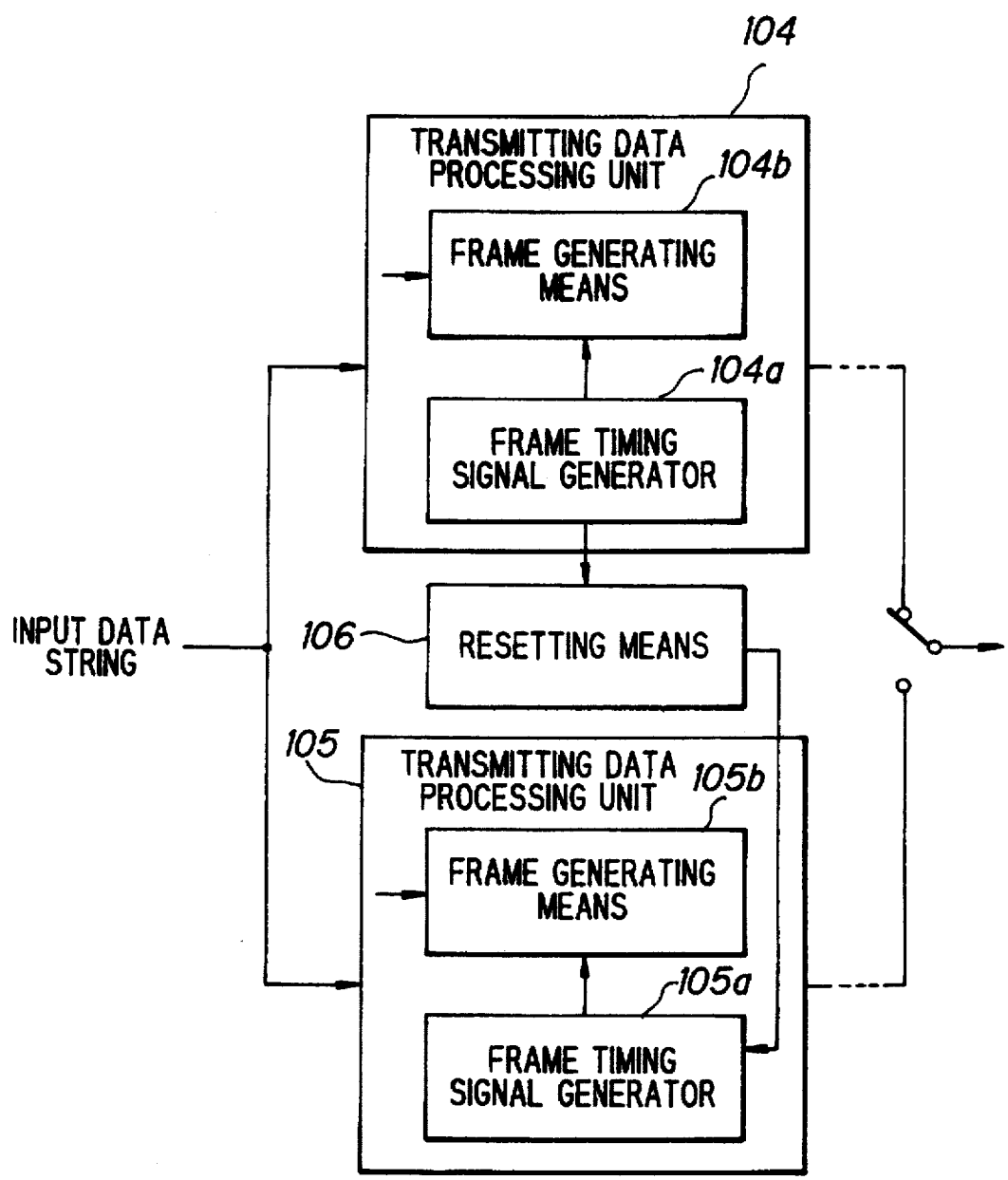
FIG. 27 is a schematic explanatory view of a radio equipment which makes the frame phase in an active data processing unit coincident with the frame phase in a standby data processing unit.

FIG. 27 is a schematic explanatory view of a second embodiment of the radio equipment which makes the frame phase in active data processing unit coincident with the frame phase in standby processing unit.

The second embodiment of the radio equipment is composed of (1) frame timing signal generators 104a, 104b provided in the active and standby data processing units 104, 105 having a redundant structure so as to convert a string of data signals which are input in bit series into a parallel data signal string, (2) frame generating means /104b, 105b provided in the active and standby data processing units 104, 105 so as to assemble and output input data signals in the form of a frame in accordance with the frame timing signals from the respective frame timing signal generators 104a, 105a, (3) a resetting means 103 for resetting the frame timing signal generator 105a of one data processing unit 105 in accordance with timing signal output from the frame timing signal generator 104a of the other data processing unit 104 so as to make the frame phase of the data signal output from the frame generating means 105b of the one data processing unit 105 coincident with the frame phase of the data signal output from the frame generating means 104b of the other data processing unit 104. The second embodiment is adaptable to a radio equipment of a pulse stuffing synchronization system.

According to this structure, since the resetting means 106 makes the phase of a timing signal output from the clock frame timing signal generator 104a of one data processing unit 104 coincident with the phase of a timing signal output from the timing signal generator 105a of the other data processing unit 105, the frame phase of the data signal output from the frame generating means 104b of the one data processing unit 104 is coincident with frame phase of the data signal output from the frame generating means 105b of the other data processing unit 105. It is therefore possible to switch the one processing unit 104 over to the other processing unit 105 without any momentary disconnection.

Figure 28:
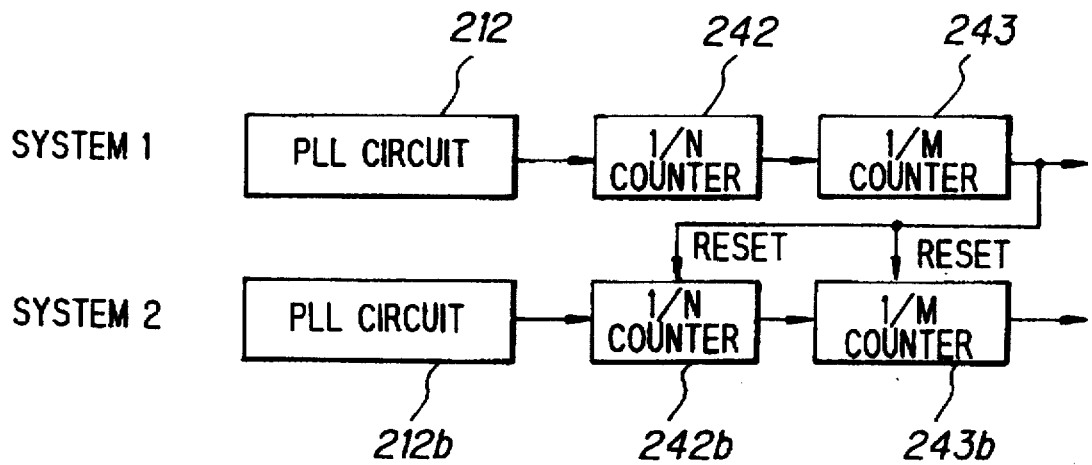
FIG. 28 is an explanatory view of the main part of the embodiment shown in FIG. 27.

To state this concretely with reference to FIG. 28, in the second embodiment, the frame timing signal generator 104a in the system 1 as the data processing unit is composed of a PLL circuit 212, a 1/N counter 242 and a 1/M counter 243, while the frame timing signal generator 104b in the system 2 as the data processing unit is composed of a PLL circuit 212b, a 1/N counter 242b and a 1/M counter 243b. Each of the 1/N counters 242, 242b generates a subframe timing, and each of the 1/M counters 243, 243b generates a multiframe timing. When one 1/M counter 243 in one system is carried out, the 1/N counter 242b and the 1/M counter 243b are reset, so that the 1/N counter 242, the 1/M counter 243, the 1/N counter 242b and the 1/M counter 243b are operated in synchronism with each other. In this manner, the frame phases in the systems 1 and 2 become coincident.

(b-2) Detailed structure of second embodiment

Figure 29:
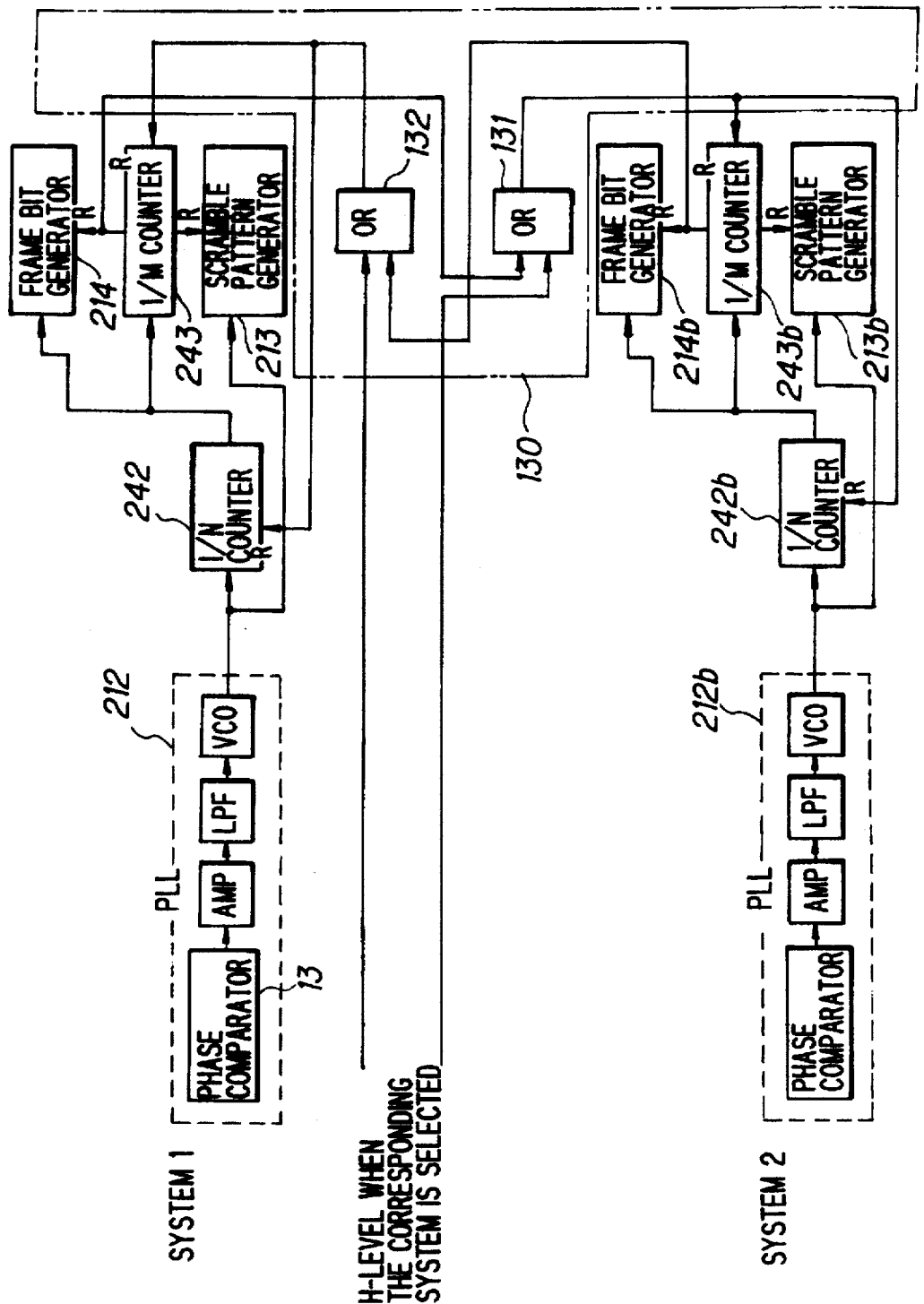
FIG. 29 shows the circuit diagram of the embodiment shown in FIG. 27.

FIG. 29 is a detailed circuit diagram of the second embodiment. Since the circuit of the second embodiment is fundamentally the same as the circuit shown in FIG. 40, different elements are mainly shown in FIG. 29, and the same numerals are provided for the same elements as those shown in FIG. 40, explanation thereof being omitted.

In FIG. 29, in correspondence with the PLL circuit 212, the 1/N counter 242, the frame bit generator 214, the 1/M counter 243, and the scramble pattern generator 213 in one data processing unit (system 1) 104 are shown the PLL circuit 212b, the 1/N counter 242b, the frame bit generator 214b, the 1/M counter 243b and the scramble pattern generator 213b in the other data processing unit (system 2) 105.

In the second embodiment, a reset circuit 130 is newly provided. An output signal of the M/1 counter 243 in the system 1 is input to an OR circuit 131, and an output signal of the M/1 counter 243b in the system 2 is input to an OR circuit 132.

A selection control signal is supplied to each of the OR circuits 131, 132 from a supervisory controller (not shown) or the like. That is, when the system 1 is selected as the active radio transmitter, a high-level selection control signal is supplied to the OR circuit 132, while a low-level selection control signal is supplied to the OR circuit 131. On the other hand, when the system 2 is selected as the active radio transmitter, a high-level selection control signal is supplied to the OR circuit 131, while a low-level selection control signal is supplied to the OR circuit 132. The output of the OR circuit 131 is supplied to the reset (R) terminals of the 1/M counter 243b and the 1/N counter 242b in the system 2, while the output of the OR circuit 132 is supplied to the reset (R) terminals of the 1/M counter 243 and the 1/N counter 242 in the system 1.

In this structure, if it is assumed that the system 1 is used as the active radio transmitter, so that a high-level selection control signal is supplied to the OR circuit 132 and a low-level selection control signal is supplied to the OR circuit 131, and it is also assumed in both 1/M counters 243, 243b and the 1/N counters 242, 242b that when a high-level signal is input to the reset terminal, the signal exerts no influence but when a low-level signal is input, the counter is reset, then neither the 1/M counter 243 nor the 1/N counter 242 in the system 1 is influenced by the output of the 1/M counter 243b or the 1/N counter 242b in the system 2, because the OR circuit 132 outputs a high-level signal to the reset (R) terminals of the 1/M counter 243 and the 1/N counter 242 in the system 1. On the other hand, the OR circuit 131 outputs a low-level carry signal of the 1/M counter 243 as it is to the reset terminals of the 1/M counter 243b and the 1/N counter 242b in the system 2. Therefore, the 1/M counter 243 in the system 1 operates in synchronism with the 1/M counter 243b and the 1/N counter 242b in the system 2. In this manner, the frame phase of a data signal in one of the systems 1 and 2 is coincident with the frame phase of a data signal in the other. When the system 2 is used as the active radio transmitter, if a high-level signal is supplied to the OR circuit 131 and a low-level signal is supplied to the OR circuit 132, the operation is the same except for inverting the systems 1 and 2.

In this manner, it is possible to switch the active system over to the standby system without any momentary disconnection, so long as the data strings are coincident.

(c) Third embodiment (c-1) Schematic structure

Figure 30:
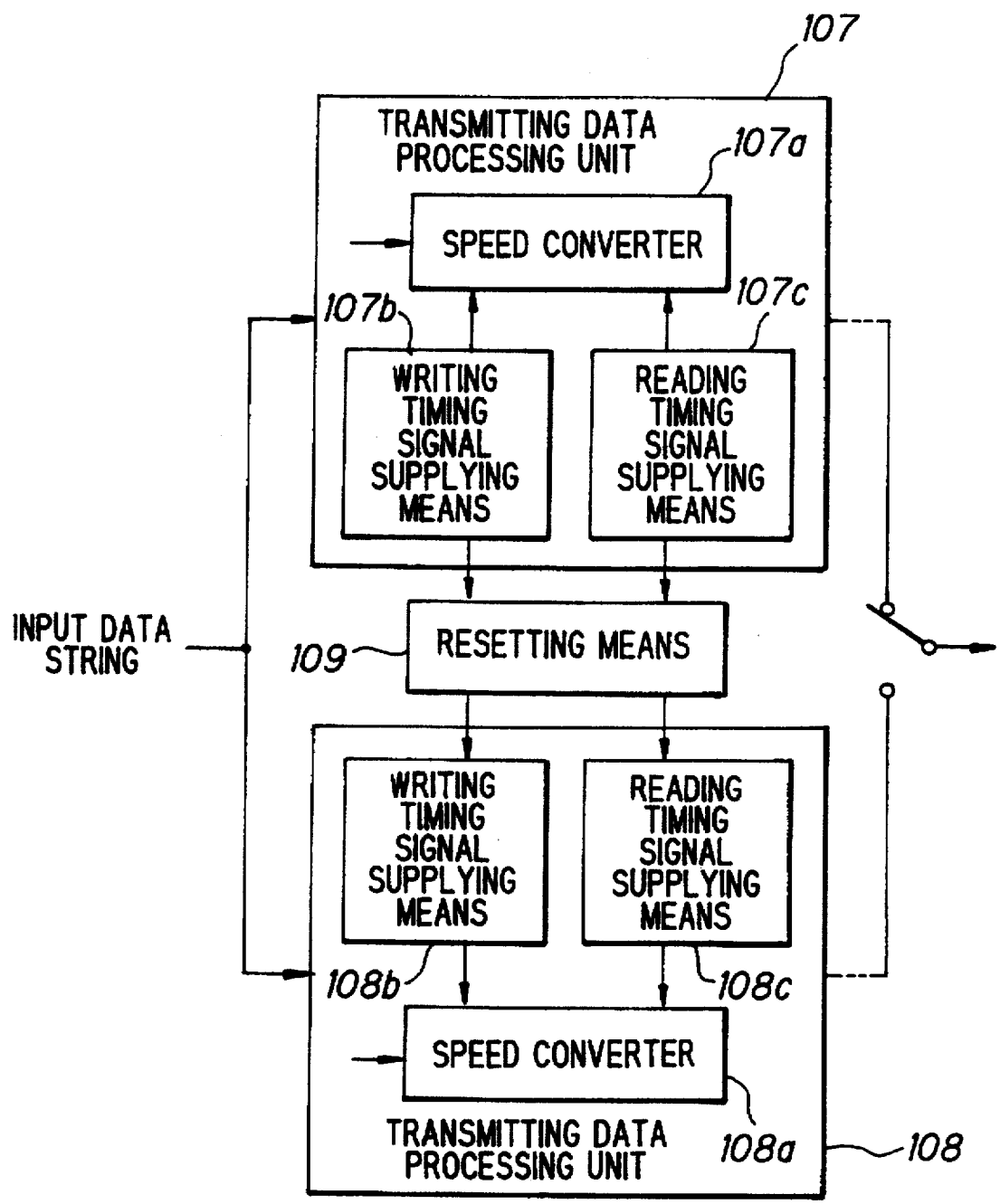
FIG. 30 is a schematic explanatory view of a radio equipment according to the present invention which makes the staffing bit phase in an active data processing unit coincident with the staffing bit phase in a standby data processing unit.

FIG. 30 is a schematic explanatory view of a third embodiment of the radio equipment which makes the phase of stuff in bit in the active data processing unit and the phase of stuffing bit in the standby data processing unit.

The third embodiment of the radio equipment is composed of (1) speed converters 107a, 108a provided in the active and standby data processing units 107, 108 having a redundant structure so as to convert the input rate of a data signal string by inserting a stuffing bit, (2) writing timing signal supplying means 107b, 108b provided in the active and standby data processing units 107, 108 so as to supply writing timing signals to the respective speed converters 107a, 108a, (3) reading timing signal supplying means 107c, 108c provided in the active and standby data processing units 107, 108 so as to supply reading timing signals to the respective speed converters 107a, 108a, (4) a resetting means 9 for resetting the writing timing signal supplying means 108b of one data processing unit 108 in accordance with the timing signal output from the writing timing signal supplying means 107b of the other data processing unit 107, and resetting the reading timing signal supplying means 108c of the one data processing unit 108 in accordance with the timing signal output from the reading timing signal supplying means 107c of the other data processing unit 107, so as to make the stuffing phase of the one data processing unit 108 coincident with the stuffing phase of the other data processing unit 107. The third embodiment is adaptable to a radio equipment of a pulse stuffing synchronization system.

According to this structure, the resetting means 109 makes the phase of a timing signal output from the writing timing signal supplying means 107b of one data processing unit 107 coincident with the phase of a timing signal output from the writing timing signal supplying means 108b of the other data processing unit 108, and makes the phase of a timing signal output from the reading timing signal supplying means 107c of one data processing unit 107 coincident with the phase of a timing signal output from the reading timing signal supplying means 108c of the other data processing unit 108. Consequently, the operation of a phase comparator for stuffing which is included in the speed converter 107a of one data processing unit 107 is coincident with the operation of a phase comparator for stuffing which is included in the speed converter 108a of the other data processing unit 108. Since each phase comparator originally outputs a stuffing request signal when the phase difference in the writing clock in the reading clock in the corresponding data processing unit reaches a certain value, the stuffing phase of one data processing unit 107 is coincident with the stuffing phase of the other data processing unit 108. It is therefore possible to switch the one data processing unit 107 to the other data processing unit 108 without any momentary disconnection.

(c-2) Frame phase adjusting control

Figure 31:
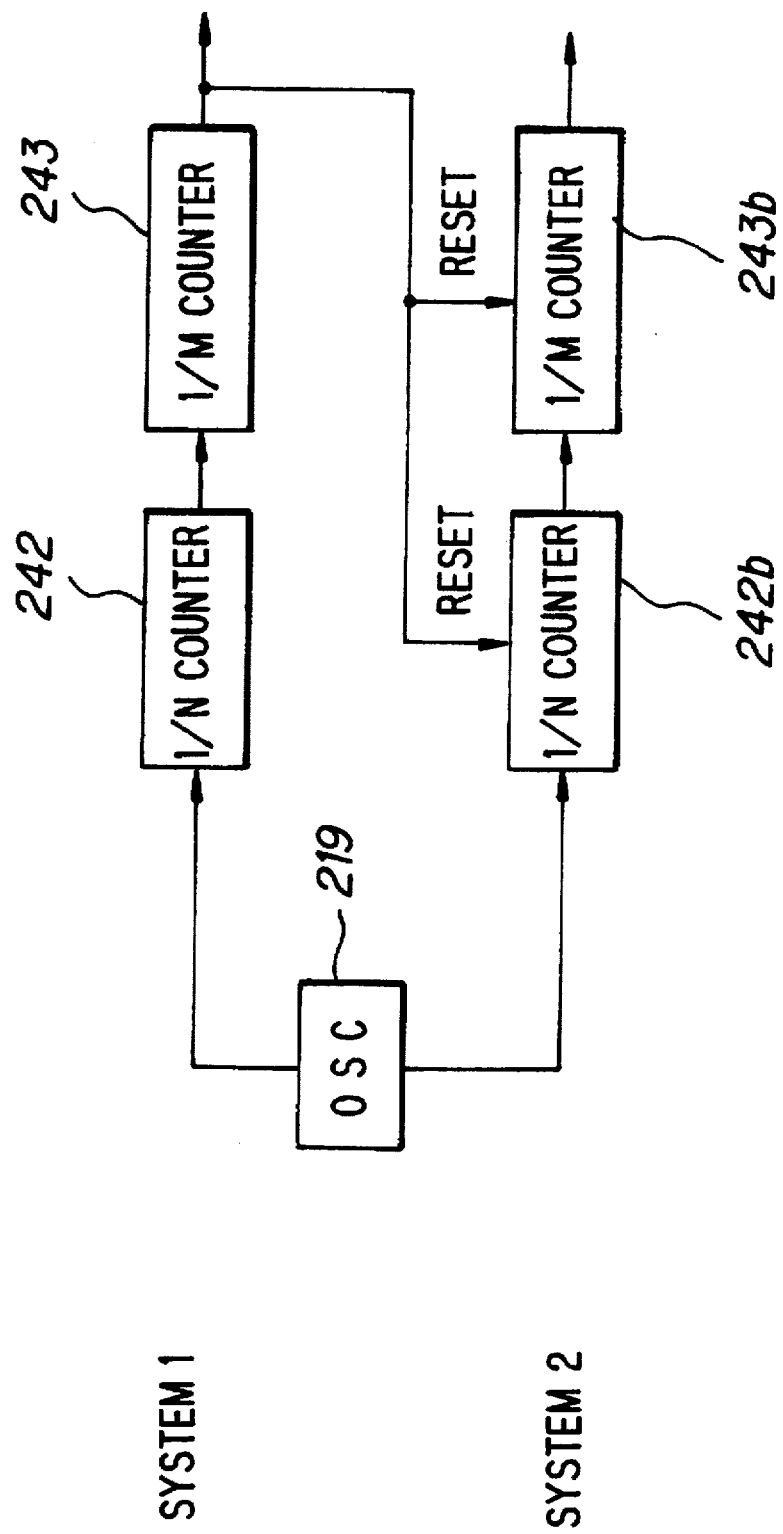
FIG. 31 is an explanatory view of the main part of the embodiment shown in FIG. 30.

FIG. 31 shows the structure of a frame phase adjusting portion in the third embodiment shown in FIG. 30. In FIG. 31, the oscillator (OSC) 219 is commonly used in the systems 1 and 2. The oscillator 219, the 1/N counter 242 and the 1/M counter 243 constitute a frame timing signal generator in the system 1, and the oscillator 219, the 1/N counter 242b and the 1/M counter 243b constitute a frame timing signal generator in the system 2. Each of the 1/N counters 242, 242b generates a subframe timing signal, and each of the 1/M counters 243, 243b generates a multiframe timing signal. When the 1/M counter 243 in one system is carried out, the 1/N counter 242b and the 1/M counter 243b are reset so that the 1/N counter 242, the 1/M counter 243, the 1/N counter 242b and the 1/M counter 243b operate in synchronism with each other. In this manner the frame phases become coincident in the systems 1 and 2.

(c-3) Detailed structure of third embodiment (reading side)

Figure 32:
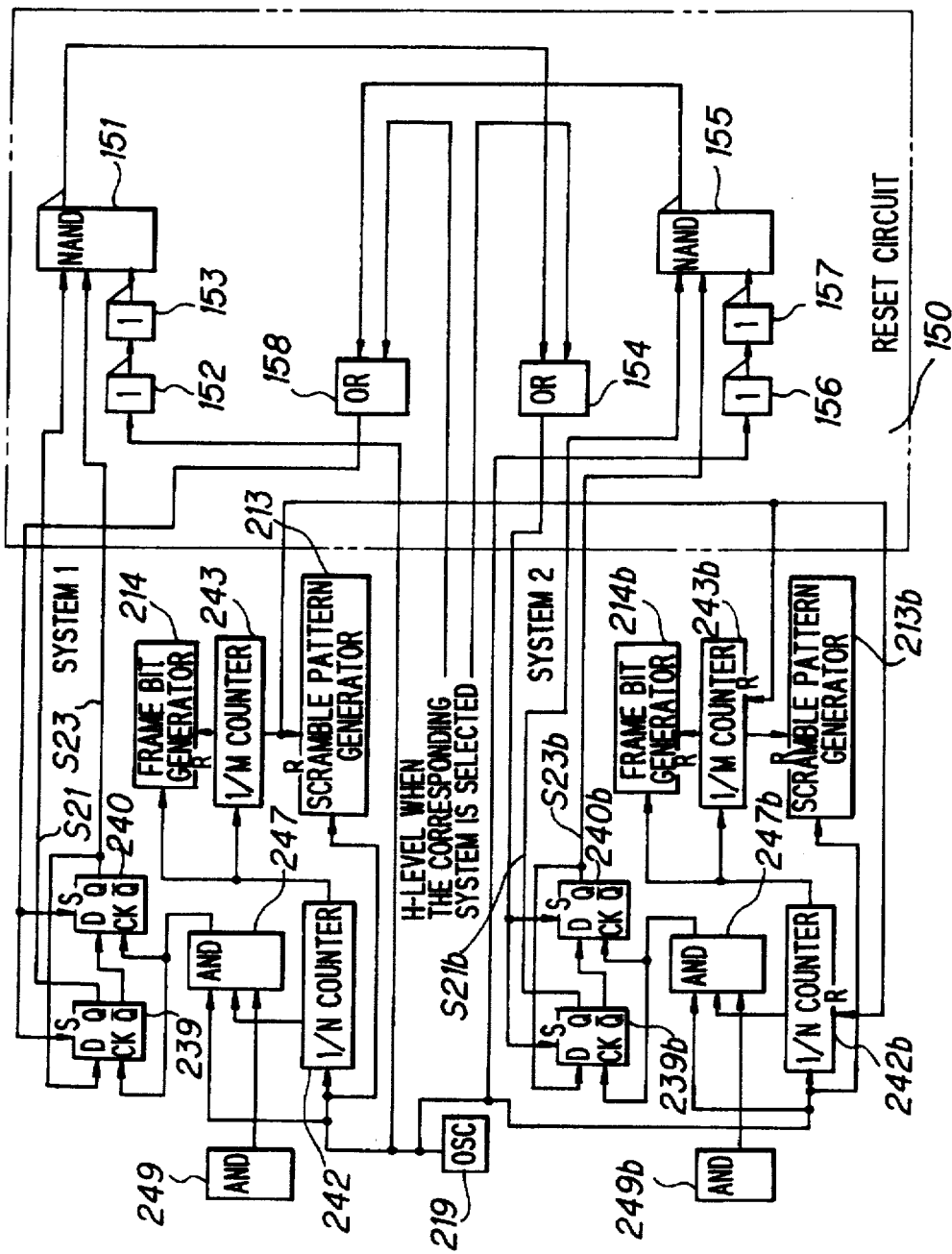
FIG. 32 shows the circuit diagram on the reading side of the embodiment shown in FIG. 30.

FIG. 32 shows the detailed circuit diagram on the reading side of the third embodiment shown in FIG. 30. Since the circuit of the third embodiment is fundamentally the same as the circuit shown in FIG. 42, different elements are mainly shown in FIG. 32, and the same numerals are provided for the same elements as those shown in FIG. 42, explanation thereof being omitted.

In FIG. 32, in correspondence with the AND circuits 249, 247, the 1/N counter 242, the frame bit generator 214, the 1/M counter 243, the scramble pattern generator 213 and the D-flip-flops 239, 240 in one data processing unit 107 (system 1) are shown the AND circuits 249b, 247b, the 1/N counter 242b, the frame bit generator 214b, the 1/M counter 243b, the scramble pattern generator 213b and the D-flip-flops 239b, 240b in the other data processing unit 108 (system 2).

In the third embodiment, a reset circuit 150 is newly provided. An output signal of the M/1 counter 243 in the system 1 is input to the reset (R) terminals of the 1/M counter 243b and the 1/N counter 242b in the system 2.

The Q-output S21 of the D-flip-flop 239 and the Q-output S23 of the D-flip-flop 240 are input to a NAND circuit 151. The output of the oscillator 219 commonly used in the systems 1, 2 is input to the NAND circuit 151 via inverters 152 and 153. The output of the NAND circuit 151 is supplied to an OR circuit 154. Similarly, the Q-output S21b of the D-flip-flop 239b and the Q-output S23b of the D-flip-flop 240b in the system 2 are input to a NAND circuit 155. The output of the oscillator 219 commonly used in the systems 1, 2 is input to the NAND circuit 155 via inverters 156 and 157. The output of the NAND circuit 155 is supplied to an OR circuit 158.

A selection control signal is supplied to each of the OR circuits 154, 158 from a supervisory controller (not shown) or the like. That is, when the system 1 is selected as the active radio transmitter, a high-level selection control signal is supplied to the OR circuit 158, while a low-level selection control signal is supplied to the OR circuit 154. On the other hand, when the system 2 is selected as the active radio transmitter, a high-level selection control signal is supplied to the OR circuit 154, while a low-level selection control signal is supplied to the OR circuit 158. The output of the OR circuit 154 is supplied to the S-input terminals of the D-flip-flops 239b, 240b and the output of the OR circuit 158 is supplied to the S-input terminals of the D-flip-flops 239, 240.

In this structure, a low-level carry signal of the 1/M counter 243 in the system 1 is output as it is to the reset terminals of the 1/M counter 243b and the 1/N counter 242b. Therefore, the 1/M counter 243 in the system 1 operates in synchronism with the 1/M counter 243b and the 1/N counter 242b in the system 2. In this manner, the frame phase of a data signal in one of the systems 1 and 2 is coincident with the frame phase of a data signal in the other.

If it is assumed that the system 1 is used as the active radio transmitter, so that a high-level selection control signal is supplied to the OR circuit 158 and a low-level selection control signal is supplied to the OR circuit 154, and it is also assumed in each of the D-flip-flops 239, 240, 239b and 240b that when a high-level signal is input to the S-input terminal, the signal exerts no influence but when a low-level signal is input, a high-level signal is output from the Q-output terminal and a low-level signal is output from the inverted Q-output terminal, then the D-flip-flops 239, 240 in the system 1 are not influenced by the output of the NAND circuit 155 in the system 2, because the OR circuit 158 outputs a high-level signal to the S-input terminals of the D-flip-flops 239, 240. On the other hand, the OR circuit 154 outputs the output of the NAND circuit 151 as it is to the S-input terminals of the D-flip-flops 239b, 240b. The NAND circuit 151 outputs a low-level signal when all of the signals S21, and S23 and the output of the oscillator 219 are at a high level, and the low-level signal is output to the S-input terminals of the D-flip-flop 239b, 240b in the system 2. Therefore, when all the signals S21, S23 and the output of the oscillator 219 in the system 1 are at a high level, the signals S21b and S23b in the system 2 are high-level signals. In other words, the clocks for stuffing on the reading side of the speed converters are synchronous in the systems 1 and 2. When the system 2 is used as the active radio transmitter, if a high-level signal is supplied to the OR circuit 154 and a low-level signal is supplied to the OR circuit 158, the operation is the same except for inverting the systems 1 and 2.

(c-4) Detailed structure of third embodiment (writing side)

Figure 33:
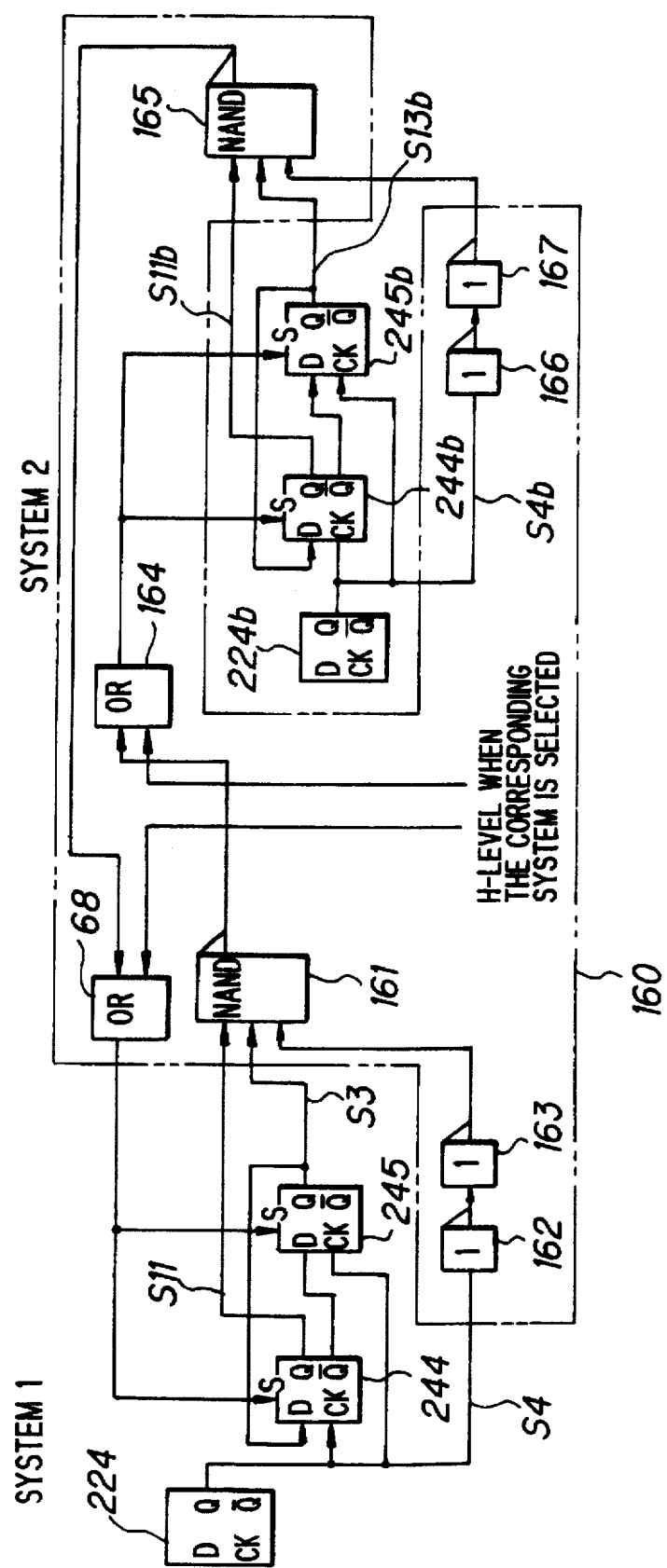
FIG. 33 shows the circuit diagram on the writing side of the embodiment shown in FIG. 30.
Figure 34:
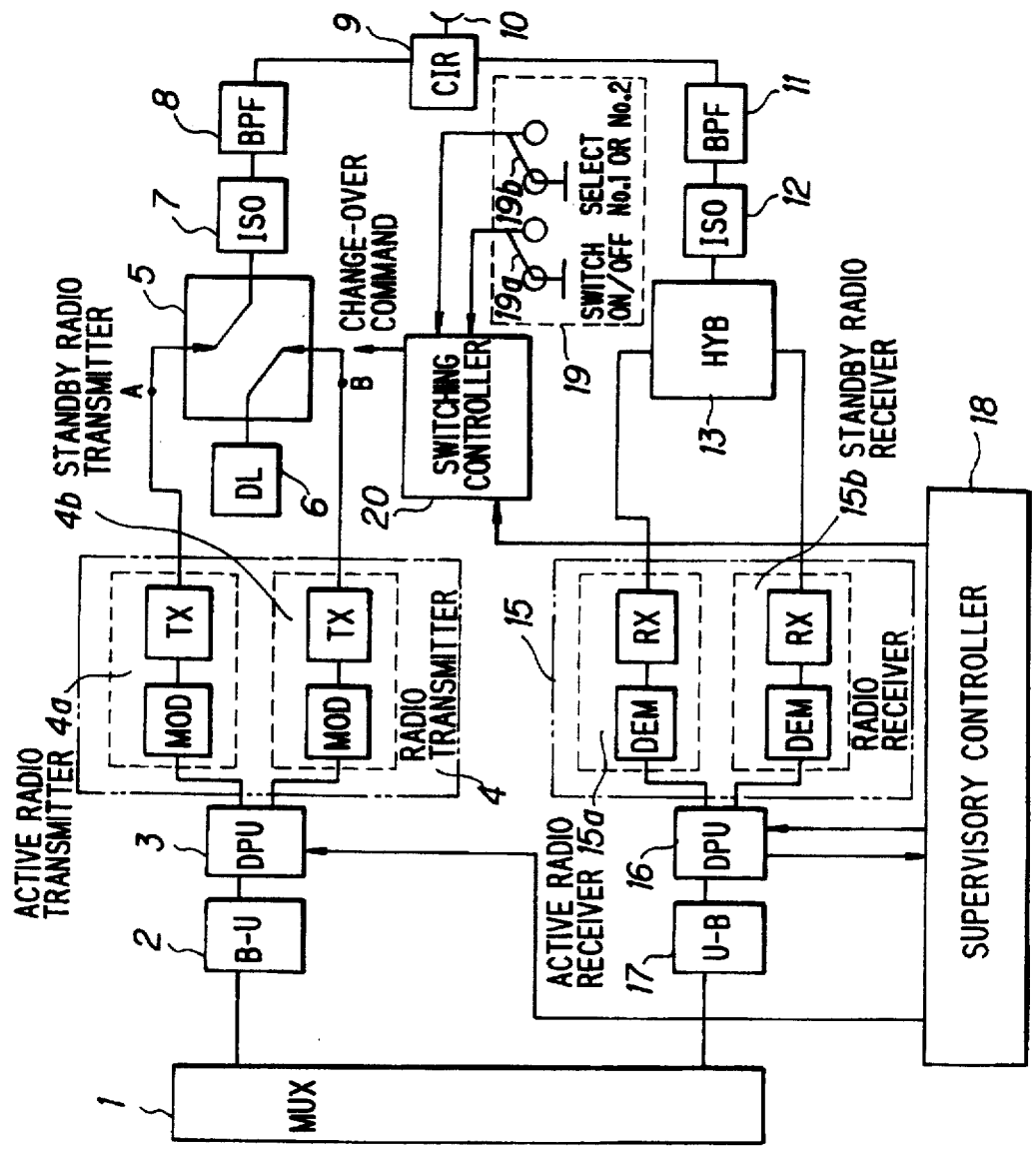
FIG. 34 shows the structure of a conventional radio equipment.

FIG. 33 shows the detailed circuit diagram on the writing side of the third embodiment shown in FIG. 30. Since the circuit of the third embodiment is fundamentally the same as the circuit shown in FIG. 42, different elements are mainly shown in FIG. 33, and the same numerals are provided for the same elements as those shown in FIG. 42, explanation thereof being omitted.

In FIG. 33, in correspondence with the D-flip-flops 224, 244, 245 in one data processing unit 107 (system 1) are shown D-flip-flops 224b, 244b, 245b in the other data processing unit 108 (system 2).

In the third embodiment, a reset circuit 160 is newly provided. The Q-output S11 of the D-flip-flop 244 and the Q-output S13 of the D-flip-flop 245 are input to a NAND circuit 161. The Q-output S4 of the D-flip-flop 224 is input to the NAND circuit 161 via inverters 162 and 163. Similarly, the Q-output S11b of the D-flip-flop 244b and the Q-output S13b of the D-flip-flop 224b in the system 2 are input to a NAND circuit 165. The Q-output S4b of the D-flip-flop 224b is input to the NAND circuit 165 via inverters 166 and 167. The output of the NAND circuit 165 is supplied to an OR circuit 168.

A selection control signal is supplied to each of the OR circuits 164, 168 from a supervisory controller (not shown) or the like. That is, when the system 1 is selected as the active radio transmitter, a high-level selection control signal is supplied to the OR circuit 168, while a low-level selection control signal is supplied to the OR circuit 164. On the other hand, when the system 2 is selected as the active radio transmitter, a high-level selection control signal is supplied to the OR circuit 164, while a low-level selection control signal is supplied to the OR circuit 168. The output of the OR circuit 164 is supplied to the S-input terminals of the D-flip-flops 244b, 245b and the output of the OR circuit 168 is supplied to the S-input terminals of the D-flip-flops 244, 245.

In this structure, if it is assumed that the system 1 is used as the active radio transmitter, so that a high-level selection control signal is supplied to the OR circuit 168 and a low-level selection control signal is supplied to the OR circuit 164, and it is also assumed in each of the D-flip-flops 244, 245, 244b and 245b that when a high-level signal is input to the S-input terminal, the signal exerts no influence but when a low-level signal is input, a high-level signal is output from the Q-output terminal and a low-level signal is output from the inverted Q-output terminal, then the D-flip-flops 244, 245 in the system 1 are not influenced by the output of the NAND circuit 165 in the system 2, because the OR circuit 168 outputs a high-level signal to the S-input terminals of the D-flip-flops 244, 245. On the other hand, the OR circuit 164 outputs the output of the NAND circuit 161 as it is to the S-input terminals of the D-flip-flops 244b, 245b. The NAND circuit 161 outputs a low-level signal when all of the signals S11, S13 and S4 are at a high level, and the low-level signal is output to the S-input terminals of the D-flip-flop 244b, 2405 in the system 2. Therefore, when all the signals S21, S23 and S4 in the system 1 are at a high level, the signals S11b and S13b in the system 2 are high-level signals. In other words, the clocks for stuffing on the writing side of the speed converters are synchronous in the systems 1 and 2. When the system 2 is used as the active radio transmitter, if a high-level signal is supplied to the OR circuit 164 and a low-level signal is supplied to the OR circuit 168, the operation is the same except for inverting the systems 1 and 2.

In this manner, in the third embodiment, frame phases are coincident in the systems 1 and 2, and since the clocks for stuffing on the writing side and the reading side of the speed converters are synchronous in the systems 1 and 2, stuffing phases are also coincident. Therefore, if the data strings are coincident, it is possible to switch the active system to the standby system without any momentary disconnection.

In any of the above-described embodiments, an input signal is converted into two signal components in the serial/parallel converter. This is due to a 4-PSK modulation system. If another modulation system is adopted, the number of converted signal components may be increased. The present invention is also adaptable to such a case.

Although the subframe timings and the multiframe timings are made coincident in the systems 1 and 2 in order to make the frame phases coincident, in the case of a single frame structure, it is only necessary to make the frame timings coincident.

As described above, since a radio equipment according to the present invention is provided with a signal route generator for selecting a high-frequency signal output from each of the active radio transmitter and the standby radio transmitter and inputting the high-frequency signal to the standby radio receiver so as to generate a signal route for adjusting the delay time of the corresponding radio transmitter; a means provided in a transmitting data processing unit so as to supply the frame data signal and the clock signal to the received data processing unit after a predetermined delay; a phase comparator provided in a received data processing unit so as to compare the phases of the frame data signal and the clock signal which are received from the standby radio receiver with the phases of the frame data signal and the clock signal which are directly received from the transmitting data processing unit, and output signals indicating the coincidence/discordance of the data phase and the coincidence/discordance of the clock phase, respectively; and a delay time adjuster provided in the active radio transmitter and the standby radio transmitter so as to adjust the phases of the frame data signal and the clock signal input from the transmitting data processing unit so that both the phases of the two clock signals and the phases of the two items of data input to the phase comparator are coincident with each other, it is possible to adjust the delay times of actual and standby radio transmitters coincident, in other words, to make the signal phases of the two radio transmitters coincident with each other by a simple structure without using a measuring machine or a measuring system.

According to the present invention, when the phases of the frame data signal and the clock signal received from the active radio transmitter are different from those of the frame data signal and the clock signal directly received from the transmitting data processing unit, the delay time adjuster provided in the transmitting data processing unit adjusts the delay time so that both the phases of the two frame data signals and the two clock signals are coincident with each other. When the phases of the frame data signal and the clock signal received from the standby radio transmitter via the signal route are different from those of the frame data signal and the clock signal received from the transmitting data processing unit via the delay time adjuster, the delay time adjuster provided in the standby radio transmitter adjusts the delay time so that both the phases of the two frame data signals and the two clock signals are coincident with each other. In this manner, it is also possible to make the delay time, namely, the signal phase of an active radio transmitter coincident with that of a standby radio transmitter by a simple structure without using a measuring machine or a measuring system. In addition, it is possible to automatically make the signal phase of an active radio transmitter coincident with that of a standby radio transmitter during the operation of a radio equipment.

Furthermore, when the difference in the delay time between the active radio transmitter and the standby radio transmitter is small, an intermediate-frequency signal is appropriately selected from the output signals of the modulators of the active radio transmitter and the standby radio transmitter, and input to the demodulator of the standby radio receiver, thereby generating a signal route for adjusting a delay time. When the difference in the delay time in the radio transmitters is mainly generated in the modulators MOD and the difference is small, the signal route of this structure can adjust the signal phases of the two radio transmitters.

According to the present invention, since a frequency converter for converting the transmission frequency fs into the reception frequency fr is provided on the signal route for adjusting a delay time, it is not necessary to change the reception frequency by a synthesizer or the like, so that the operability is enhanced.

In addition, according to the present invention, a switching signal for instructing the radio transmitters to be switched is output in synchronism with an overhead bit insertion timing, the switching signal is delayed by the time which it takes the inserted overhead bit to reach the high-frequency signal switch, and the radio transmitters are switched in accordance with the delayed output, and a high-frequency signal is output. It is therefore possible to switch the radio transmitters at any overhead bit insertion timing, and no bit error is caused due to switching time. According to the present invention, since an overhead bit for switching is newly inserted, and the radio transmitters are switching at a timing of inserting the overhead bit for switching, no error is caused in the data, frame bit, parity bit, stuffing control bit or DSC bit due to switching operation.

According to the present invention, since the radio transmitters are switched at a timing of inserting a stuffing bit, no error is caused in the data, frame bit, parity bit, stuffing control bit or DSC bit due to switching operation.

According to the present invention, in the case of adding error detection and correction codes to input data, since the radio transmitters are switched at a timing of inserting the error detection and correction codes and a high-frequency signal is output, no error is caused in the data, frame bit, parity bit, stuffing control bit or DSC bit due to the switching operation even if the switching operation takes the transmission time of not less than 2 bits.

In addition, in the case of switching the radio transmitters at a timing of inserting an error detection and correction bit, since the called station is instructed in advance to stop error detection and correction processing, correct data is prevented from being changed to wrong data by mistake by the called station during the switching operation.

According to the present invention, in an active data processing unit and a standby data processing unit, since the clock frequency divider of one data processing unit is reset in accordance with the clock signal output from the clock frequency divider of the other data processing unit so as to make the data strings in both data processing units coincident, and the frame timing signal generator in the one data processing unit is reset in accordance with the timing signal output from the frame timing signal generator of the other data processing unit so as to make the frame phases in both data processing units coincident, it is possible to switch the active data processing unit to the standby data processing unit in a radio equipment of a master-slave synchronization system without any momentary disconnection.

Furthermore, according to the present invention, the data strings, the frame phases and the stuffing phases are made coincident in an active data processing unit and a standby data processing unit, it is possible to switch the active data processing unit to the standby data processing unit in a radio equipment of a pulse stuffing synchronization system without any momentary disconnection.

As many apparently widely different embodiments of the present invention can be made without departing from the spirit and scope thereof, it is to be understood that the invention is not limited to the specific embodiment thereof except as defined in the appended claims.

What is claimed is:

1. A radio equipment having an active radio transmitter and a standby radio transmitter, and an active radio receiver and a standby radio receiver, wherein the difference in the delay time between said active radio transmitter and said standby radio transmitter is zero, said equipment comprising:

a transmitting data processing unit for assembling input data in the form of a frame and inputting a clock signal and a frame data signal to each of said active radio transmitter and said standby radio transmitter;

a high-frequency signal switch for selecting and outputting a high-frequency signal output from said active radio transmitter;

a transmitting and receiving portion for transmitting said high-frequency signal output from said high-frequency signal switch to other radio equipment and receiving a high-frequency signal which is transmitted from the other radio equipment and inputting said high-frequency signal to said active radio receiver and said standby radio receiver;

a received data processing unit for receiving a frame data signal and a clock signal demodulated by each of said active radio receiver and said standby radio receiver and deframing and outputting a frame data signal supplied from said active radio receiver;

a signal route generator for selecting said high-frequency signal output from each of said active radio transmitter and said standby radio transmitter and inputting said high-frequency signal to said standby radio receiver so as to generate a signal route for adjusting the delay time of the corresponding radio transmitter;

a means provided in said transmitting data processing unit so as to supply said frame data signal and said clock signal to said received data processing unit after a predetermined delay;

a phase comparator provided in said received data processing unit so as to compare the phases of a frame data signal and a clock signal which are received from said standby radio receiver with the phases of said frame data signal and said clock signal which are directly received from the transmitting data processing unit, and to output signals indicating the coincidence/discordance of a data phase and the coincidence/discordance of a clock phase, respectively; and a delay time adjuster provided in each of said active radio transmitter and said standby radio transmitter so as to adjust the phases of said frame data signal and said clock signal input from said transmitting data processing unit so that both the phases of the two clock signals and the phases of the two frame data signals input to said phase comparator are coincident with each other.

2. A radio equipment according to claim 1, wherein said transmitting data processing unit includes a delay time adjusting portion for adjusting the phases of said frame data signal and said clock signal, and when the phases of a frame data signal and a clock signal received from said active radio transmitter via said signal route generator are different from those of said frame data signal and said clock signal directly received from said transmitting data processing unit, said delay time adjusting portion provided in said transmitting data processing unit adjusts the phases of said frame data signal and said clock signal so that both the phases of the two clock signals and the phases of the two frame data signals are coincident with each other; and when the phases of a frame data and a clock signal received from said standby radio transmitter via said signal route generator are different from those of said frame data and said clock signal directly received from said transmitting data processing unit, said delay time adjuster provided in said standby radio transmitter adjusts the phases of said frame data signal and said clock signal input from said transmitting data processing unit so that both the phases of the two clock signals and the phases of the two frame data signals are coincident with each other.

3. A radio equipment according to claim 1, wherein a reception frequency of said standby radio receiver is rendered the same as a transmission frequency of the standby radio transmitter.

4. A radio equipment according to claim 1, wherein said signal route generator for adjusting the delay times of said active radio transmitter and said standby radio transmitter includes a frequency converter for converting a transmission frequency into a preset reception frequency.

5. A radio equipment having an active radio transmitter and a standby radio transmitter each provided with a modulator and a transmitter, and an active radio receiver and a standby radio receiver, wherein the difference in the delay time between said active radio transmitter and said standby radio transmitter is zero, said equipment comprising:

a transmitting data processing unit for assembling input data in the form of a frame and inputting a clock signal and a frame data signal to each of said active radio transmitter and said standby radio transmitter;

a high-frequency signal switch for selecting and outputting a high-frequency signal output from said active radio transmitter;

a transmitting and receiving portion for transmitting said high-frequency signal output from said high-frequency signal switch to other radio equipment and receiving a high-frequency signal which is transmitted from the other radio equipment and inputting said high-frequency signal to said active radio receiver and said standby radio receiver;

a received data processing unit for receiving a frame data signal and a clock signal demodulated by each of said active radio receiver and said standby radio receiver and deframing and outputting a frame data signal supplied from said active radio receiver;

a signal route generator for selecting a signal output from said modulator of one of said active radio transmitter and said standby radio transmitter and inputting said signal to a demodulator of said standby radio receiver so as to generate a signal route for adjusting the delay time of the corresponding radio transmitter;

a branching circuit provided in each of said active radio transmitter and said standby radio transmitter so as to distribute said signal output from said modulator to said transmitter and said signal route generator;

a means provided in said transmitting data processing unit so as to supply said frame data signal and said clock signal to said received data processing unit after a predetermined delay;

a phase comparator provided in said received data processing unit so as to compare the phases of a frame data signal and a clock signal which are received from said standby radio receiver with the phases of said frame data signal and said clock signal which are directly received from the transmitting data processing unit, and to output signals indicating the coincidence/ discordance of the data phase and the coincidence/ discordance of the clock phase, respectively; and a delay time adjuster provided in said modulator of each of said active radio transmitter and said standby radio transmitter so as to adjust the phases of said frame data signal and said clock signal input from said transmitting data processing unit so that both the phases of the two clock signals and the phases of the two frame data signals input to said phase comparator are coincident with each other.

6. A radio equipment according to claim 5, wherein said transmitting data processing unit includes a delay time adjusting portion for adjusting the phases of said frame data signal and said clock signal, and when the phases of a frame data signal and a clock signal received from said active radio transmitter via said signal route generator are different from those of said frame data signal and said clock signal directly received from said transmitting data processing unit, said delay time adjusting portion provided in said transmitting data processing unit adjusts the phases of phase of said frame data signal and said clock signal so that both the phases of the two clock signals and the phases of the two frame data signals are coincident with each other; and when the phases of a frame data and a clock signal received from said standby radio transmitter via said signal route generator are different from those of said frame data and said clock signal directly received from said transmitting data processing unit, said delay time adjuster provided in said standby radio transmitter adjusts the phases of said frame data signal and said clock signal input from said transmitting data processing unit so that both the phases of the two clock signals and the phases of the two frame data signals are coincident with each other.

\* \* \* \* \*